United States Patent
Ochiai

(10) Patent No.: US 11,127,211 B2
(45) Date of Patent: Sep. 21, 2021

(54) PLANT MANAGEMENT SYSTEM, PLANT MANAGEMENT METHOD, PLANT MANAGEMENT APPARATUS, AND PLANT MANAGEMENT PROGRAM

(71) Applicant: NEC CORPORATION, Tokyo (JP)

(72) Inventor: Katsuhiro Ochiai, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/089,847

(22) PCT Filed: Feb. 20, 2017

(86) PCT No.: PCT/JP2017/006161
§ 371 (c)(1),
(2) Date: Sep. 28, 2018

(87) PCT Pub. No.: WO2017/169280
PCT Pub. Date: Oct. 5, 2017

(65) Prior Publication Data
US 2019/0088022 A1 Mar. 21, 2019

(30) Foreign Application Priority Data
Mar. 30, 2016 (JP) .............................. JP2016-068250

(51) Int. Cl.
*G06T 19/00* (2011.01)
*G05B 19/042* (2006.01)
(Continued)

(52) U.S. Cl.
CPC ........ *G06T 19/006* (2013.01); *G05B 19/0428* (2013.01); *G05B 19/41865* (2013.01);
(Continued)

(58) Field of Classification Search
CPC ..... G06T 19/006; G06T 7/0004; G05B 23/02; G05B 19/0428; G05B 19/41865;
(Continued)

(56) References Cited

U.S. PATENT DOCUMENTS 6,094,625 A * 7/2000 Ralston ................... G06F 3/011
702/150
2010/0256799 A1* 10/2010 Turrini ................. G05B 19/401
700/186
(Continued)

FOREIGN PATENT DOCUMENTS

| JP | 11-202904 A | 7/1999 |
| JP | 11202904 A * | 7/1999 |

(Continued)

OTHER PUBLICATIONS

International Search Report for PCT/JP2017/006161 dated May 16, 2017.

*Primary Examiner* — Terrell M Robinson
(74) *Attorney, Agent, or Firm* — Sughrue Mion, PLLC

(57) ABSTRACT

This invention is directed to a plant management system that presents a position to be measured by a sensor that performs measurement for inspection of a plant or the like when the measurement is executed, thereby preventing a measurement error. The plant management system includes a measurement position instructor that, when performing the measurement by the sensor on a work site, instructs the position to be measured by the sensor on a measurement target, and a presenter that, when the measurement is executed, performs presentation of an image representing the position to be measured by the sensor on the work site by superimposing the image on an image of the measurement target or projecting the image onto the measurement target. Here, the presenter includes a superimposition display that superimposes and displays the image representing the position to be
(Continued)

measured by the sensor on the image of the measurement target using an augmented reality technology or a projection device that projects the image representing the position to be measured by the sensor in association with the measurement target.

19 Claims, 43 Drawing Sheets

(51) Int. Cl.
 *G05B 19/418* (2006.01)
 *G06T 7/00* (2017.01)
(52) U.S. Cl.
 CPC .. *G06T 7/0004* (2013.01); *G05B 2219/31449* (2013.01); *G05B 2219/32014* (2013.01); *G05B 2219/39449* (2013.01); *G05B 2219/39451* (2013.01)
(58) Field of Classification Search
 CPC .......... G05B 2219/31449; G05B 2219/32014; G05B 2219/39449; G05B 2219/39451
 See application file for complete search history.

(56) References Cited

U.S. PATENT DOCUMENTS

| | | | |
|---|---|---|---|
| 2013/0010068 A1* | 1/2013 | Tiernan | G06K 9/228 348/46 |
| 2014/0022281 A1* | 1/2014 | Georgeson | G06F 3/1454 345/633 |
| 2014/0282257 A1* | 9/2014 | Nixon | G05B 15/02 715/835 |
| 2015/0084989 A1* | 3/2015 | Laughlin | G06T 19/20 345/633 |
| 2015/0146007 A1* | 5/2015 | Dusik | G06K 9/00671 348/161 |
| 2015/0183114 A1* | 7/2015 | Takahashi | B25J 9/1692 700/253 |
| 2015/0347849 A1* | 12/2015 | Vullioud | G02B 27/0101 345/633 |
| 2016/0012380 A1* | 1/2016 | Sugiyama | H04N 5/2252 705/7.15 |
| 2016/0035246 A1* | 2/2016 | Curtis | G09B 19/24 434/219 |
| 2016/0132046 A1* | 5/2016 | Beoughter | G05B 19/4184 700/17 |
| 2016/0339652 A1* | 11/2016 | Safai | B24B 49/12 |
| 2017/0076504 A1* | 3/2017 | Oar | G02B 27/017 |
| 2017/0356956 A1* | 12/2017 | Neeley | G01R 31/2834 |

FOREIGN PATENT DOCUMENTS

| | | | |
|---|---|---|---|
| JP | 2014-123873 A | | 7/2014 |
| JP | 2014-139745 A | | 7/2014 |
| JP | 2014123873 A | * | 7/2014 |
| JP | 2014139745 A | * | 7/2014 |

* cited by examiner

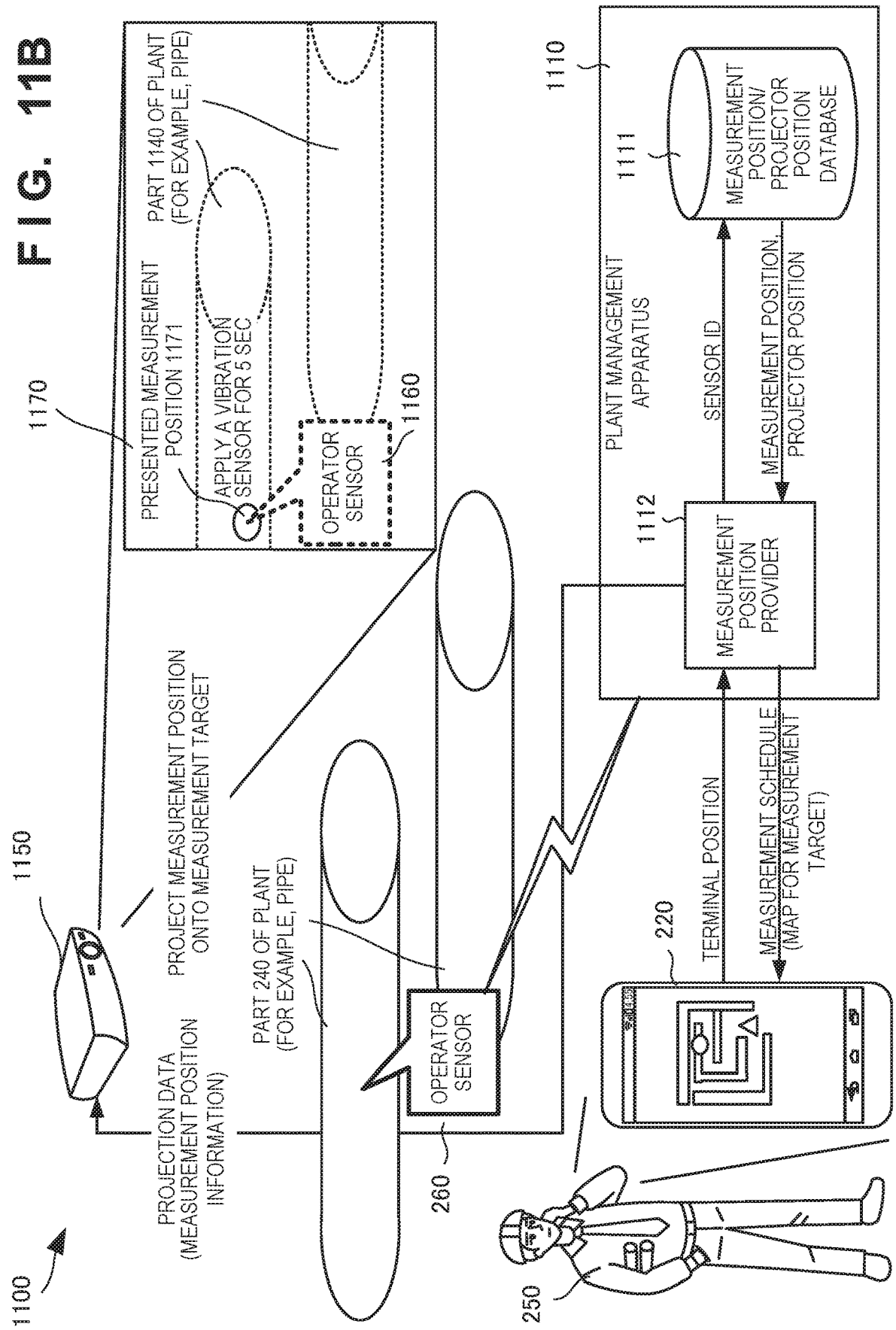

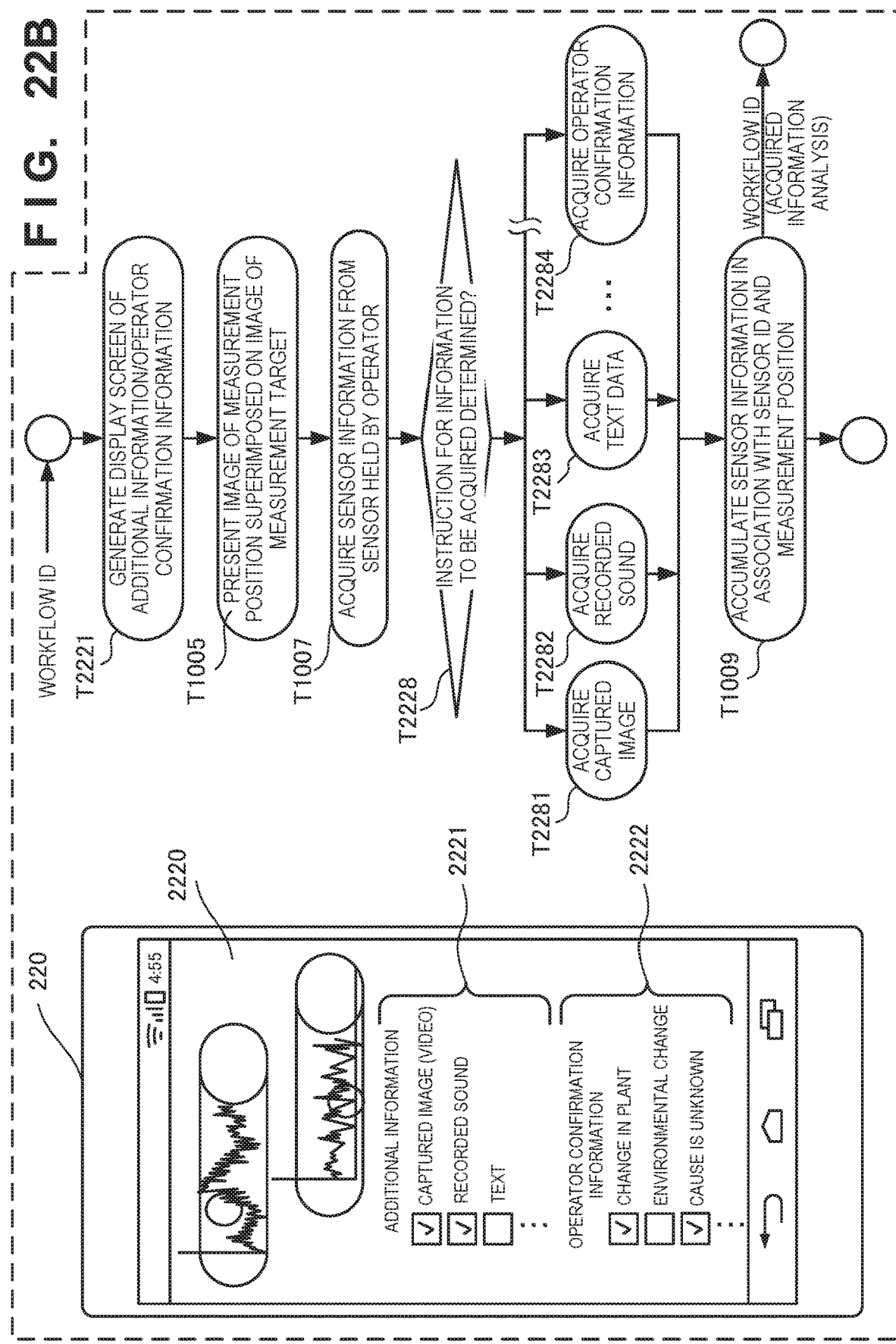

PLANT MANAGEMENT SYSTEM, PLANT MANAGEMENT METHOD, PLANT MANAGEMENT APPARATUS, AND PLANT MANAGEMENT PROGRAM

CROSS REFERENCE TO RELATED APPLICATIONS

This application is a National Stage of International Application No. PCT/JP2017/006161 filed Feb. 20, 2017, which is based upon and claims the benefit of priority from Japanese patent application No. 2016-068250, filed on Mar. 30, 2016, the disclosure of which is incorporated herein in its entirety by reference.

TECHNICAL FIELD

The present invention relates to a plant management system, a plant management method, a plant management apparatus, and a plant management program.

BACKGROUND ART

In the technical field, patent literature 1 discloses a technique in which when a terminal apparatus held by a user captures a facility device of an operation target, the terminal apparatus transmits position information and direction information representing a direction to a device management apparatus, the device management apparatus generates an operation image (Pv1 or Pv2 in FIG. 5) corresponding to the facility device and transmits it to the terminal apparatus, and the terminal apparatus displays an augmented reality image in which the received operation image is superimposed on a switch (Sw1 or Sw2 in FIG. 5) in the image (Pr in FIG. 5) of the facility device captured by the terminal apparatus.

CITATION LIST

Patent Literature

Patent literature 1: Japanese Patent Laid-Open No. 2014-139745

SUMMARY OF THE INVENTION

Technical Problem

However, the technique described in the above literature is a technique of displaying an operation screen formed from an operation comment on a switch of the facility device in a superimposed manner. Even if such a technique is applied, it is impossible to prevent a measurement error by, for example, correctly presenting a position to be measured by a sensor to the operator on work-site for inspection of a plant or the like.

The present invention enables to provide a technique of solving the above-described problem.

Solution to Problem

One example aspect of the invention provides a plant management system comprising:

a measurement position instructor that, when performing measurement by a sensor on a work site, instructs a position to be measured by the sensor on a measurement target; and a presenter that, when the measurement is executed, performs presentation of an image representing the position to be measured by the sensor on the work site by superimposing the image on an image of the measurement target or projecting the image onto the measurement target.

Another example aspect of the invention provides a plant management method comprising:

when performing measurement by a sensor on a work site, instructing a position to be measured by the sensor on a measurement target; and when the measurement is executed, performing presentation of an image representing the position to be measured by the sensor on the work site by superimposing the image on an image of the measurement target or projecting the image onto the measurement target.

Still other example aspect of the invention provides a plant management apparatus comprising:

a position acquirer that acquires a position of a work site;

a measurement position instructor that, when performing measurement by a sensor, instructs a position to be measured by the sensor on a measurement target in accordance with the position of the work site; and an instructor that, when the measurement is executed, instructs to perform presentation of an image representing the position to be measured by the sensor on the work site by superimposing the image on an image of the measurement target or projecting the image onto the measurement target.

Still other example aspect of the invention provides a plant management program for causing a computer to execute a method, comprising:

displaying a list of tasks to be performed on a work site;

acquiring a position of the work site; and when performing measurement by a sensor, instructing to perform presentation of an image representing a position to be measured by the sensor on the work site by superimposing the image on an image of the measurement target or projecting the image onto the measurement target, in accordance with the position of the work site.

Still other example aspect of the invention provides a plant management program for causing a computer to execute a method, comprising:

acquiring a first position of a work site;

when performing measurement by a sensor, acquiring a second position to be measured by the sensor on a measurement target in accordance with the first position of the work site; and generating information to be presented on the work site when the measurement is executed by superimposing an image representing the second position on an image of the measurement target or projecting the image onto the measurement target.

Still other example aspect of the invention provides a plant management program for causing a computer to execute a method, comprising:

acquiring, from an accumulator that accumulates a sensor and sensor information concerning the sensor in association with each other, the sensor information in accordance with a position to be measured by the sensor; and instructing to perform presentation of the sensor information together with an image representing the position to be measured by the sensor on a work site when measurement is executed by superimposing the sensor information together with the image on an image of a measurement target or projecting the sensor information together with the image onto the measurement target.

Advantageous Effects of Invention

According to the present invention, it is possible to prevent a measurement error by presenting, when executing measurement, a position to be measured by a sensor that performs measurement for inspection of a plant or the like.

BRIEF DESCRIPTION OF DRAWINGS

FIG. 11B is a view showing another operation outline of the plant management system according to the third example embodiment of the present invention;

FIG. 22B is a view showing the third presentation example on work-site in the plant management system according to the sixth example embodiment of the present invention and a corresponding workflow;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

Note that a term "sensor information" used in this specification not only indicates measurement information detected by a sensor particularly shown in a drawing and the time-series data of the information but also includes, for example, the part of a setting target in a plant or the like in which the sensor is set, such as the name and characteristics of the sensor, or the unit information of sensor data. In addition, the sensor information may also include the type of the sensor, the format of data output from the sensor, firmware provided in the sensor, and the like. These pieces of information can also achieve the effect of the example embodiment. In addition, a term "measurement target" indicates a target to be measured by sensors held by an operator on work-site or a remote-controlled device such as a robot or drone, for example, a portion of a structure such as a plant, which can be measured by the operator on work-site. Furthermore, a term "position to be measured" or "measurement position" indicates one point in the measurement target or its periphery, which can be actually measured by sensors held by the operator on work-site or the remote-controlled device without any measurement error.

First Example Embodiment

A plant management system 100 according to the first example embodiment of the present invention will be described with reference to FIG. 1. The plant management system 100 is a system that supports the on work-site work of an operator who checks or maintains a plant or the like.

Figure 1:
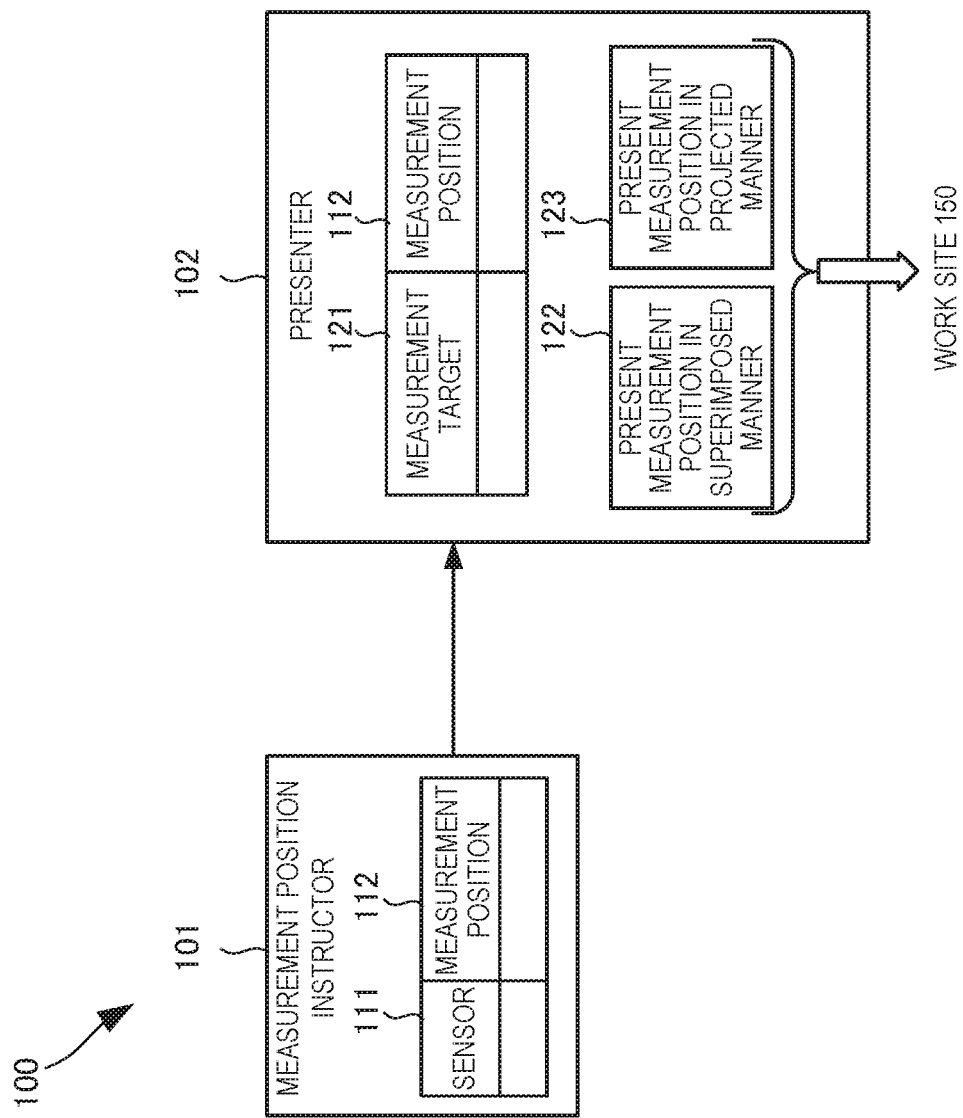
FIG. 1 is a block diagram showing the arrangement of a plant management system according to the first example embodiment of the present invention.

As shown in FIG. 1, the plant management system 100 includes a measurement position instructor 101 and a presenter 102. When performing measurement using a sensor on a work site 150, the measurement position instructor 101 instructs a position 112 of a measurement target to be measured by a sensor 111. The presenter 102 superimposes (122) an image representing the position 112 to be measured by the sensor on the image of a measurement target 121 or projects (123) the image on the measurement target 121, and displays the image on the work site 150 when the measurement is executed.

According to this example embodiment, it is possible to prevent a measurement error by presenting, when executing measurement, a position to be measured by a sensor that performs measurement for inspection of a plant or the like.

Second Example Embodiment

A plant management system according to the second example embodiment of the present invention will be described next. In the plant management system according to this example embodiment, when an operator on work-site carries a sensor and acquires inspection information from a predetermined position of a measurement target to collect the inspection information to a management center that manages a plant, a plant map to a measurement target to be measured next by the operator using an operator sensor is presented to guide the operator. When the operator arrives at the place of the measurement target, the position of the measurement target to be measured by the operator sensor is displayed on the measurement target or an image thereof in a superimposed manner from a terminal or an HMD (Head Mounted Display). This can efficiently support the on work-site work of the operator who checks or maintains a plant or the like and prevent a measurement error.

For example, in this example embodiment, using AR (Augmented Reality), the position to be measured by the operator sensor is displayed in a superimposed manner on the measurement target located at a position acquired as a site using a GPS (Global Positioning System). Note that in a place where GPS positioning cannot be performed, autonomous positioning like car navigation in a tunnel may be combined instead of the GPS. In addition, the position may be acquired by analyzing an image captured by a camera.

Furthermore, in this example embodiment, associated information associated with a measurement target, which is acquired by the terminal based on the operation of the operator, and sensor information acquired by the operator sensor are accumulated in association with each other, and the operation state of the measurement target is predicted based on the association between the accumulated sensor information and the associated information.

Note that as the terminal in this example embodiment, for example, a head mounted display, a portable telephone, a smartphone, a tablet, or the like is used. In addition, the terminal may be a remote-controlled device such as a robot or a drone having a sensor function of measuring the measurement target. In this case, the remote-controlled device such as a robot or a drone is caused to perform the measurement at the measurement position of the measurement target.

«Existing Plant Management System»

Figure 3:
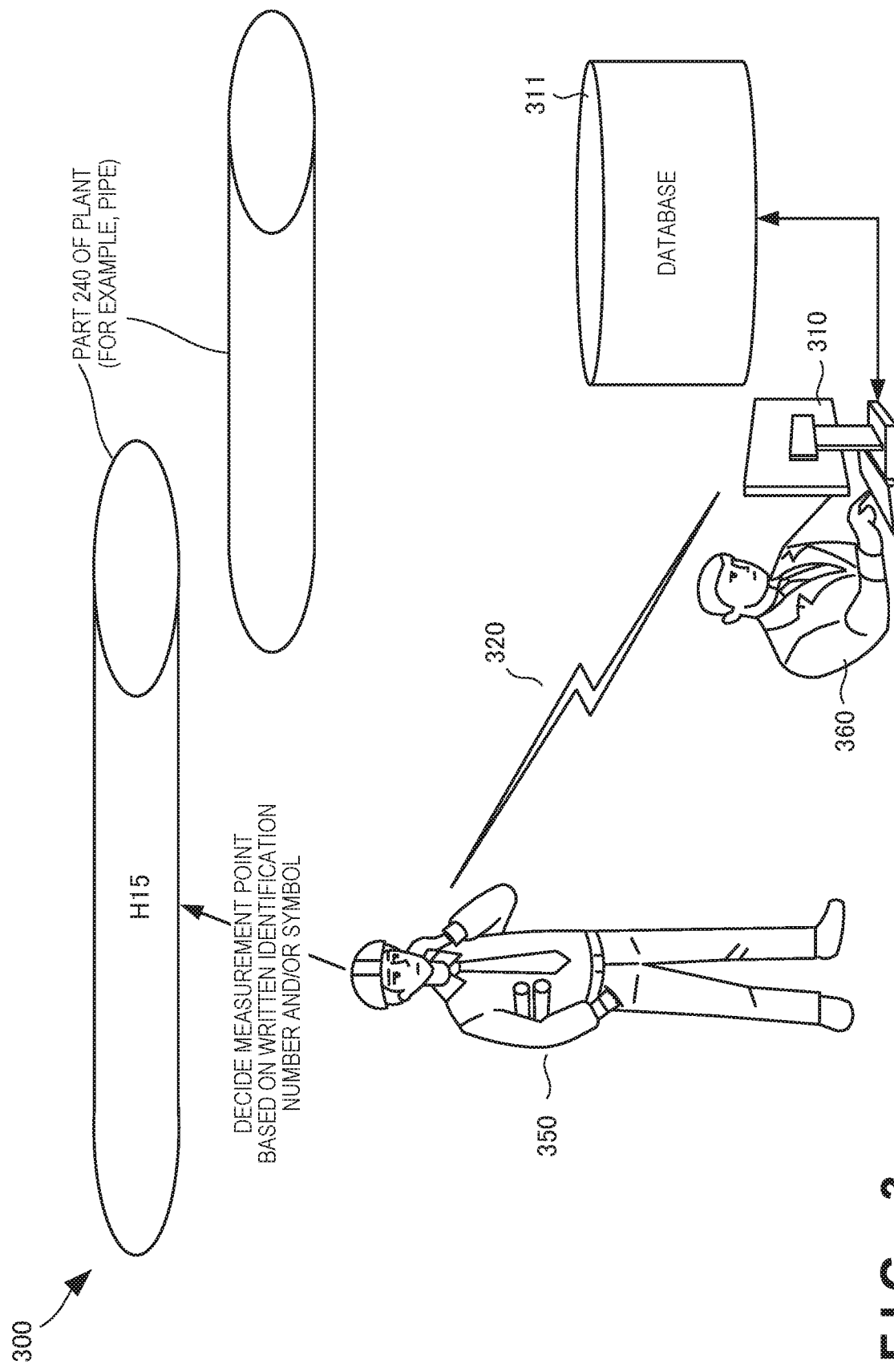
FIG. 3 is a view showing the operation outline of a plant management system according to an existing technique.

First, to explicitly show the features of this example embodiment, the operation outline of a plant management system 300 according to an existing technique will be described with reference to FIG. 3.

The plant management system 300 is a system configured to monitor or maintain a structure such as a plant. For example, in the management center of the plant management system 300, pieces of sensor information that the operator on work-site has acquired from predetermined positions of a measurement target by various kinds of operator sensors that he/she carries while patrolling are collected and accumulated in a database 311, and it is monitored whether an abnormality or fault exists in the operation of the plant or not. Note that if an abnormality is recognized, a manager 360 instructs from a management center terminal 310 to analyze the sensor information accumulated in the database 311. For example, an operator on the corresponding site may be instructed to do observation to find the cause of the abnormality. If an abnormality or fault is found, or if an abnormality or fault is predicted by analysis of the sensor information, the manager 360 instructs the site to perform re-inspection by the operator sensor from the predetermined position or a maintenance operation from the management center terminal 310.

On the other hand, an operator 350 on work-site decides a measurement point based on an identification number or symbol written at a predetermined position of each measurement target of the plant while periodically observing a part 240 of the plant that the operator is in charge of, and transmits the information to the management center via a communication 320. At the time of abnormality recognition, the operator 350 re-inspects the part 240 of the plant that the operator is in charge of by the operator sensor in accordance with an instruction of the manager 360 from the management center terminal 310. Upon receiving a maintenance operation instruction by the manager 360 from the management center terminal 310, the operator 350 executes the corresponding maintenance operation.

However, the identification number or symbol is cumbersome, and the operator 350 on work-site cannot correctly know the measurement point. In addition, only a predetermined point with an identification number or symbol can be measured.

That is, if the management center adds a new measurement point or changes a measurement point so far based on the analysis of a phenomenon that has occurred in the plant, it is necessary to rewrite the identification number or symbol or notify the operator of it. It is difficult to deal with. In addition, the burden on the operator increases, and a measurement error occurs.

«Plant Management System of This Example Embodiment»

The arrangement and operation of a plant management system 200 according to this example embodiment will be described with reference to FIGS. 2A, 2B, and 4A to 6.

(Operation Outline)

Figure 2A:
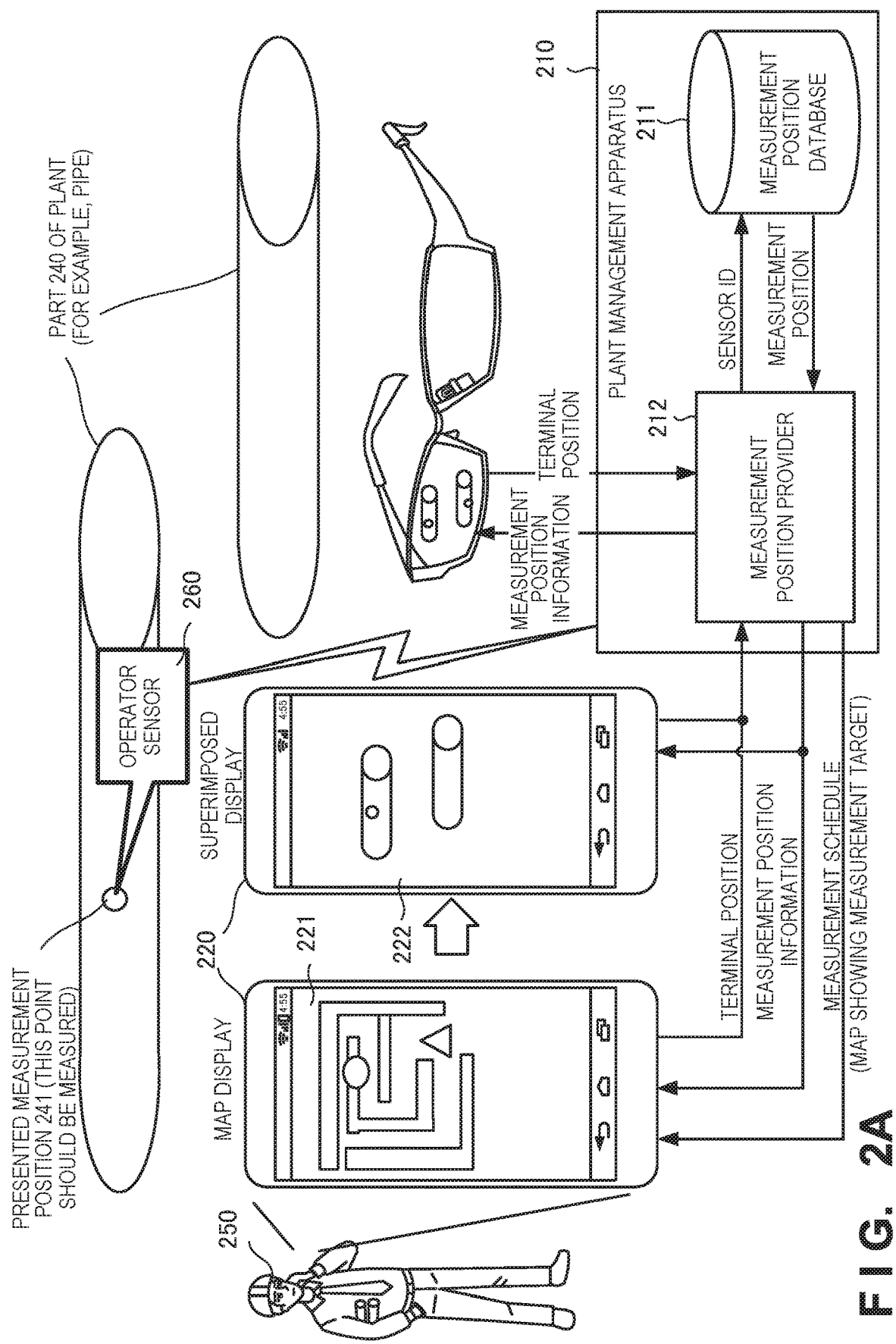
FIG. 2A is a view showing the operation outline of a plant management system according to the second example embodiment of the present invention.

FIG. 2A is a view showing the operation outline of the plant management system 200 according to this example embodiment.

The plant management system 200 is a system configured to monitor or maintain a structure such as a plant. For example, the management center of the plant management system 200 includes a plant management apparatus 210 including a measurement position database 211 and a measurement position provider 212. The measurement position database 211 stores a position to be measured, which is associated with the type of the operator sensor carried by the operator on work-site, on each measurement target of the plant. The position 241 to be measured is changed in accordance with the state or change of the plant 240. Associated information associated with the measurement position, which is acquired by a terminal 220 carried by an operator 250, may also be stored in the measurement position database 211 in association with the measurement position. The associated information includes an image (or video) of the plant captured by the terminal 220, a sound generated by the plant and recorded by the terminal 220, information of the on work-site situation input by the operator 250 to the terminal 220, and the like.

Here, when the measurement position provider 212 of the plant management apparatus 210 receives the position information of the terminal 220 carried by the operator 250 on the work site that the operator is in charge of, the measurement target to be measured to which the operator 250 patrols from the position information of the terminal 220 in accordance with a measurement schedule is displayed as a map screen 221. On the map screen 221, the measurement target to which the operator 250 goes is indicated by ○. When the operator 250 arrives at the place of the measurement target, the position of the measurement target to be measured by an operator sensor 260 held and carried by the operator 250 from the position information of the terminal 220 is superimposed on the measurement target, and displayed as a superimposed screen 222 on the terminal 220. On the superimposed screen 222, the measurement point to be measured by the operator 250 using the operator sensor 260 is indicated by ○. Here, to promote support of the work of the operator 250, the position to be measured by the operator sensor 260 is preferably superimposed on a 3D image of the plant generated by the plant management apparatus 210 and presented, or superimposed on an image captured by the camera of the terminal 220 and presented. If the 3D image of the plant is an image through which the internal structure of the plant is visible, the position to be measured can be indicated more exactly for the operator 250 on work-site. In addition, when the 3D plant image through which the internal structure is visible is superimposed on a captured moving image including the operator 250 as well, The operator can be guided more correctly to the work target position (for example, check position/inspection position).

Note that the operator sensor according to this example embodiment includes not only the sensor that measures the plant itself but also sensors that acquire the state of an operating portion or environmental information. In the case of these sensors, not a fixed measurement point but the position of a moving member or the position of a space may be presented. For example, the sensors include a temperature sensor, a humidity sensor, an air pressure sensor, a noise microphone or an echo microphone, a smoke sensor or an odor sensor, a vibration sensor, a speed sensor or an acceleration sensor, an infrared camera, and the like.

On the other hand, as for an HMD that is an example of the terminal 220, when the operator 250 approaches the measurement target in a periodic inspection, a position of the measurement target to be measured by the operator sensor 260 carried by the operator 250 is presented from the terminal (HMD) 220 to the operator 250 such that the position to be measured is superimposed on the plant image of the measurement target based on position information from the terminal (HMD) 220. If the image is a perspective image, the operator 250 confirms the internal structure of the plant or the like by the operator sensor 260, thereby further improving the accuracy or quality of inspection by the operator sensor 260. In addition, an inspection report with the improved accuracy and quality from the operator 250 leads to correct plant monitoring and failure prediction by the plant management apparatus 210. Although not illustrated in FIG. 2A, a report of a new inspection position noticed by the operator on work-site based on his/her experiences or the like may be reflected on the measurement position database 211 to more efficiently collect the information. Furthermore, detection data including the new inspection position noticed by the operator on work-site based on his/her experiences or the like may be analyzed in the management center, and the new inspection position may be included in the measurement schedule.

As described above, in the plant management system 200 according to this example embodiment, the correct sensor information from the operator sensor 260 and the observation and sense of the operator 350 on work-site are combined with each other, and more useful information for abnormality diagnosis or fault diagnosis can be obtained. That is, since a point or cause of an abnormality is narrowed down based on data collected from the operator sensor and associated information acquired by the operator on work-site, information that does not appear in the data can be used for analysis, and details such as the portion to inspect on work-site becomes clearer. It is therefore possible to correctly know a point that should be monitored in a large-scale plant and specify or predict the cause of an abnormality by comprehensively determining peripheral situations on work-site.

(Presentation on Work-Site)

Figure 2B:
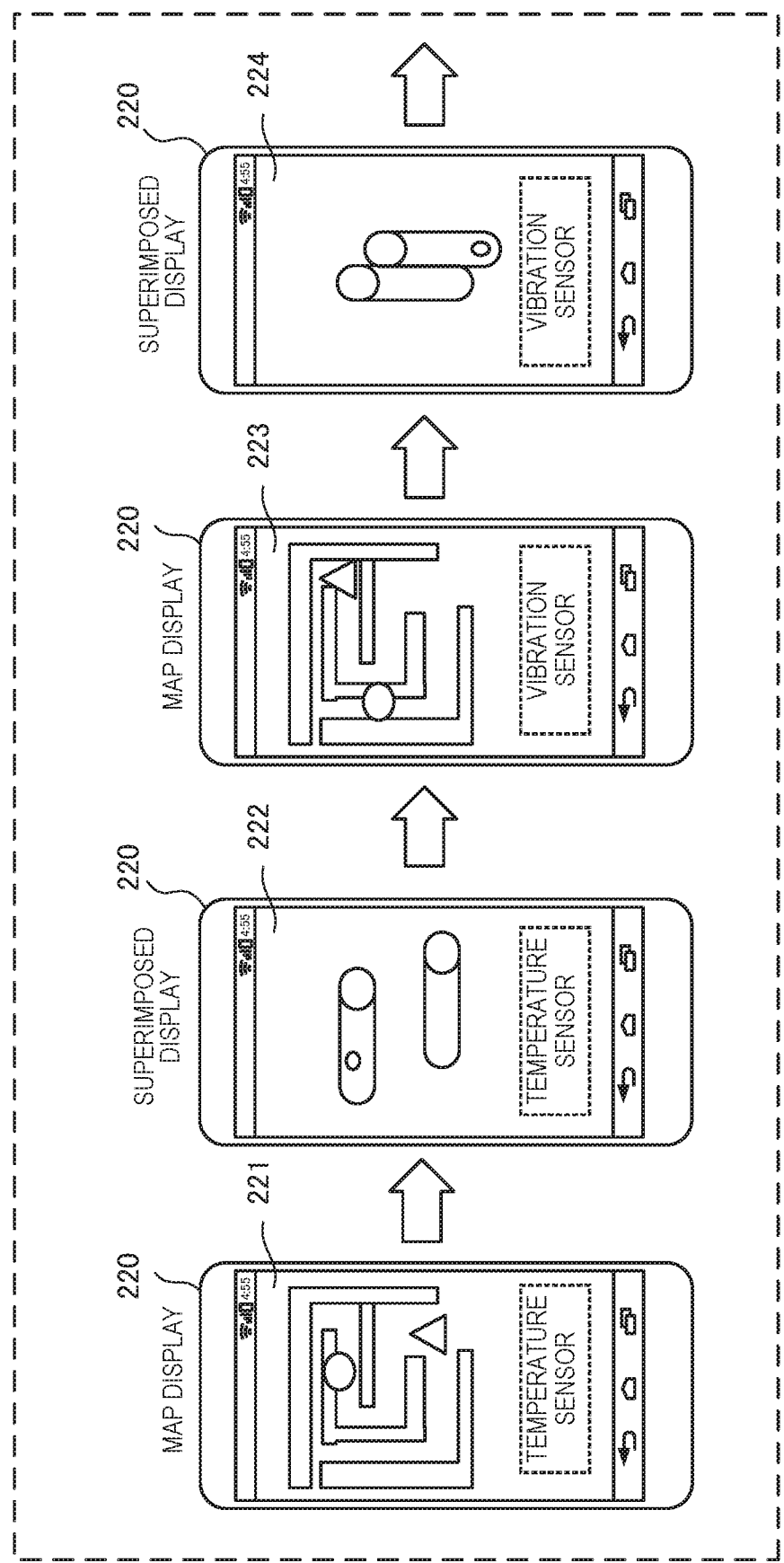
FIG. 2B is a view showing a presentation example on work-site in the plant management system according to the second example embodiment of the present invention.

FIG. 2B is a view showing a presentation example on work-site in the plant management system 200 according to this example embodiment. Note that the presentation example on work-site is not limited to that in FIG. 2B, and any other more effective combination is also possible.

In the leftmost view of FIG. 2B, the map screen 221 of the measurement target by the operator 250 on work-site according to the measurement schedule is presented on the display screen of the terminal 220 based on the position information of the terminal 220 and the identifier of the operator sensor 260. On the map screen 221, the direction in which the operator 250 travels is indicated by Δ, and the measurement target is indicated by ○.

In the center left view of FIG. 2B, when the operator 250 arrives at the measurement target, a superimposed screen 222 in which the position to be measured by the operator 250 on work-site using the operator sensor 260 is superimposed on the measurement target is presented on the display screen of the terminal 220 based on the position information of the terminal 220 and the identifier of the operator sensor 260. On the superimposed screen 222, the position to be measured by the operator sensor 260 is indicated by ○.

In the center right view of FIG. 2B, a map screen 223 representing the measurement target to which the operator 250 on work-site goes next in accordance with the measurement schedule is presented on the display screen of the terminal 220 based on the position information of the terminal 220 and the identifier of the operator sensor 260. On the map screen 223, the direction in which the operator 250 travels from the current position is indicated by Δ, and the next measurement target is indicated by ○.

In the rightmost view of FIG. 2B, when the operator 250 arrives at the next measurement target, a superimposed screen 224 in which the position to be measured by the operator 250 on work-site using the operator sensor 260 is superimposed on the measurement target is presented on the display screen of the terminal 220 based on the position information of the terminal 220 and the identifier of the operator sensor 260. On the superimposed screen 224, the position to be measured by the operator sensor 260 is indicated by ○.

If there are a plurality of operator sensors 260, and the measurement is performed using different sensors, a sensor to be used is presented as shown in FIG. 2B, thereby preventing a measurement error from occurring due to use of a wrong operator sensor by the operator.

(Functional Arrangement)

Figure 4:
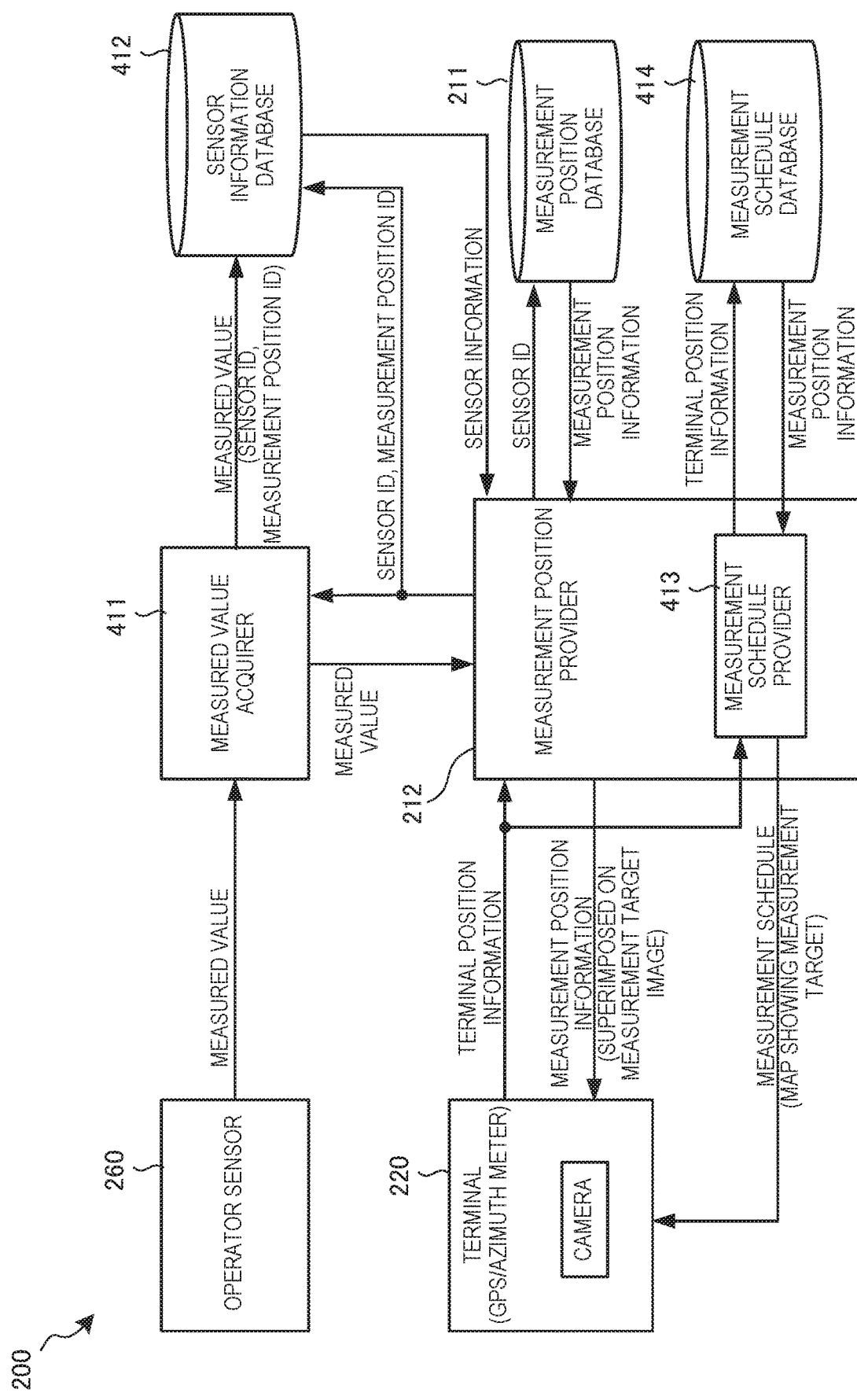
FIG. 4 is a block diagram showing the functional arrangement of the plant management system according to the second example embodiment of the present invention.

FIG. 4 is a block diagram showing the functional arrangement of the plant management system 200 according to this example embodiment. Note that FIG. 4 shows the functional arrangement of the plant management system 200 having whole functions described in this example embodiment, but the whole functional arrangement is not essential. Note that the same reference numerals as in FIG. 2A denote the same constituent elements in FIG. 4, and a detailed description thereof will be omitted.

The plant management system 200 includes a measured value acquirer 411 that acquires a measured value from the operator sensor 260, and a sensor information database 412 that accumulates sensor information including the measured value in association with the sensor ID of the operator sensor 260 and a measurement position ID. The plant management system 200 also includes, together with the measurement position provider 212, a measurement schedule provider 413 that presents a measurement schedule including a measurement target map on the terminal 220 carried by the operator 250, and a measurement schedule database 414 that stores the measurement schedule including the measurement target map in correspondence with terminal position information. Note that when the measurement schedule is stored in the measurement schedule database 414 in correspondence with the terminal position information and the ID of the operator sensor 260, a measurement schedule for only the operator sensor 260 is searched for.

In the arrangement shown in FIG. 4, the measurement schedule provider 413 searches the measurement schedule database 414 for the measurement schedule based on the current position of the operator 250 (the position information of the terminal 220). The measurement schedule provider 413 then selects the measurement schedule corresponding to the operator sensor 260 from the measurement schedules based on the sensor ID of the operator sensor 260, provides the measurement schedule to the terminal 220 carried by the operator 250 together with the measurement target map, and causes the terminal 220 to present the measurement schedule to the operator 250. The measurement position provider 212 determines, based on the position information of the terminal 220, that the operator 250 has arrived at the measurement target, and searches the measurement position database 211 for measurement position information including a measurement position image based on the sensor ID of the operator sensor 260. The measurement position provider 212 superimposes the measurement position image on an image of the measurement target captured by the camera of the terminal 220 or a 3D image of the measurement target generated from the plant structure, provides the image to the terminal 220, and causes the terminal 220 to present the image to the operator 250.

The operator 250 sets the operator sensor 260 at the correct measurement position of the measurement target with reference to the superimposed image on which the measurement position is presented on the measurement target or preferably with reference to the superimposed image on which the measurement position is presented on the measurement target while capturing an image including the operator sensor 260. The operator sensor 260 then transmits sensor information including the detected measured value to the measured value acquirer 411. The measured value acquirer 411 accumulates the sensor information including the measured value detected by the operator sensor 260 in the sensor information database 412 in association with the sensor ID of the operator sensor 260 and the measurement position ID. Note that the accumulated sensor information may be presented together on the terminal 220 at the time of providing of the measurement schedule or the measurement position to the terminal 220 or detection from the measurement position of the measurement target by the operator sensor 260.

(Hardware Arrangement)

Figure 5A:
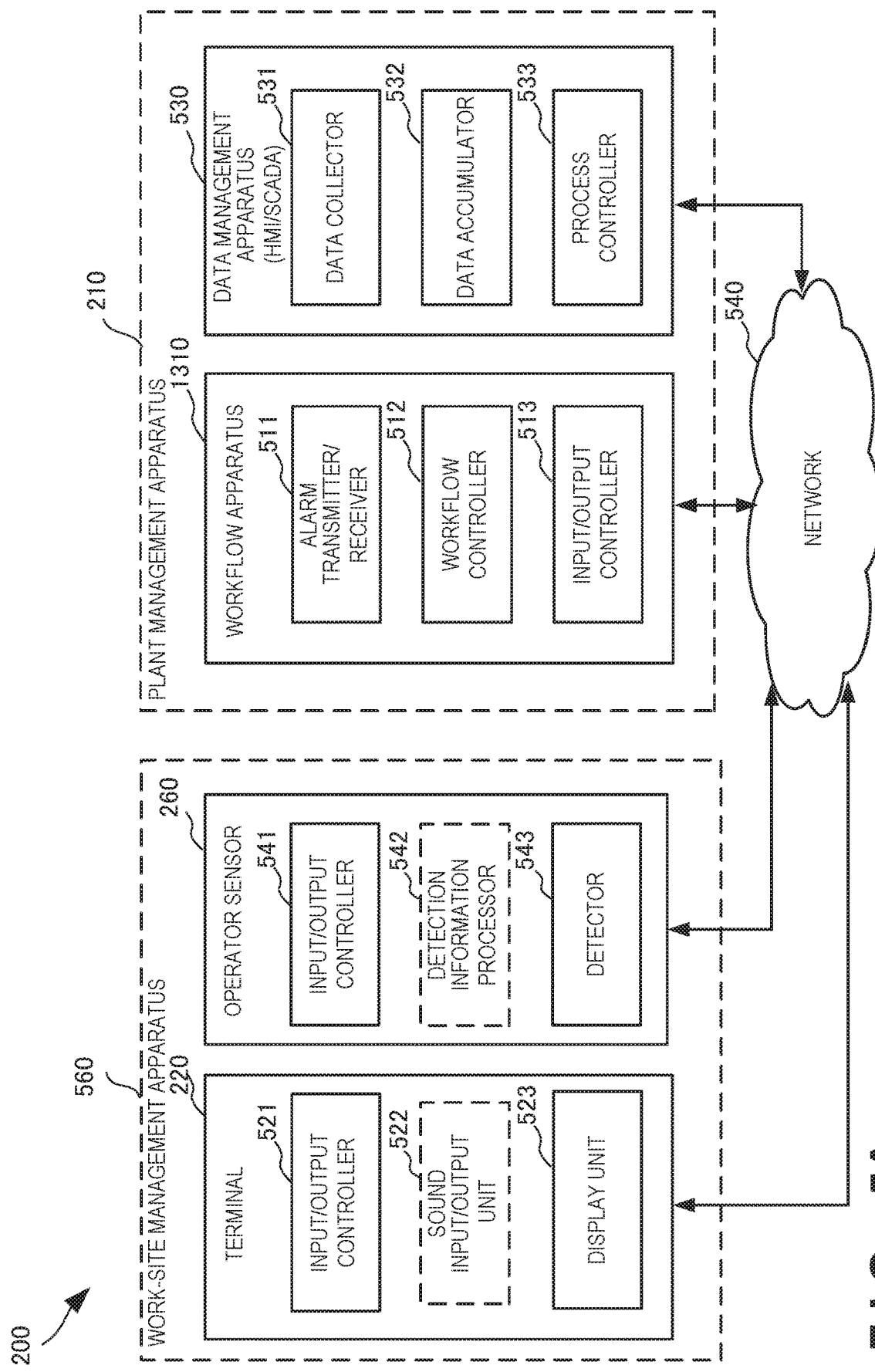
FIG. 5A is a block diagram showing the hardware arrangement of the plant management system according to the second example embodiment of the present invention.

FIG. 5A is a block diagram showing the hardware arrangement of the plant management system 200 according to this example embodiment. Note that in FIG. 5A, the same reference numerals as in FIG. 2A denote the same constituent elements in FIG. 5A. Any apparatus of the plant management system 200 is an apparatus including a processor (CPU: Central Processing Unit) and a memory. The function of each unit of the apparatus is obtained as a result of executing a program stored in the memory by the processor.

Referring to FIG. 5A, the plant management system 200 includes the plant management apparatus 210 that manages a plant and a work-site management apparatus 560 that manages a site, which are connected via a network 540. Note that the network 540 is a network formed for the entire plant or across a plurality of plants, and can be configured via the Internet using a VPN (Virtual Private Network) or the like. In addition, whether the network 540 is wired or wireless does not matter.

The plant management apparatus 210 includes a workflow apparatus 510 and a data management apparatus 530. The workflow apparatus 510 includes at least an alarm transmitter/receiver 511, a workflow controller 512, and an input/output controller 513. The alarm transmitter/receiver 511 includes a function of receiving an externally generated alarm and transmitting an alarm to the outside. The workflow controller 512 controls a workflow according to a predetermined notation or standard (for example, ISA (International Society of Automation)-95). The input/output controller 513 controls data input/output according to transmission/reception of an alarm or workflow control. The workflow apparatus 510 may further include a task list unit that displays a task list to the user and performs control concerning a work result input instruction from the user.

In addition, the data management apparatus 530 includes an HMI (Human Machine Interface) function and an SCADA (Supervisory Control And Data Acquisition) function, collects and accumulates data concerning the plant, and analyzes the accumulated data based on the interface to the management of the plant manager, thereby performing process control of the plant. The data management apparatus 530 includes at least a data collector 531, a data accumulator 532, and a process controller 533. The data collector 531 collects data detected by each sensor and data transmitted from another apparatus. The data accumulator 532 accumulates the data collected by the data collector 531 such that a search and analysis can be performed. The process controller 533 analyzes the data accumulated in the data accumulator 532 and performs process control of the plant in correspondence with the analysis result.

In addition, the work-site management apparatus 560 includes the terminal 220 carried by the operator 250, and the operator sensor 260 used by the operator 250 to measure a measurement target. The terminal 220 includes at least an input/output controller 521, a sound input/output unit 522, and a display unit 523. The input/output controller 521 controls input of a plant image on which a task list or sensor information to be displayed on the display unit 523 is superimposed or input of sound data to be output from the speaker of the sound input/output unit 522 via the network 540. In addition, the input/output controller 521 controls output of current position information of the terminal 220 or image information captured by the camera or output of sound data collected by the microphone of the sound input/output unit 522 via the network 540. The sound input/output unit 522 includes a microphone and a speaker. The display unit 523 includes an operation unit of a touch panel, displays a plant image on which a task list or sensor information is superimposed in association with this example embodiment, and implements operations such as information input associated with a work, a camera operation, and a recording operation. Note that transmission of position information from the terminal 220 includes both the case of an arrangement in which the position information is periodically collected by the plant management apparatus 210 and the case of an arrangement in which the position information is transmitted by the operation of the operator 250 on work-site in an emergency.

The operator sensor 260 includes at least an input/output controller 541, a detection information processor 542, and a detector 543. The input/output controller 541 controls the operation of the operator sensor 260 or input in a case in which the operator sensor 260 operates by firmware, which is performed via the network 540. The input/output controller 541 also controls output of detection data detected by the detector 543 or output of sensor information including the information of the operator sensor 260 or the like, which is performed via the network 540. The detection information processor 542 executes processing when processing is necessary for the detection data detected by the detector 543 or when processing for output via the network 540 is necessary. Hence, the detection information processor 542 may be absent if the operator sensor 260 simply outputs the detection data detected by the detector 543.

Note that in this example embodiment, the alarm transmitter/receiver 511 receives position information, image information, sound information, or the like from the terminal 220 carried by the operator 250 on work-site, determines it as one of alarms of new workflow activation, and transmits the result to the workflow controller 512. The workflow controller 512 implements the characteristic function of this example embodiment by a procedure of activating a workflow to present a map used to go to the measurement target or a position of the measurement target to be measured on the terminal 220 carried by the operator 250 on work-site. However, the present invention is not limited to the solving method of adding a change to the arrangement of the alarm transmitter/receiver 511 or the workflow controller 512. The function may be implemented by adding a new functional component or a new workflow to receive position information, image information, sound information, or the like from the terminal 220 carried by the operator 250 on work-site and present the map used to go to the measurement target or the position of the measurement target to be measured on the terminal 220 carried by the operator 250 on work-site. Alternatively, the function may be implemented by providing another dedicated apparatus.

(Software Configuration)

Figure 5B:
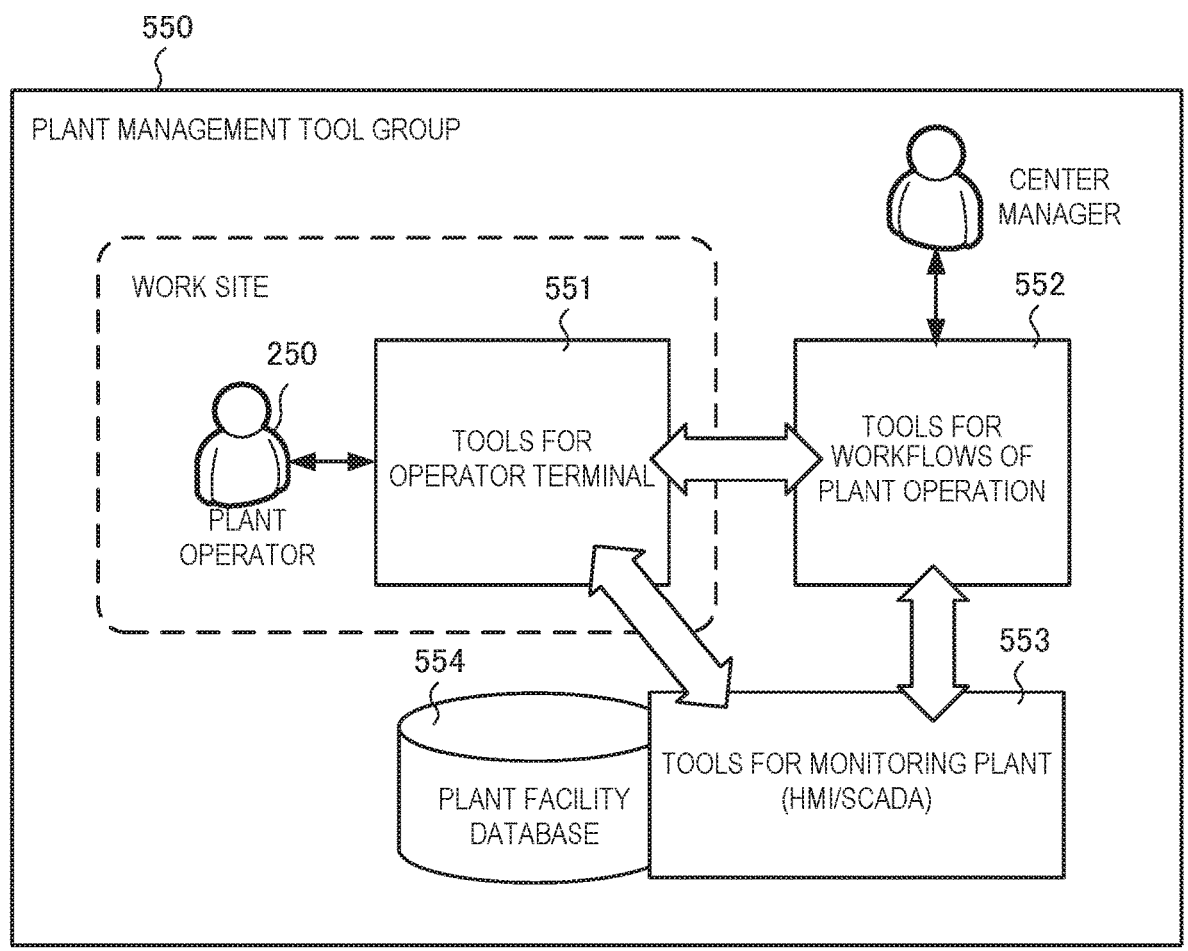
FIG. 5B is a block diagram showing the software configuration of the plant management system according to the second example embodiment of the present invention.

FIG. 5B is a block diagram showing the software configuration of the plant management system 200 according to this example embodiment. Note that FIG. 5B shows a minimum arrangement to implement the plant management system 200, and addition of another software tool, fragmentation of an illustrated software tool, overlap of a plurality of software tools, and the like are not shown.

A plant management tool group 550 shown in FIG. 5B includes at least tools 551 for operator terminal that define and manage processing associated with the terminal 220 that the operator 250 of the plant carries during an on work-site work, tools 552 for workflows of plant operation associated with a plant operation by the manager in the center that manages the plant, and tools 553 for monitoring plant that collect data including sensor information and monitor the plant operation. The tools 553 analyze information in a plant facility database 554 that registers each facility forming the plant and accumulates its driving history, monitors the plant operation, and generate a maintenance operation to find or predict a failure or prevent occurrence of a failure. The tools 551 or the tools 552 generate an on work-site observation maintenance operation or a center management work while referring to output information by the tools 553.

Note that in this example embodiment, by the cooperation of the tools 552 and the tools 551, a measurement target and a position of it to be measured are selected by position information of the terminal 220 carried by the operator 250 on work-site and the operator sensor 260 carried by the operator 250 and presented from the terminal 220 to the operator 250 on work-site. In addition, a result of measurement appropriately performed by the operator 250 on work-site using the operator sensor 260 while referring to the measurement target and the position of it to be measured presented on the terminal 220 is accumulated in the plant facility database 554 and analyzed by the tools 553, and the next on work-site observation maintenance operation or center management work is generated.

As described above, in this example embodiment, without depending on analysis of the information of the sensor installed on the plant, more improved flexible sensor information collection by the operator 250 on work-site and the information from the operator 250 on work-site o are associate with each other. Hence, the on work-site work can more effectively be incorporated in the plant management.

(Workflow)

Figure 5C:
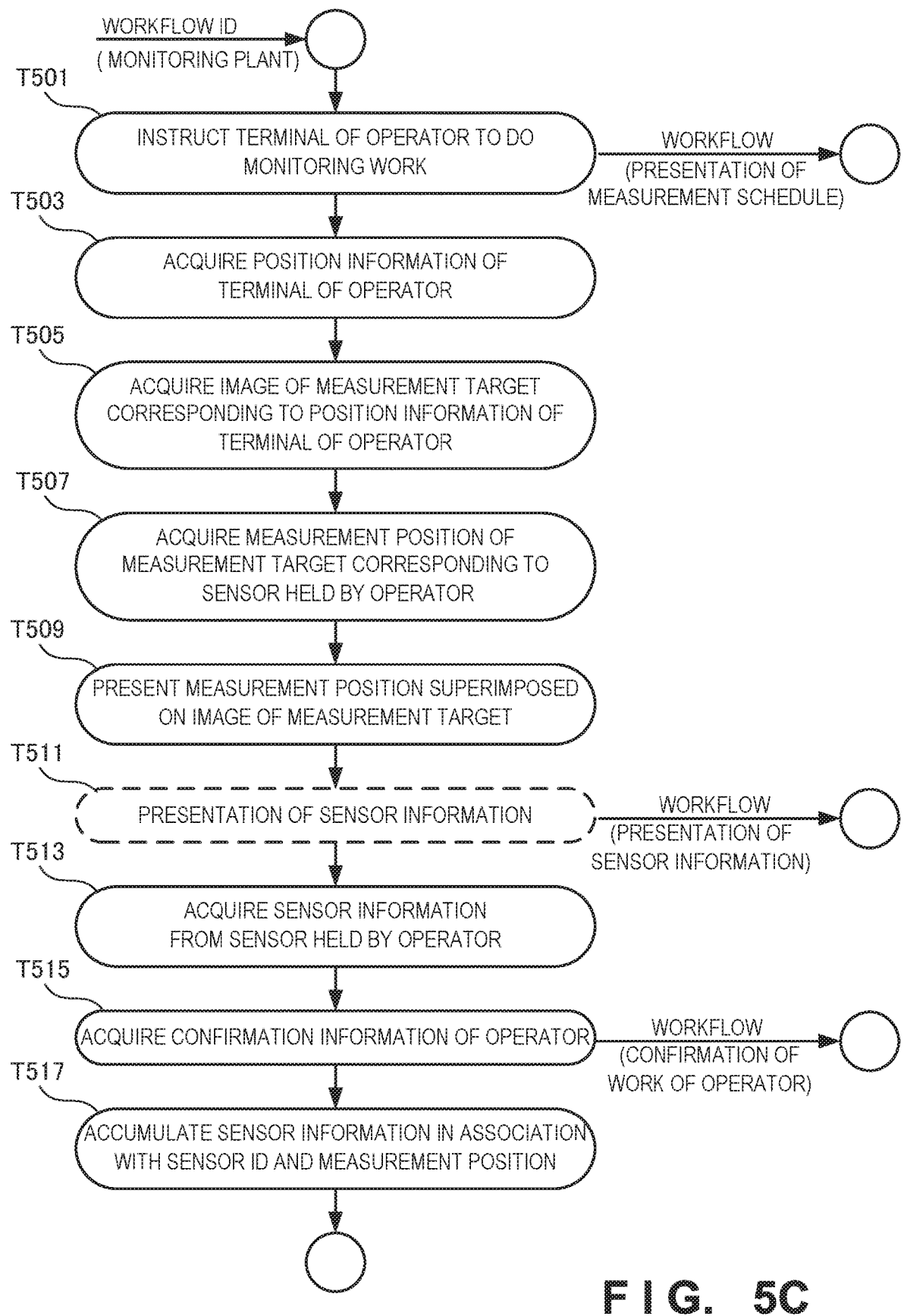
FIG. 5C is a view showing the workflow of the plant management system according to the second example embodiment of the present invention.

FIG. 5C is a view showing the workflow of the plant management system 200 according to this example embodiment. Note that FIG. 5C shows an overall workflow using all constituent elements of the plant management system 200, and the workflow is different from a work workflow corresponding to each work to be described below. In addition, the workflow of the plant management system 200 is not limited to that shown in FIG. 5C.

In the workflow of the plant management system 200 shown in FIG. 5C, in task T501, the plant management system 200 instructs the terminal 220 of the operator 250 to do a monitoring work or an inspection work. In task T503, the plant management system 200 acquires the position information of the terminal 220 of the operator 250 on work-site. In task T505, the plant management system 200 acquires an image of the measurement target corresponding to the position information of the terminal 220 of the operator 250 as a 3D image generated from an image captured by the camera of the terminal 220 or from the data of the plant structure. In task T507, the plant management system 200 acquires the measurement position of the measurement target corresponding to the operator sensor 260 held by the operator 250 from the measurement position database 211.

In task T509, the plant management system 200 superimposes the measurement position on the image of the measurement target and presents it on the terminal 220. If necessary, in task T511, the plant management system 200 presents past sensor information or sensor information in a normal state on the terminal 220. In task T513, the plant management system 200 acquires sensor information at the position of the measurement target to be measured from the operator sensor 260 held by the operator 250.

In task T515, the plant management system 200 waits for confirming whether the acquisition of the sensor information at the position to be measured from the operator sensor 260 in task T513 is correct detection or a detection error. The confirmation of the measurement may be executed by activating new workflow. If the confirmation of the measurement is obtained, in task T517, the plant management system 200 accumulates the sensor information in association with the sensor ID of the operator sensor 260 and the measurement position.

(Operation Sequence)

Figure 6:
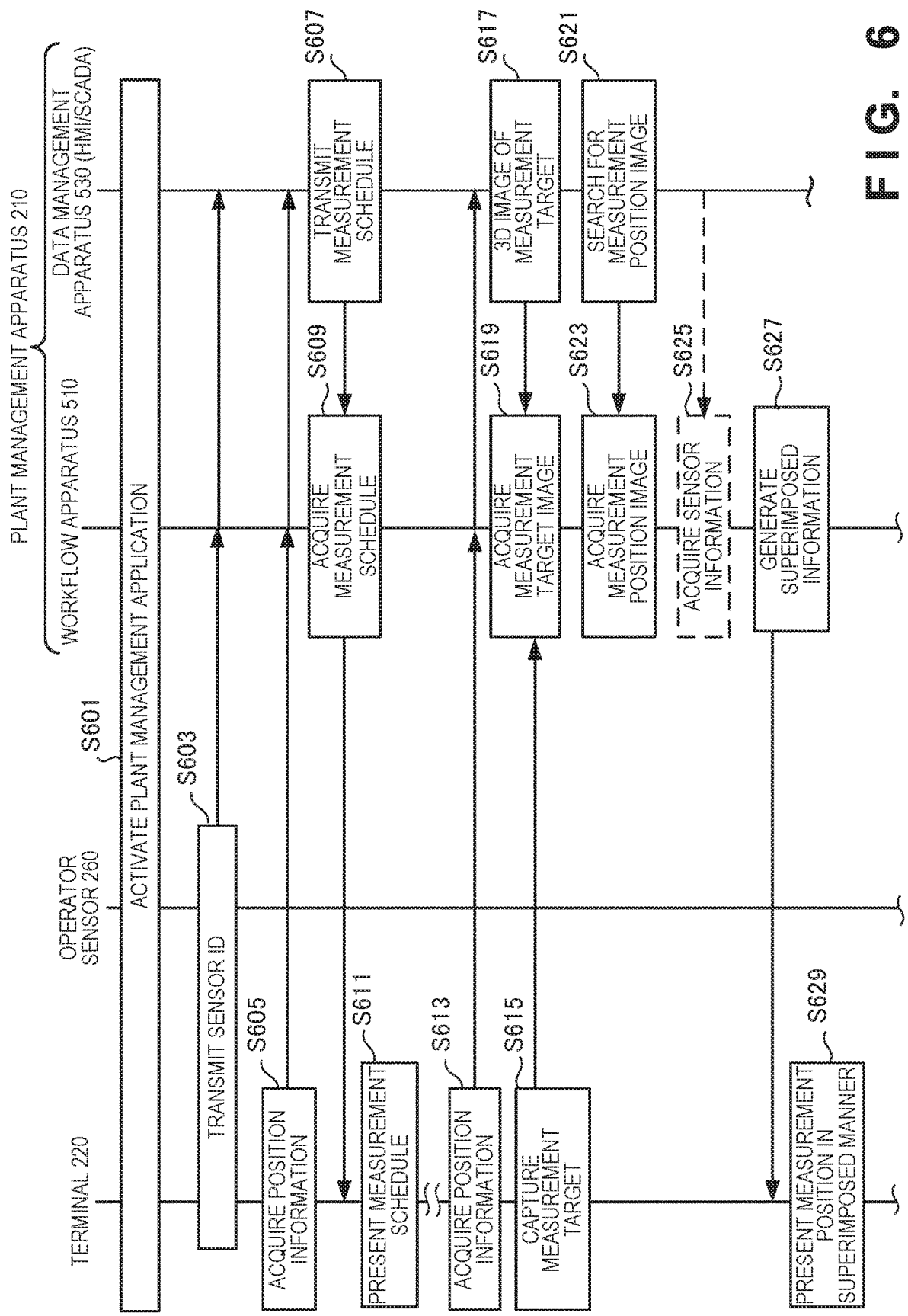
FIG. 6 is a sequence chart showing the operation procedure of the plant management system according to the second example embodiment of the present invention.

FIG. 6 is a sequence chart showing the operation procedure of the plant management system 200. FIG. 6 shows the operation procedure of superimposition presentation in which the image of the measurement position is superimposed on the image of the measurement based on the position information of the terminal corresponding to FIG. 4.

In step S601, the terminal 220, the sensor 230, and the workflow apparatus 510 and the data management apparatus 530 included in the plant management apparatus 210 activate a plant management application for each other. Note that the plant management application need not be one program and may be formed by a plurality of program tool groups. In this case, not all the constituent units need activate the plant management application simultaneously, and each unit activates the plant management application when entering the plant management system 200. For example, the terminal 220 performs login to be connected to the plant management apparatus 210, and the plant management apparatus 210 accepts the login and registers it.

In step S603, the operator sensor 260 or the terminal 220 transmits the sensor ID of the operator sensor 260 to the workflow apparatus 510 and the data management apparatus 530 in the plant management apparatus 210. In step S605, the terminal 220 acquires current position information and transmits it to the workflow apparatus 510 and the data management apparatus 530 in the plant management apparatus 210. In step S607, the data management apparatus 530 refers to the current position information from the terminal 220, searches for measurement schedules, and transmits them to the workflow apparatus 510. In step S609, when the measurement schedules are acquired, the workflow apparatus 510 refers to the sensor ID of the operator sensor 260, and transmits a measurement schedule associated with the operator sensor 260 to the terminal 220. In step S611, the terminal 220 presents the received measurement schedule associated with the operator sensor 260 to the operator 250. Note that although the measurement schedule associated with the operator sensor 260 is selected by the workflow apparatus 510, the measurement schedule may be selected by the data management apparatus 530 by referring to the sensor ID of the operator sensor 260.

When the operator 250 refers to the presented measurement schedule associated with the operator sensor 260 and arrives at the place of the measurement target, in step S613, the terminal 220 acquires current position information and transmits it to the workflow apparatus 510 and the data management apparatus 530 in the plant management apparatus 210. Additionally, when superimposing the measurement position on a captured image of the measurement target, in step S615, the terminal 220 captures the measurement target by the camera and transmits the image to the workflow apparatus 510. On the other hand, when superimposing the measurement position on a generated 3D image of the measurement target, in step S617, the data management apparatus 530 searches for the 3D plant image of the measurement target corresponding to the position information from the terminal 220 and transmits it to the workflow apparatus 510. In step S619, the workflow apparatus 510 acquires the image of the measurement target. In step S621, the data management apparatus 530 searches for an image of the measurement position of the measurement target corresponding to the position information from the terminal 220, and transmits it to the workflow apparatus 510. In step S623, the workflow apparatus 510 acquires the image of the measurement position of the measurement target. As an option, in step S625, the workflow apparatus 510 may acquire sensor information in the past or in a normal state corresponding to the sensor ID of the operator sensor 260 and the measurement position from the data management apparatus 530.

In step S627, the workflow apparatus 510 superimposes the image of the measurement position on the image of the measurement target, and if necessary, superimposes the sensor information in the past or in a normal state, and transmits the image to the terminal 220 of the operator 250. In step S629, the terminal 220 of the operator 250 receives the superimposed image and presents it to the operator 250. Note that if the terminal 220 is an optical see-through HMD, the image is presented on the optical see-through HMD such that the image of the measurement position is superimposed on the real measurement target.

Note that subsequent detection processing by the operator 250 using the operator sensor 260 is not illustrated in FIG. 6.

«Workflow Apparatus»

The arrangement and operation of the workflow apparatus 510 according to this example embodiment will be described with reference to FIGS. 7A to 8C. Note that the arrangement and operation for implementing this example embodiment will be explained below concerning the alarm transmitter/receiver 511 and the workflow controller 512 of the workflow apparatus 510.

«Alarm Transmitter/Receiver»

Figure 7A:
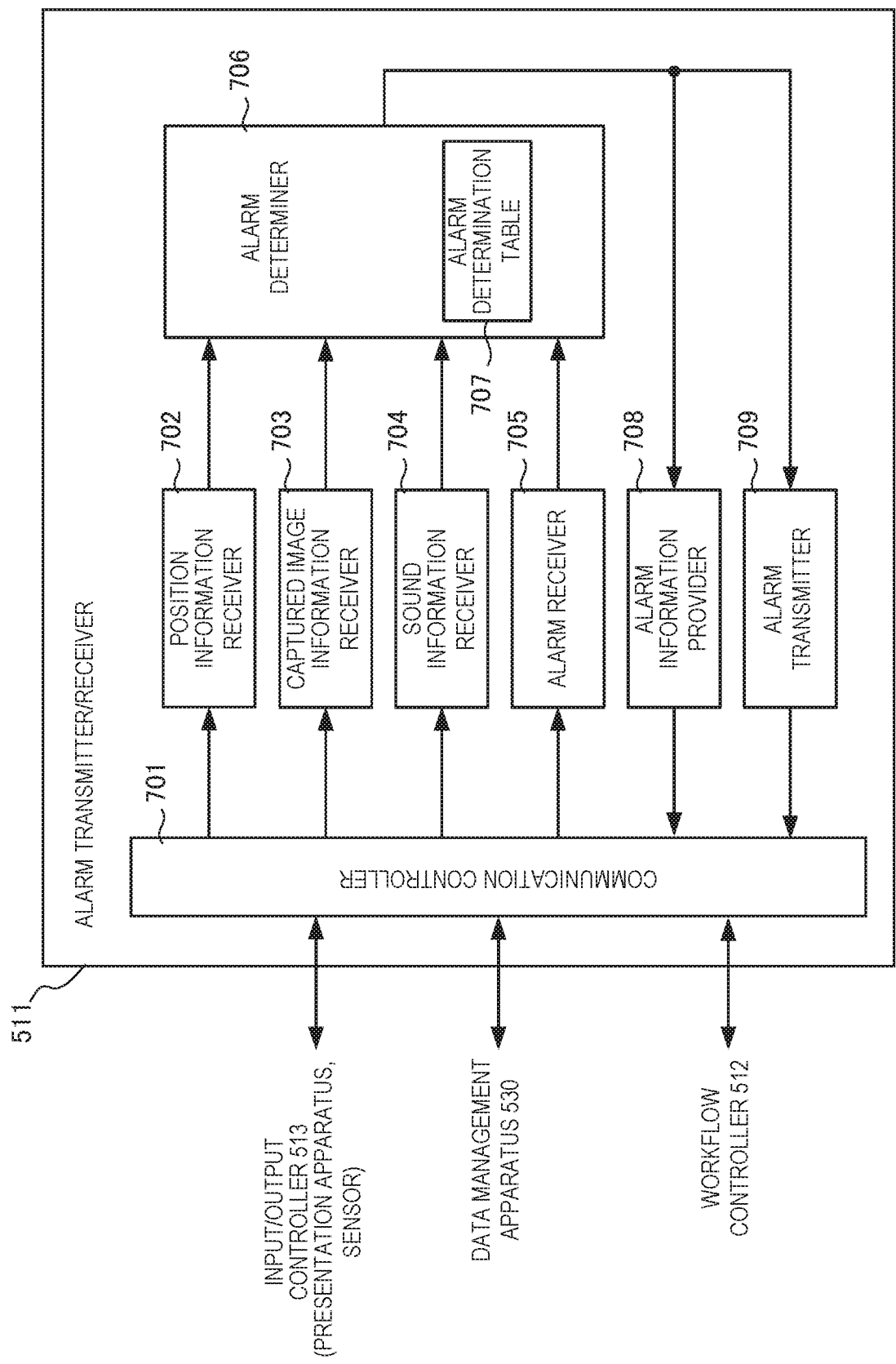
FIG. 7A is a block diagram showing the functional arrangement of an alarm transmitter/receiver according to the second example embodiment of the present invention.

FIG. 7A is a block diagram showing the functional arrangement of the alarm transmitter/receiver 511 according to this example embodiment. The alarm transmitter/receiver 511 includes a function of receiving an externally generated alarm and transmitting an alarm to the outside. In this example embodiment, the alarm transmitter/receiver 511 determines the position information of the terminal 220 or image information or sound information from the terminal 220 as reception of an alarm and makes, for the workflow controller 512, an alarm instruction to activate a workflow to present a measurement target map corresponding to the operator sensor or the measurement position of the measurement target to be measured by the operator sensor on the terminal 220.

The alarm transmitter/receiver 511 includes a communication controller 701, a position information receiver 702, a captured image information receiver 703, a sound information receiver 704, an alarm receiver 705, and an alarm determiner 706. The alarm determiner 706 includes an alarm determination table 707. The alarm transmitter/receiver 511 further includes an alarm information provider 708 and an alarm transmitter 709.

The communication controller 701 controls communication with the workflow controller 512 and the input/output controller 513 in the same workflow apparatus 510. In addition, the communication controller 701 controls communication with the data management apparatus 530. The position information receiver 702 receives, from the terminal 220, the position information of the terminal 220 via the input/output controller 513 and the communication controller 701. The captured image information receiver 703 receives, from the terminal 220, image capturing information captured by the terminal 220 via the input/output controller 513 and the communication controller 701. The sound information receiver 704 receives, from the terminal 220, sound information recorded by the terminal 220 via the input/output controller 513 and the communication controller 701. The alarm receiver 705 receives various alarms from the constituent elements of the plant management system 200 via the communication controller 701.

The alarm determiner 706 determines alarm contents or an alarm destination by the alarm determination table 707 based on the pieces of information received by the receivers 702 to 705. The alarm information provider 708 provides information alarm-determined by the alarm determiner 706 to the alarm destination. In this example embodiment, position information, image capturing information, sound information, and the like are provided to the workflow controller 512 as the alarm destination. The alarm transmitter 709 transmits an alarm signal or an alarm type to the alarm destination. In this example embodiment, the alarm transmitter 709 instructs the workflow controller 512 to activate a workflow, and the alarm information provider 708 provides conditions such as position information, image capturing information, and sound information to select a workflow to the workflow controller 512.

(Alarm Determination Table)

Figure 7B:
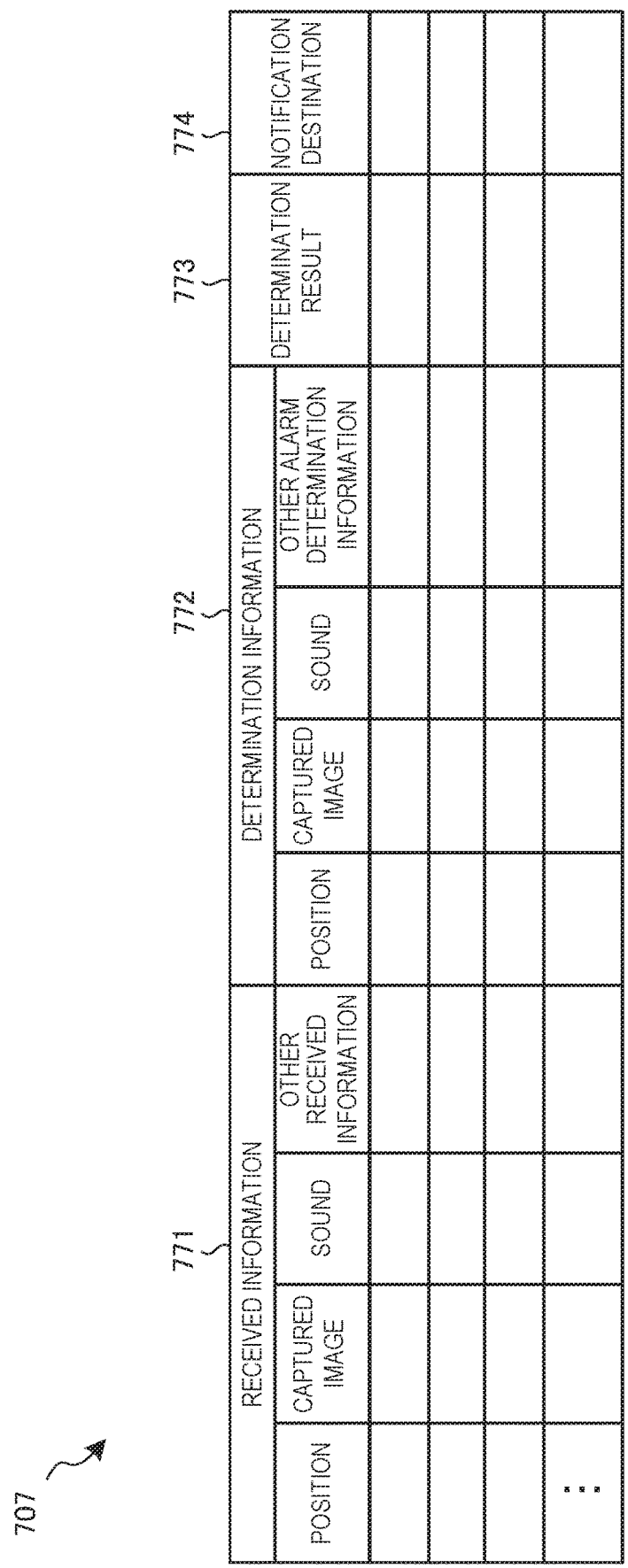
FIG. 7B is a view showing the arrangement of an alarm determination table according to the second example embodiment of the present invention.

FIG. 7B is a view showing the arrangement of the alarm determination table 707 according to this example embodiment. The alarm determination table 707 is used to determine, based on the information received by the alarm determiner 706, whether to output an alarm signal and where to output it.

The alarm determination table 707 stores received information 771, determination information 772 for determining whether the received information corresponds to alarm transmission, a determination result 773 representing whether to transmit an alarm, and an alarm notification destination 774 for alarm transmission. The received information 771 includes position information, captured image information, sound information, and other received information. The determination information 772 includes determination conditions to determine whether information is position information from the terminal 220, captured image information from the terminal 220, or sound information from the terminal 220.

(Operation Procedure)

Figure 7C:
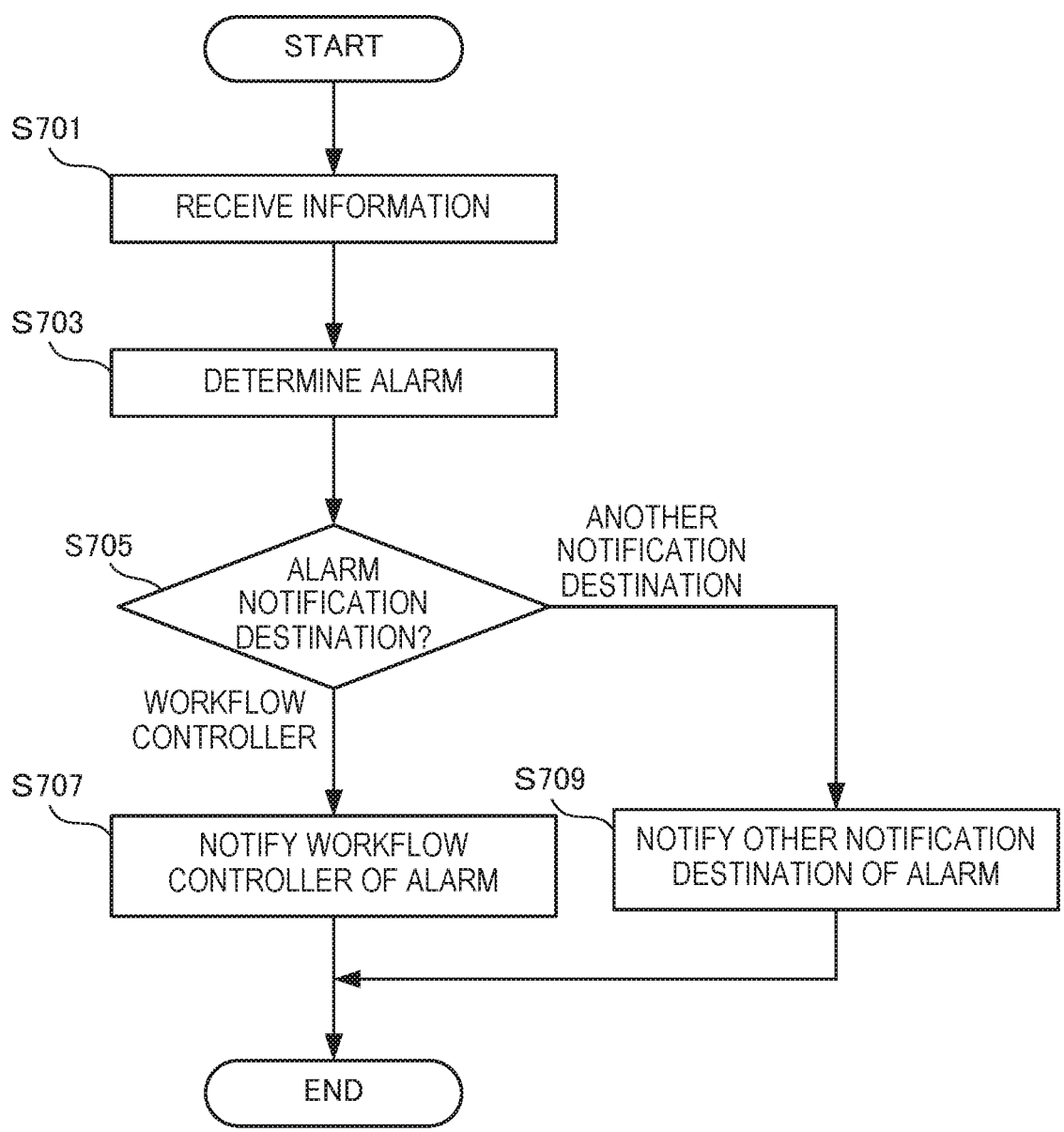
FIG. 7C is a flowchart showing the operation procedure of the alarm transmitter/receiver according to the second example embodiment of the present invention.

FIG. 7C is a flowchart showing the operation procedure of the alarm transmitter/receiver 511 according to this example embodiment. The processor of the workflow apparatus 510 or the alarm transmitter/receiver 511 executes this flowchart using the memory, and as a result, the functional components shown in FIG. 7A are obtained. In the following explanation, the flowchart is executed by the processor of the workflow apparatus 510.

In step S701, the workflow apparatus 510 receives information. In step S703, the workflow apparatus 510 determines, based on the received information, whether to transmit an alarm. In this example embodiment, it is determined whether the received information is position information, image capturing information, or sound information from the terminal 220. If the condition is satisfied, an alarm to communicate activation of a workflow is transmitted to the workflow controller 512.

In step S705, the workflow apparatus 510 determines whether the notification destination of the alarm is the workflow controller 512 or another notification destination. If the notification destination of the alarm is the workflow controller 512, the workflow apparatus 510 notifies the workflow controller 512 of the alarm signal and the received information in step S707. On the other hand, if the notification destination is the other notification destination, the workflow apparatus 510 notifies the other notification destination of the alarm in step S709.

«Workflow Controller»

Figure 8A:
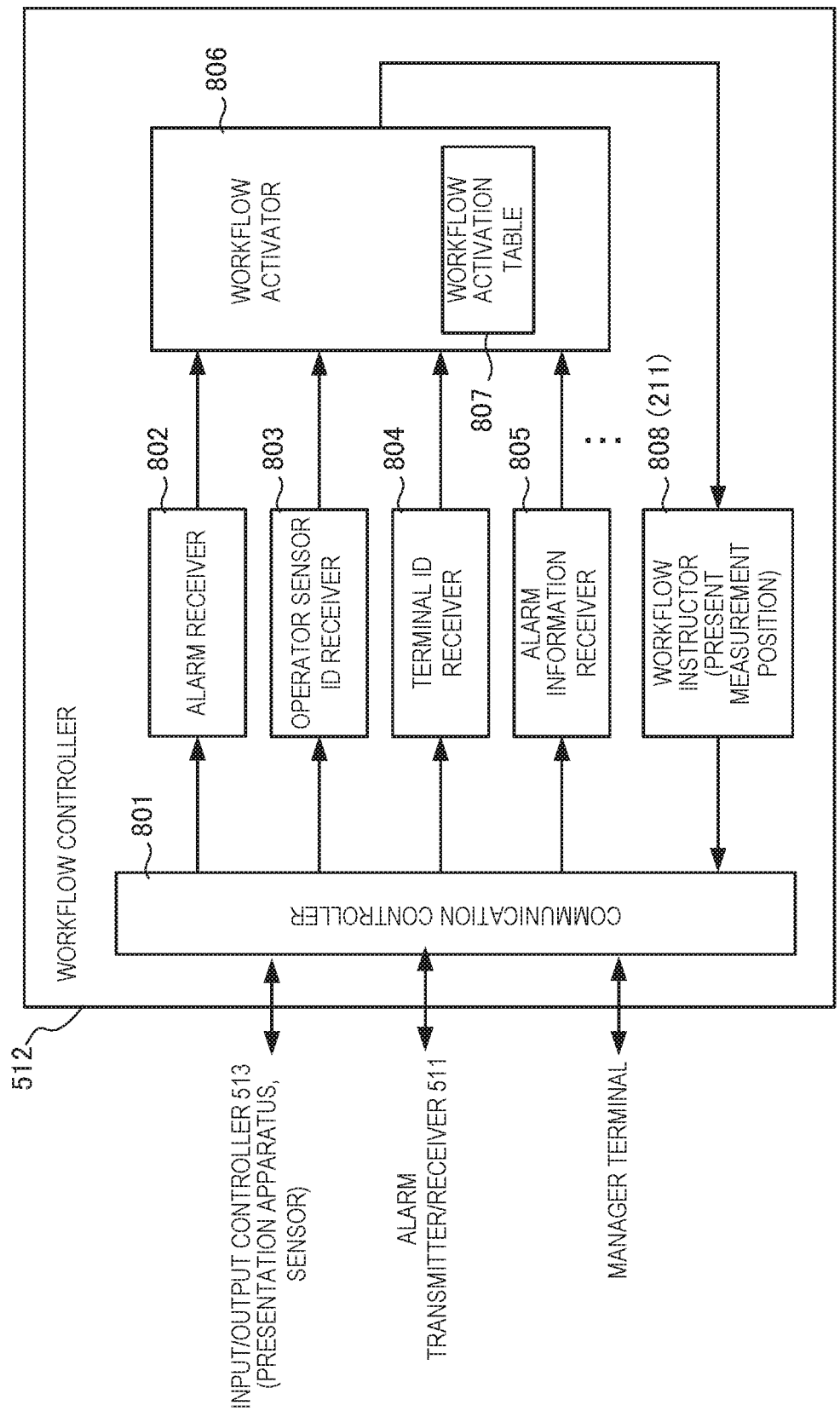
FIG. 8A is a block diagram showing the functional arrangement of a workflow controller according to the second example embodiment of the present invention.

FIG. 8A is a block diagram showing the functional arrangement of the workflow controller 512 according to this example embodiment. The workflow controller 512 controls a workflow according to a predetermined notation or standard, for example, ISA-95. In this example embodiment, the workflow controller 512 receives an alarm to function a workflow from the alarm transmitter/receiver 511 with the position information of the terminal 220 or image information or sound information from the terminal 220 and activates a corresponding workflow. In this example embodiment, particularly, in a case of a workflow that superimposes the position of the measurement target to be measured on image information from the terminal 220 and presents it to the operator 250 based on the position information of the terminal 220, the sensor ID of the operator sensor 260 is used.

The workflow controller 512 includes a communication controller 801, an alarm receiver 802, an operator sensor ID receiver 803, a terminal ID receiver 804, an alarm information receiver 805, and a workflow activator 806. The workflow activator 806 includes a workflow activation table 807. The workflow controller 512 further includes a workflow instructor 808. An instruction by the workflow instructor 808 implements processing of the measurement position provider 212.

The communication controller 801 controls communication with the alarm transmitter/receiver 511 and the input/output controller 513 in the same workflow apparatus 510. In addition, the communication controller 801 controls communication with the manager terminal in the management center. The alarm receiver 802 receives an alarm according to this example embodiment from the alarm transmitter/receiver 511. The operator sensor ID receiver 803 receives the sensor ID of the operator sensor 260 to select and present the measurement position in the database. The terminal ID receiver 804 receives the terminal ID of a terminal that presents the measurement position in a superimposed manner. The alarm information receiver 805 receives alarm information (parameters used in the activated workflow) transmitted by the alarm information provider 708 of the alarm transmitter/receiver 511.

The workflow activator 806 selects a workflow to be activated and parameters to be used by the workflow activation table 807 based on the pieces of information received by the receivers 802 to 805. The workflow instructor 808 instructs a corresponding component in the plant management system 200 to activate the workflow selected by the workflow activator 806 using the parameters. In this example embodiment, a workflow corresponding to the alarm information is selected from workflows for presenting the measurement position on the terminal 220 of the operator 250 based on the pieces of information received by the receivers 802 to 805 and activated while adding the operator sensor ID, the terminal ID, and the alarm information as parameters.

(Workflow Activation Table)

Figure 8B:
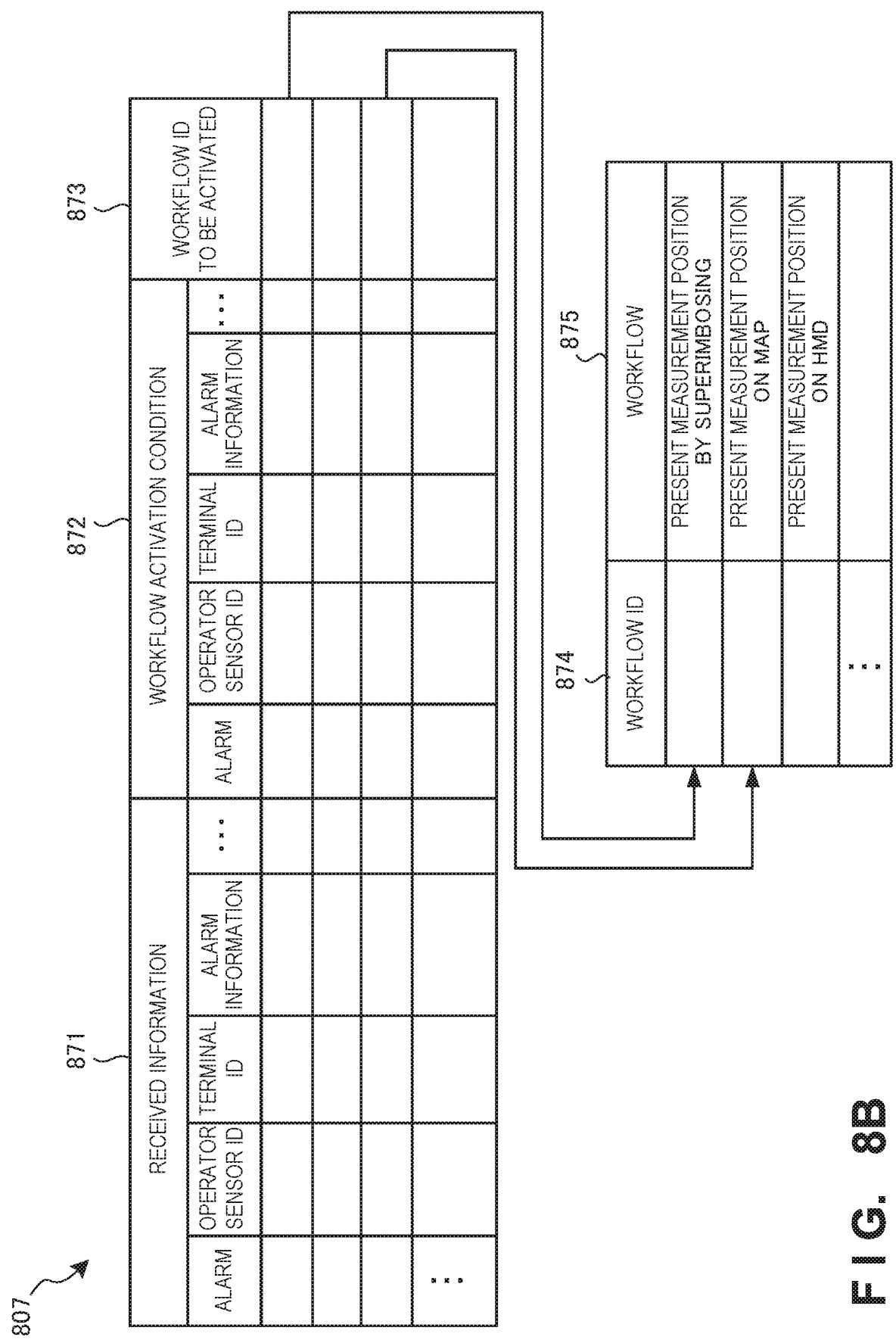
FIG. 8B is a view showing the arrangement of a workflow activation table according to the second example embodiment of the present invention.

FIG. 8B is a view showing the arrangement of the workflow activation table 807 according to this example embodiment. The workflow activation table 807 is used to select a workflow to be activated from an alarm received from the alarm transmitter/receiver 511 and each received information.

The workflow activation table 807 stores a workflow ID 873 to be activated, which is selected based on received information 871 and a workflow activation condition 872. In addition, the workflow ID 873 to be activated is instructed as a pointer, and a workflow 875 is selected from the table that stores a workflow ID 874 and the workflow 875 are stored in in association. The received information 871 includes the received alarm, operator sensor ID, terminal ID, and alarm information. In addition, the workflow activation condition 872 includes the alarm, operator sensor ID, terminal ID, and alarm information as conditions to select a workflow to be activated from the received information 871.

(Operation Procedure)

Figure 8C:
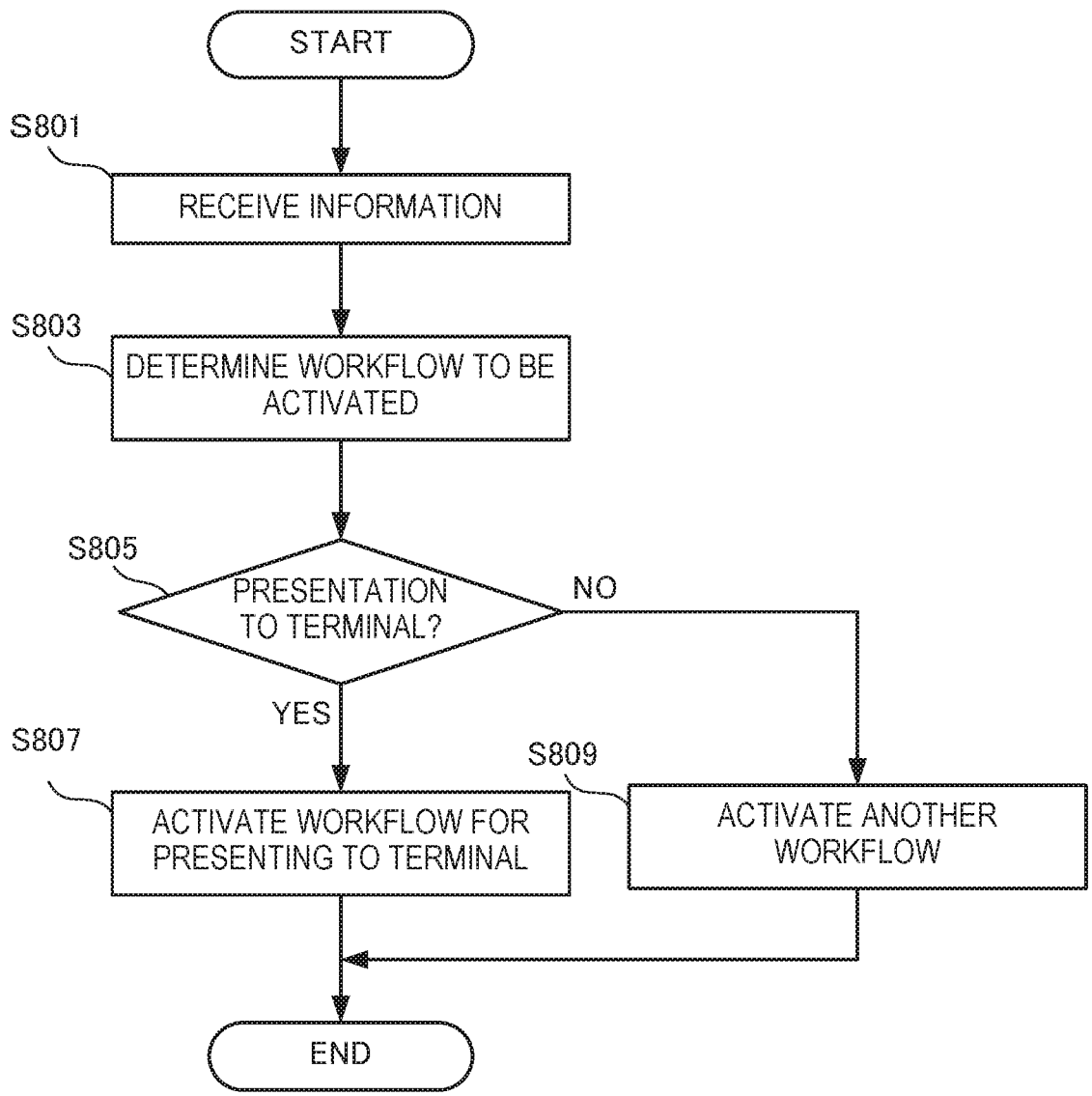
FIG. 8C is a flowchart showing the operation procedure of the workflow controller according to the second example embodiment of the present invention.

FIG. 8C is a flowchart showing the operation procedure of the workflow controller 512 according to this example embodiment. The processor of the workflow apparatus 510 or the workflow controller 512 executes this flowchart using the memory, and as a result, the functional components shown in FIG. 8A are obtained. In the following explanation, the flowchart is executed by the processor of the workflow apparatus 510.

In step S801, the workflow apparatus 510 receives information. In step S803, the workflow apparatus 510 determines a workflow to be activated based on the received information. In this example embodiment, a workflow group for presenting the image of the measurement position on the image of the measurement target in a superimposed manner on the terminal is selected based on a received alarm. Then, workflows corresponding to the processing contents or presentation format are selected based on the operator sensor ID and the terminal ID. Furthermore, the workflows may be narrowed down to a workflow corresponding to the presentation method based on alarm information including position information, image capturing information, or sound information.

In step S805, the workflow apparatus 510 determines whether the selected workflow is presentation of the measurement position superimposed on the image of the measurement target to the terminal. If the selected workflow is presentation of the measurement position to the terminal, the workflow apparatus 510 activates the workflow for presenting the measurement position on the terminal on work-site in step S807. On the other hand, if the selected workflow is another workflow, the workflow apparatus 510 activates the other workflow in step S809.

«Data Accumulation Analysis Apparatus»

The arrangement and operation of the data management apparatus 530 according to this example embodiment will be described with reference to FIGS. 9A to 9C.

«Data Accumulator»

Figure 9A:
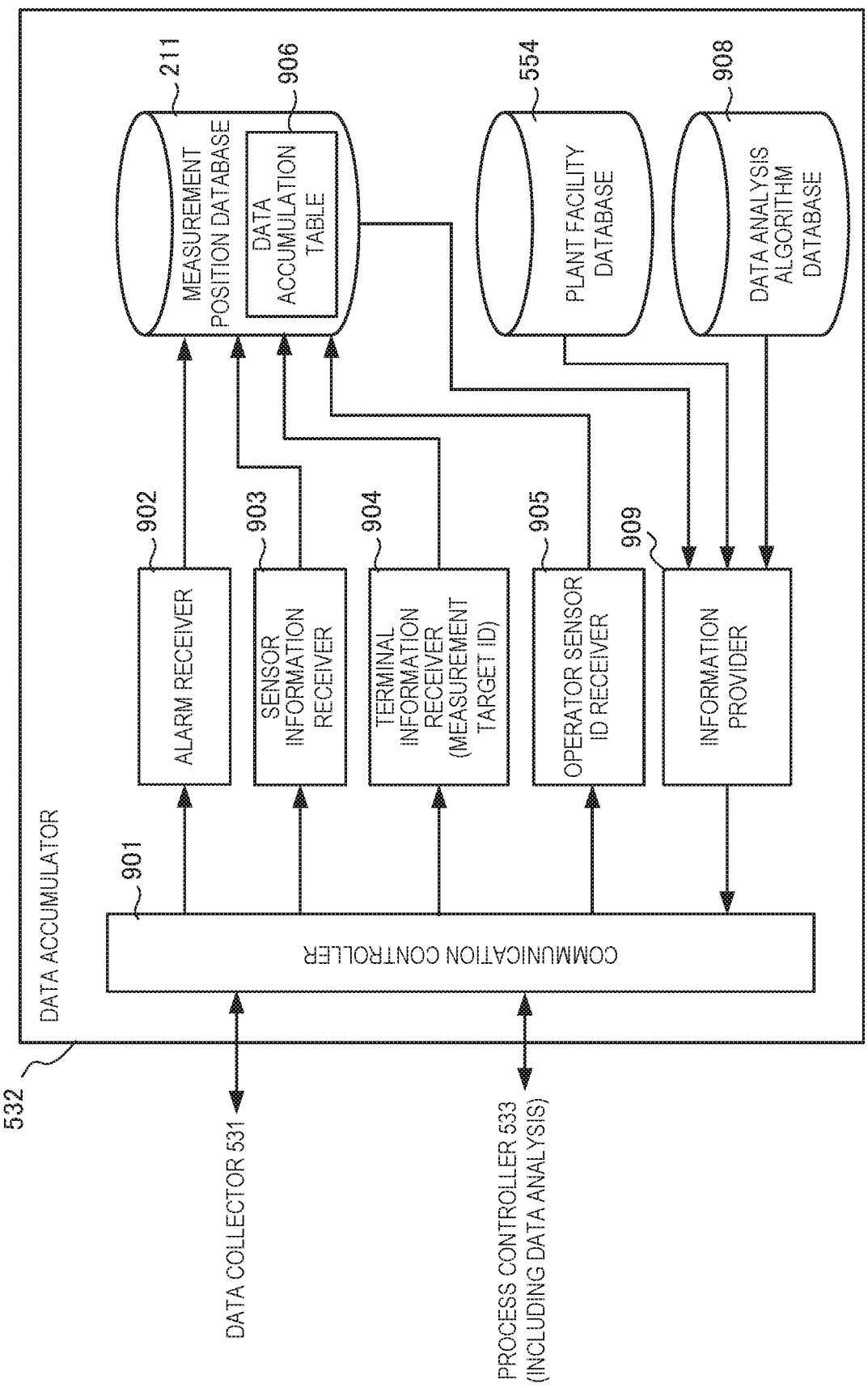
FIG. 9A is a block diagram showing the functional arrangement of a data accumulator according to the second example embodiment of the present invention.

FIG. 9A is a block diagram showing the functional arrangement of the data accumulator 532 according to this example embodiment. The data accumulator 532 is located in the data management apparatus 530 and accumulates data collected by the data collector 531. In this example embodiment, the measurement schedule, the plant structure of the measurement target, the position of the measurement to be measured, and the like are stored in the measurement position database 211 in correspondence with the position information of the terminal or the operator sensor ID, and used to generate a superimposed image in which the position to be measured is superimposed on the image of the measurement target.

The data accumulator 532 includes a communication controller 901, an alarm receiver 902, a sensor information receiver 903, a terminal information receiver 904, an operator sensor ID receiver 905, and the measurement position database 211. The measurement position database 211 includes a data accumulation table 906. The data accumulator 532 further includes the plant facility database 554, a data analysis algorithm database 908, and an information provider 909.

The communication controller 901 controls communication with the data collector 531 and the process controller 533 in the same data management apparatus 530. The alarm receiver 902 receives an alarm generated by the plant management system 200. The sensor information receiver 903 receives sensor information detected by the operator sensor in association with a sensor ID. The terminal information receiver 904 receives terminal information acquired and transmitted by each terminal. The terminal information includes the position information of the terminal and a measurement target ID for identifying a measurement target located at that position. The operator sensor ID receiver 905 receives a sensor ID for identifying the operator sensor 260 to search for the measurement position of the measurement target corresponding to the operator sensor.

The measurement position database 211 stores the measurement schedule, the plant structure of the measurement target, the position of the measurement target to be measured, and the like in correspondence with the position information of the terminal or the operator sensor ID such that a search can be performed. The plant facility database 554 stores facility information forming the plant of the management target. The data analysis algorithm database 908 stores a data analysis algorithm that performs abnormality diagnosis or prediction or a maintenance operation while combining the sensor information accumulated in the sensor information database 412 with associated information. The information provider 909 acquires information necessary for presentation of the measurement position superimposed on the measurement target, 3D plant image generation from plant facility information, or data analysis by the process controller 533 from the database 211, 554, or 908 and provides the information.

(Data Accumulation Table)

Figure 9B:
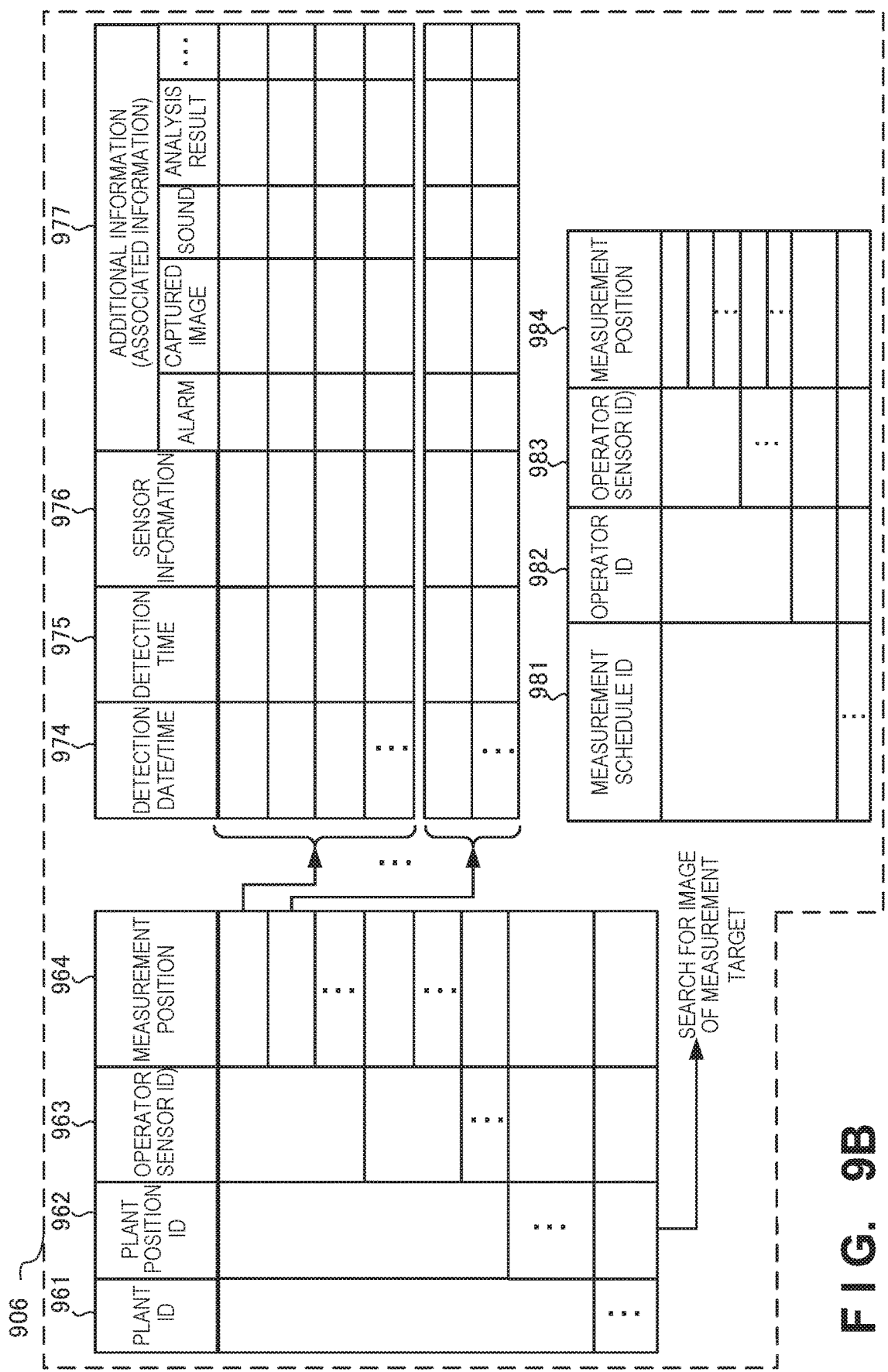
FIG. 9B is a view showing the arrangement of a data accumulation table according to the second example embodiment of the present invention.

FIG. 9B is a view showing the arrangement of the data accumulation table 906 according to this example embodiment. The data accumulation table 906 is used to store the measurement schedule, the plant structure of the measurement target, the position of the measurement target to be measured, and the like in correspondence with the position information of the terminal or the operator sensor ID such that a search can be performed.

The data accumulation table 906 stores plant position IDs 962 of a plurality of partial plants in correspondence with each plant ID 961. An ID 963 of the operator sensor 260 carried by the operator 250 for detection is stored in correspondence with each plant position ID 962. A measurement position 964 that is the position to be measured by the operator sensor 260 at each plant position (measurement target) is stored.

A plurality of detection dates/times 974 are stored in association with each measurement position 964. A detection time 975, detected sensor information 976, and additional information 977 including associated information are stored in association with each detection date/time 974. The additional information 977 includes alarm information at the time of acquisition of the sensor information 976, a captured image or a sound acquired by the terminal on work-site as associated information, or an analysis result based on the currently detected sensor information 976 or accumulated past sensor information, and the like.

In addition, the data accumulation table 906 stores a measurement position 984 in correspondence with the combination of a measurement schedule ID 981 for identifying a measurement schedule, an operator ID 982, and an operator sensor ID 983. Note that in some cases, the operator ID 982 need not be considered.

(Operation Procedure)

Figure 9C:
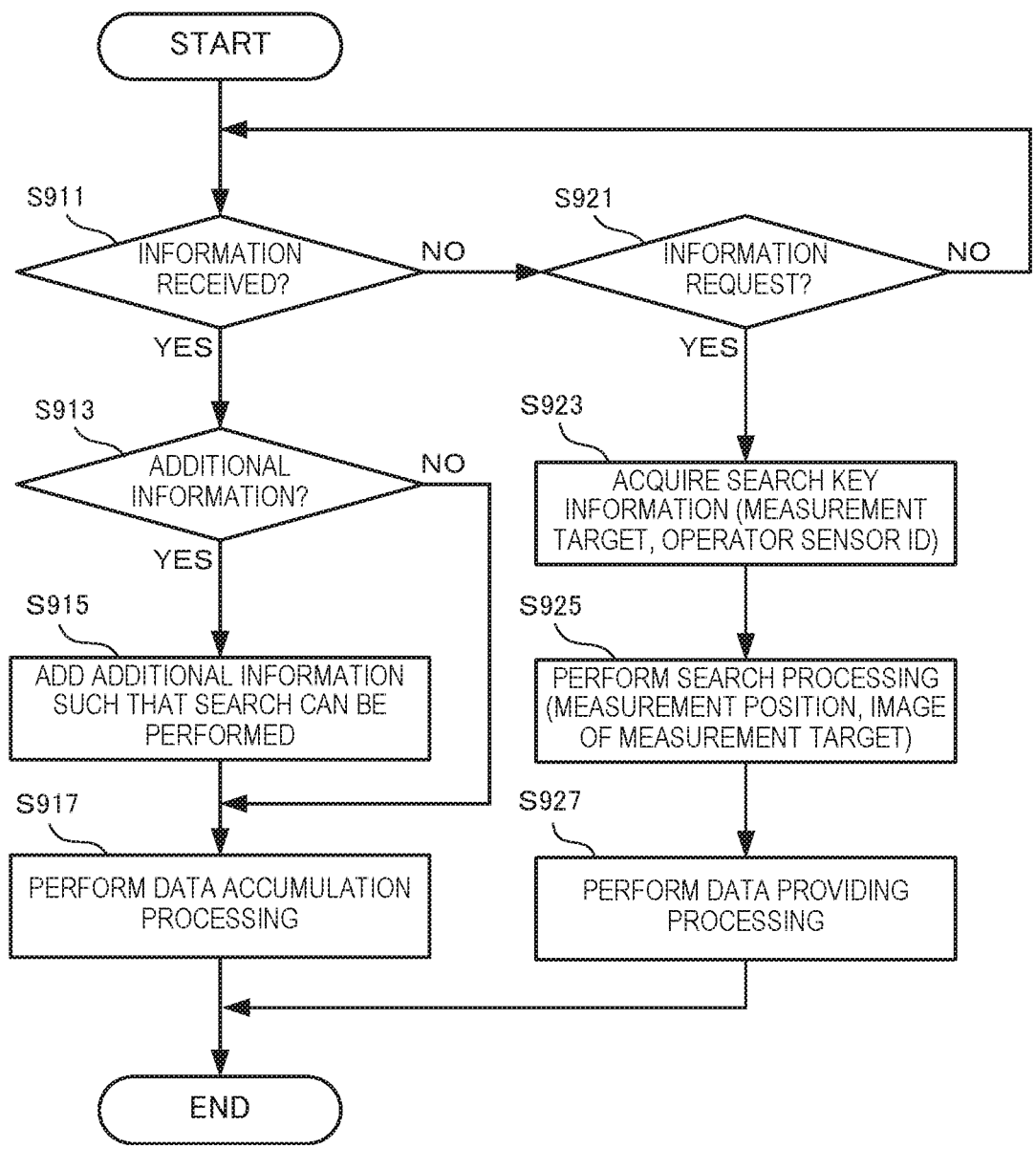
FIG. 9C is a flowchart showing the operation procedure of the data accumulator according to the second example embodiment of the present invention.

FIG. 9C is a flowchart showing the operation procedure of the data accumulator 532 according to this example embodiment of the present invention. The processor of the data management apparatus 530 or the data accumulator 532 executes this flowchart using the memory, and as a result, the functional components shown in FIG. 9A are obtained. In the following explanation, the flowchart is executed by the processor of the data management apparatus 530.

In step S911, the data management apparatus 530 determines whether information is received. If information is received, in step S913, the data management apparatus 530 determines whether additional information such as associated information associated with sensor information exists. If additional information exists, in step S915, the data management apparatus 530 adds the additional information such as associated information to the sensor information such that a search and analysis can be performed. In step S917, the data management apparatus 530 accumulates the sensor information or the sensor information to which the additional information is added in the sensor information database 412 using a format as shown in FIG. 9B.

On the other hand, if information is not received, in step S921, the data management apparatus 530 determines whether an information request from another apparatus or another functional component in the plant management system 200 is received. If an information request is received, in step S923, the data management apparatus 530 acquires, from the information request source, a search key such as a measurement target or an operator sensor used to search the measurement position database 211 for the measurement position to be superimposed on the measurement target and determined from the position information of the terminal. In step S925, the data management apparatus 530 searches the measurement position database 211 for the data using the acquired search key. In step S927, the data management apparatus 530 provides the found data to the information request source.

In this example embodiment, in response to a request from the workflow that is controlled by the workflow controller 512 and presents a measurement position on a measurement target in a superimposed manner, the measurement position to be presented in the superimposed manner on the measurement target corresponding to the terminal position is searched for and provided. In this case, if the workflow is a workflow for superimposing the measurement position on a captured image of the plant, the image of the measurement position is provided. Alternatively, if the workflow is a workflow for presenting an image on an optical see-through HMD, plant structure information is provided for 3D image generation.

«Workflow»

Figure 10:
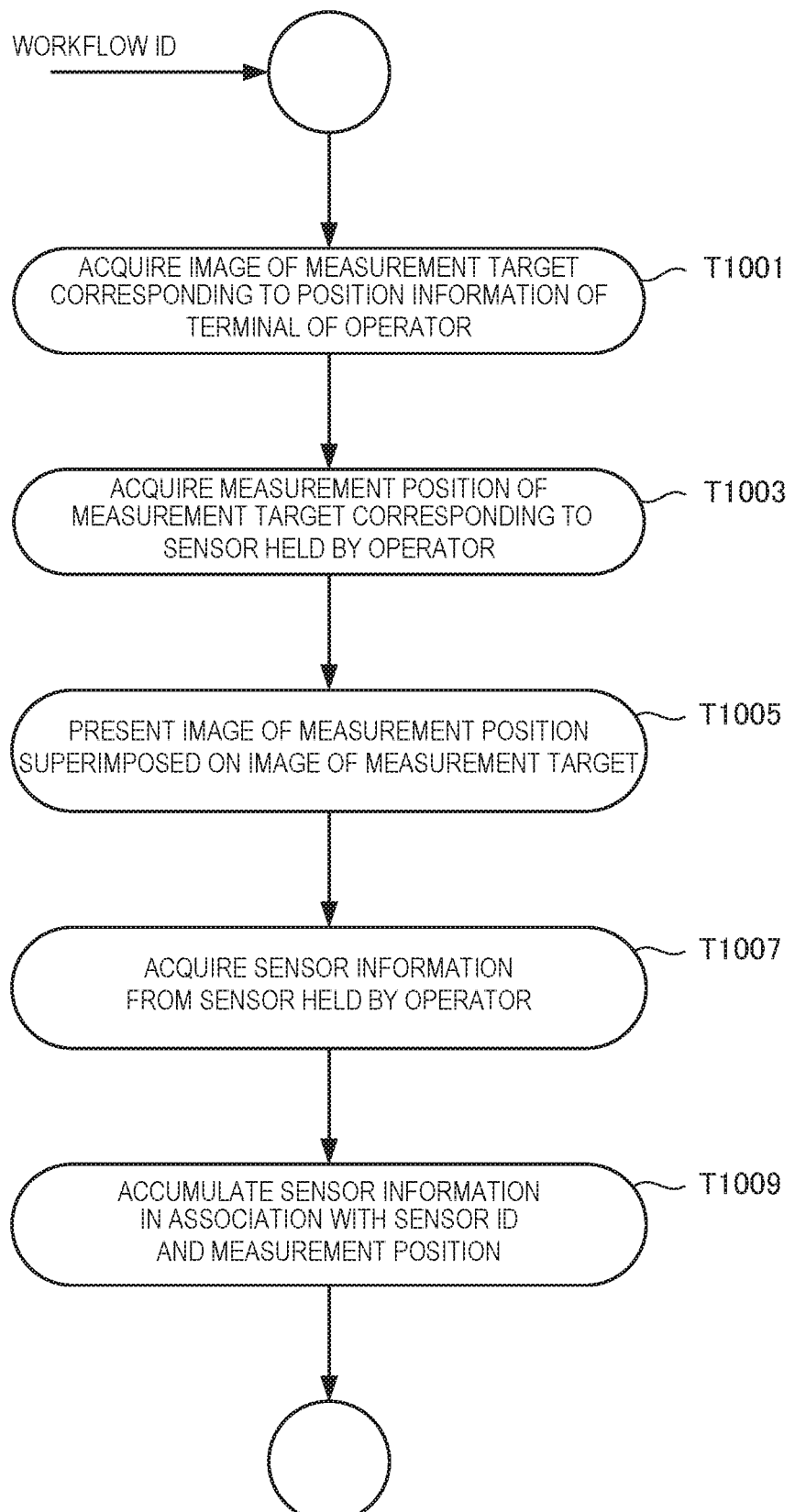
FIG. 10 is a view showing the workflow of a work according to the second example embodiment of the present invention.

FIG. 10 is a view showing the workflow of a work according to this example embodiment. Note that the workflow shown in FIG. 10 is a new workflow that describes a processing portion for presenting an image of a measurement position superimposed on an image of a measurement target on the terminal on work-site in this example embodiment. The workflow to be described below indicates a work procedure executed by the workflow apparatus 510 using the constituent apparatuses or functional components of the plant management system. Note that FIG. 10 shows only minimum basic tasks of this example embodiment, and various tasks may be added.

In task T1001, the workflow apparatus 510 acquires an image of a measurement target corresponding to the position information of the terminal 220 carried by the operator 250 on work-site. In task T1003, the workflow apparatus 510 acquires the measurement position of the measurement target corresponding to the operator sensor 260 held by the operator 250. In task T1005, the workflow apparatus 510 superimposes the image of the measurement position on the image of the measurement target and presents it on the terminal 220 carried by the operator 250 on work-site.

In task T1007, the workflow apparatus 510 acquires sensor information from the operator sensor 260 that is set on the measurement target by the operator 250 on work-site with reference to the presentation of the measurement position. In task T1009, the workflow apparatus 510 accumulates the pieces of acquired information such as the sensor information and associated information from the terminal 220 in association with each other such that a search can be performed based on the sensor ID of the operator sensor 260 and the measurement position.

According to this example embodiment, the measurement position of the operator sensor on the work site is presented to the operator to more efficiently support the on work-site work of the operator who checks or maintains a structure such as a plant. The position to measure using a sensor configured to do measurement for the inspection of a plant or the like by the operator on work-site is thus correctly presented to the operator, thereby preventing a measurement error.

That is, since the operator can collect correct sensor information using the operator sensor on work-site, and a measurement position can flexibly be added or changed in consideration of the information of observation or experience of the operator, a suspicious point of abnormality can be more efficiently monitored.

Third Example Embodiment

A plant management system according to the third example embodiment of the present invention will be described next. The plant management system according to this example embodiment is different from the above-described second example embodiment in that a measurement position is projected and presented to an operator on a work site. As for the projection of the measurement position, the measurement position is preferably directly projected onto a measurement target in a plant. However, an image of the measurement target and an image of the measurement position may be projected in a superimposed manner onto a place where the operator can clearly recognize the position of the measurement target to be measured. Here, as the projection apparatus, a projection device such as a laser or a projection that performs projection is used. In addition, the measurement position may be projected from a wristband or goggles other than a device installed at a fixed position on a ceiling or the like. The rest of the components and operations is the same as in the second example embodiment. Hence, the same reference numerals denote the same components and operations, and a detailed description thereof will be omitted.

«Plant Management System»

The arrangement and operation of a plant management system 1100 according to this example embodiment will be described with reference to FIGS. 11A to 14.

(Operation Outline)

Figure 11A:
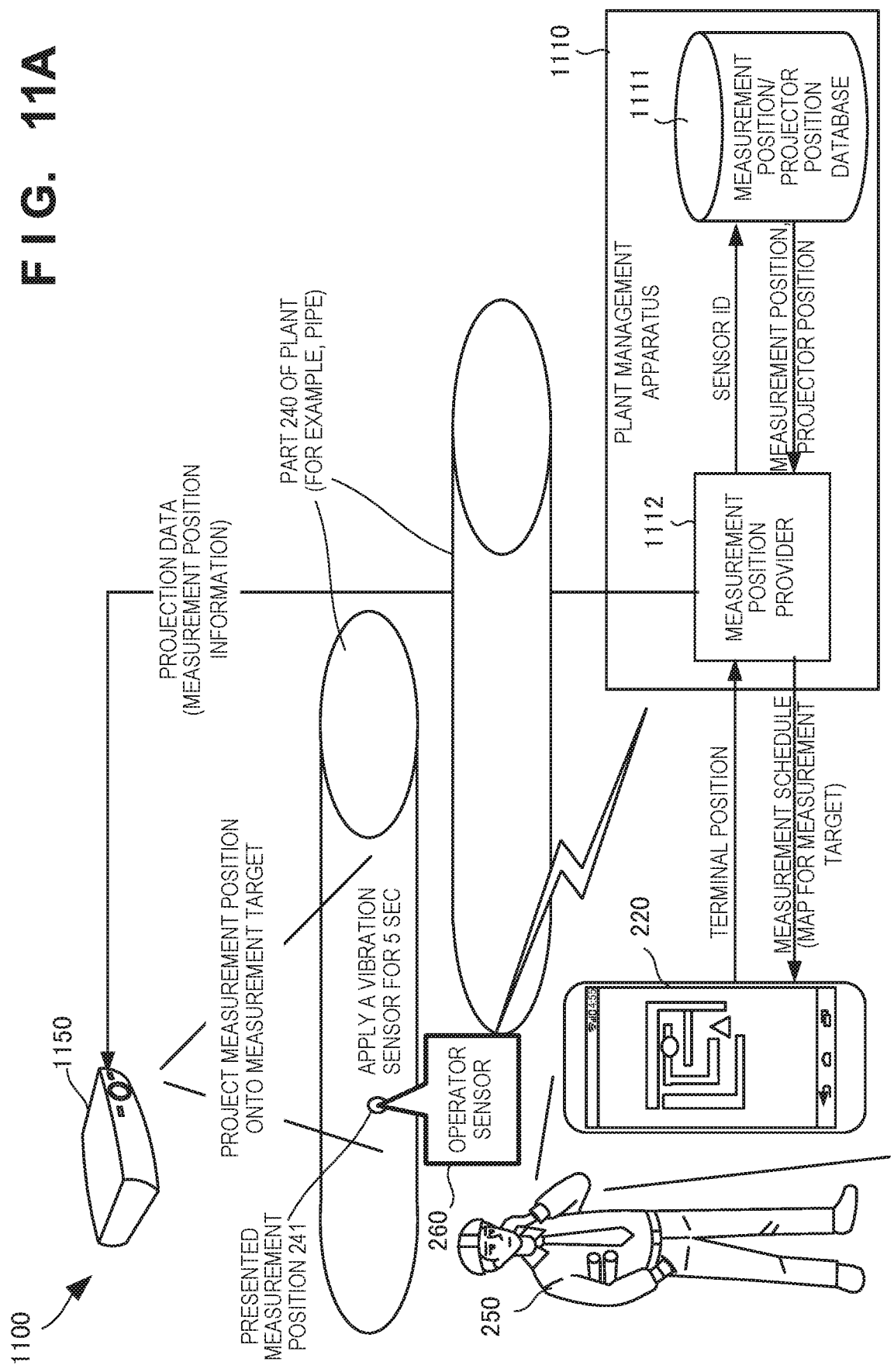
FIG. 11A is a view showing an operation outline of a plant management system according to the third example embodiment of the present invention.

FIG. 11A is a view showing an operation outline of the plant management system 1100 according to this example embodiment. Note that the same reference numerals as in FIG. 2A denote the same constituent elements in FIG. 11A, and a repetitive description thereof will be omitted.

Referring to FIG. 11A, the plant management apparatus 1110 includes a measurement position provider 1112 and a measurement position/projector position database 1111. When current position information is acquired from a terminal 220 carried by an operator 250 on work-site, the measurement position provider 1112 refers to an operator sensor 260 held by the operator 250, selects a measurement position of a measurement target to be measured by the operator sensor 260, and projects the measurement position from a projector serving as a presentation apparatus (projection device) 1150 to a part 240 of a plant as the measurement target. The measurement position/projector position database 1111 stores, together with the measurement position, the position of the projection device 1150 selected based on the current position information from the terminal 220 carried by the operator 250 on work-site. In FIG. 11A, a presented measurement position 241 and a message "apply a vibration sensor for 5 sec" to the operator 250 are projected on the part 240 of the plant.

FIG. 11B is a view showing another operation outline of the plant management system 1100 according to this example embodiment. Note that the same reference numerals as in FIG. 2A or 11A denote the same constituent elements in FIG. 11B, and a repetitive description thereof will be omitted.

Referring to FIG. 11B, the projector serving as the projection device 1150 superimposes a presented measurement position 1171 on an image 1140 of a part of the measurement target plant corresponding to the current position information of the terminal 220 on work-site and projects it onto a screen 1170. Note that in FIG. 11B, the presented measurement position 1171 is superimposed and projected on a captured image including the operator sensor 260 approaching the measurement position of the part 240 of the measurement target plant. It is possible to set the operator sensor 260 at the measurement position while performing confirmation.

(Functional Arrangement)

Figure 12:
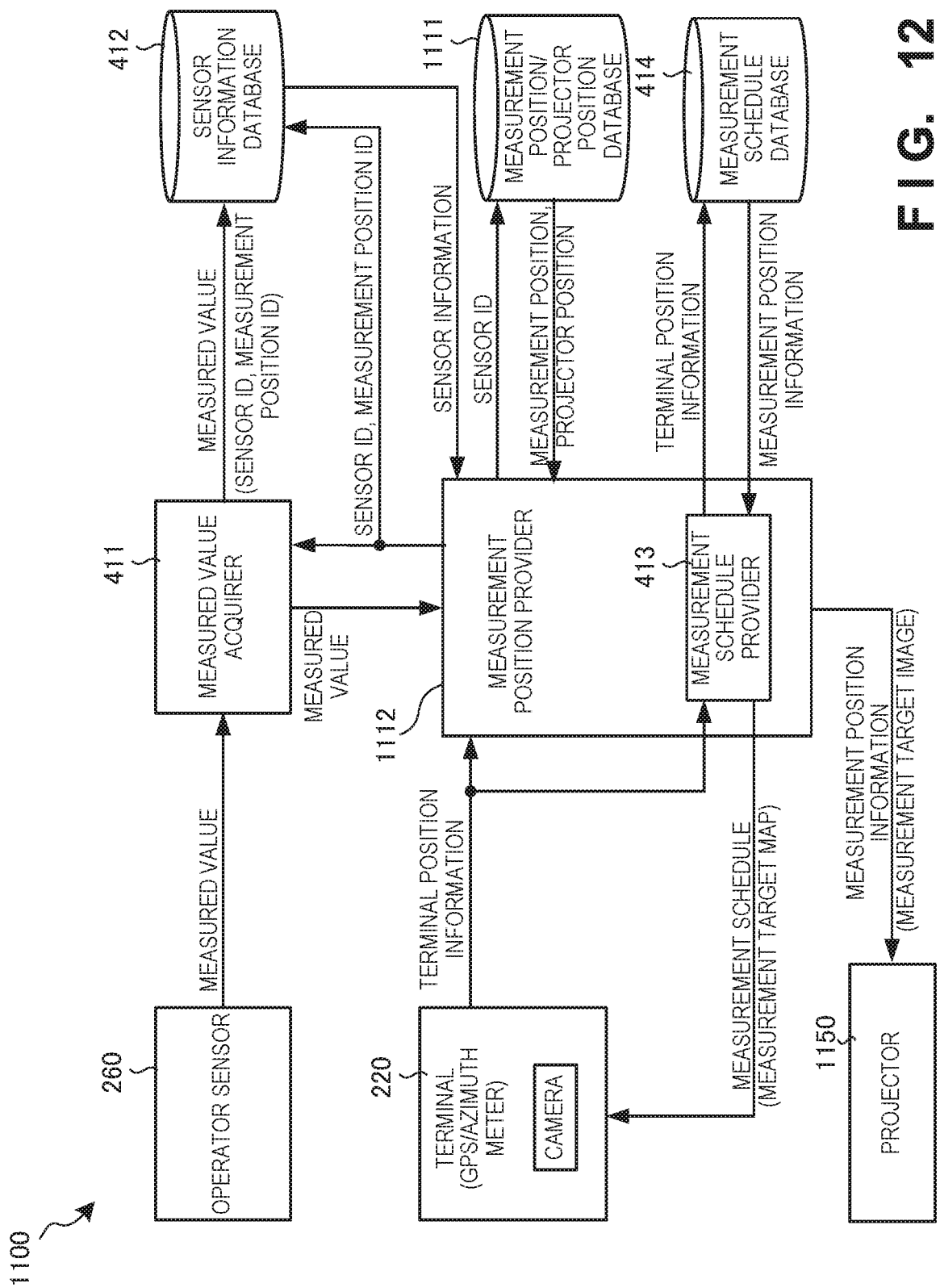
FIG. 12 is a block diagram showing the functional arrangement of the plant management system according to the third example embodiment of the present invention.

FIG. 12 is a block diagram showing a functional arrangement of the plant management system 1100 according to this example embodiment. Note that the same reference numerals as in FIG. 4 denote the same constituent elements in FIG. 12, and a repetitive description thereof will be omitted.

The measurement position provider 1112 of the plant management system 1100 acquires a measurement position and a projector position stored in the measurement position/projector position database 1111. Then, the measurement position provider 1112 obtains the projector ID of a corresponding projector from the current position information of the terminal 220, and causes the projection device 1150 to project the measurement position onto the measurement target. Alternatively, the measurement position provider 1112 causes the projection device 1150 to superimpose the image of the measurement position on the image of the measurement target and project the image onto the screen.

Note that projection processing of the measurement position on work-site according to this example embodiment may be started using near field communication (for example, beacon) between the terminal 220 on work-site and the projection device 1150 as a trigger. In this case, the terminal 220 may be not a high function device such as a smartphone or a tablet but a device having only the near field communication function. As the plant image on which the measurement position is superimposed, a 3D plant image which is generated based on a plant facility and through which the internal structure is visible is used.

(Hardware Arrangement)

Figure 13:
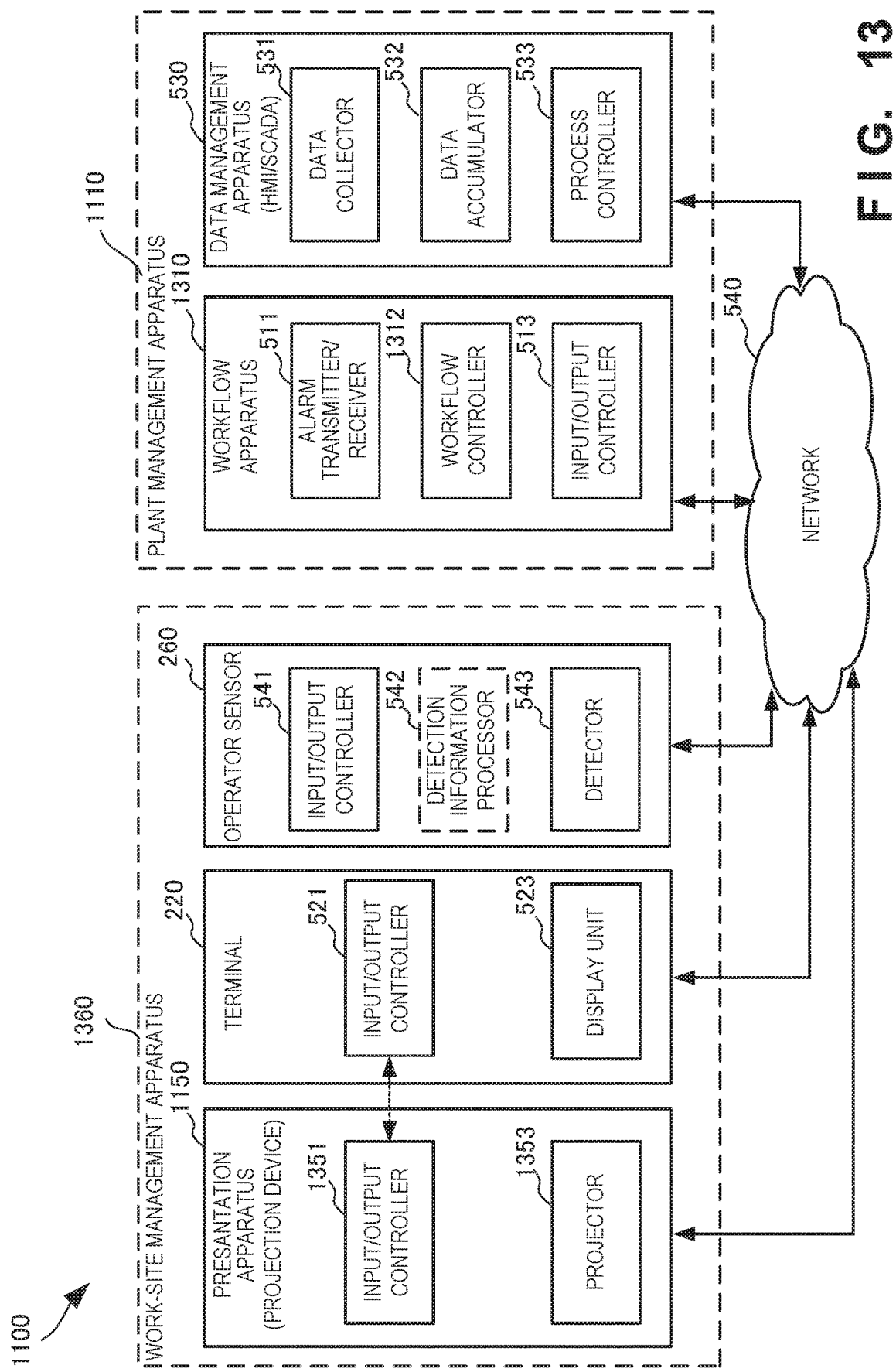
FIG. 13 is a block diagram showing the hardware arrangement of the plant management system according to the third example embodiment of the present invention.

FIG. 13 is a block diagram showing the hardware arrangement of the plant management system 1100 according to this example embodiment. Note that the same reference numerals as in FIG. 5A denote the same functional components in FIG. 13, and a repetitive description thereof will be omitted.

The plant management system 1100 includes the plant management apparatus 1110 and a work-site management apparatus 1360, which are connected via a network 540. A workflow apparatus 1310 that constitutes the plant management apparatus 1110 activates a workflow for causing a projection device such as a projector that is the projection device 1150 serving as a presentation apparatus according to this example embodiment to project sensor information.

On the other hand, the work-site management apparatus 1360 includes the terminal 220, the operator sensor 260, and the projection device 1150 serving as a presentation apparatus, which are connected via the network 540. The projection device 1150 includes an input/output controller 1351 that controls input/output to/from another apparatus, and a projector 1353 that projects sensor information or an image in which sensor information is superimposed on a plant image. The input/output controller 1351 controls input of the measurement position or the image in which the measurement position is superimposed on the plant image. Additionally, if near field communication is performed between the terminal 220 and the projection device 1150, the input/output controller 1351 performs near field communication.

(Operation Sequence)

Figure 14:
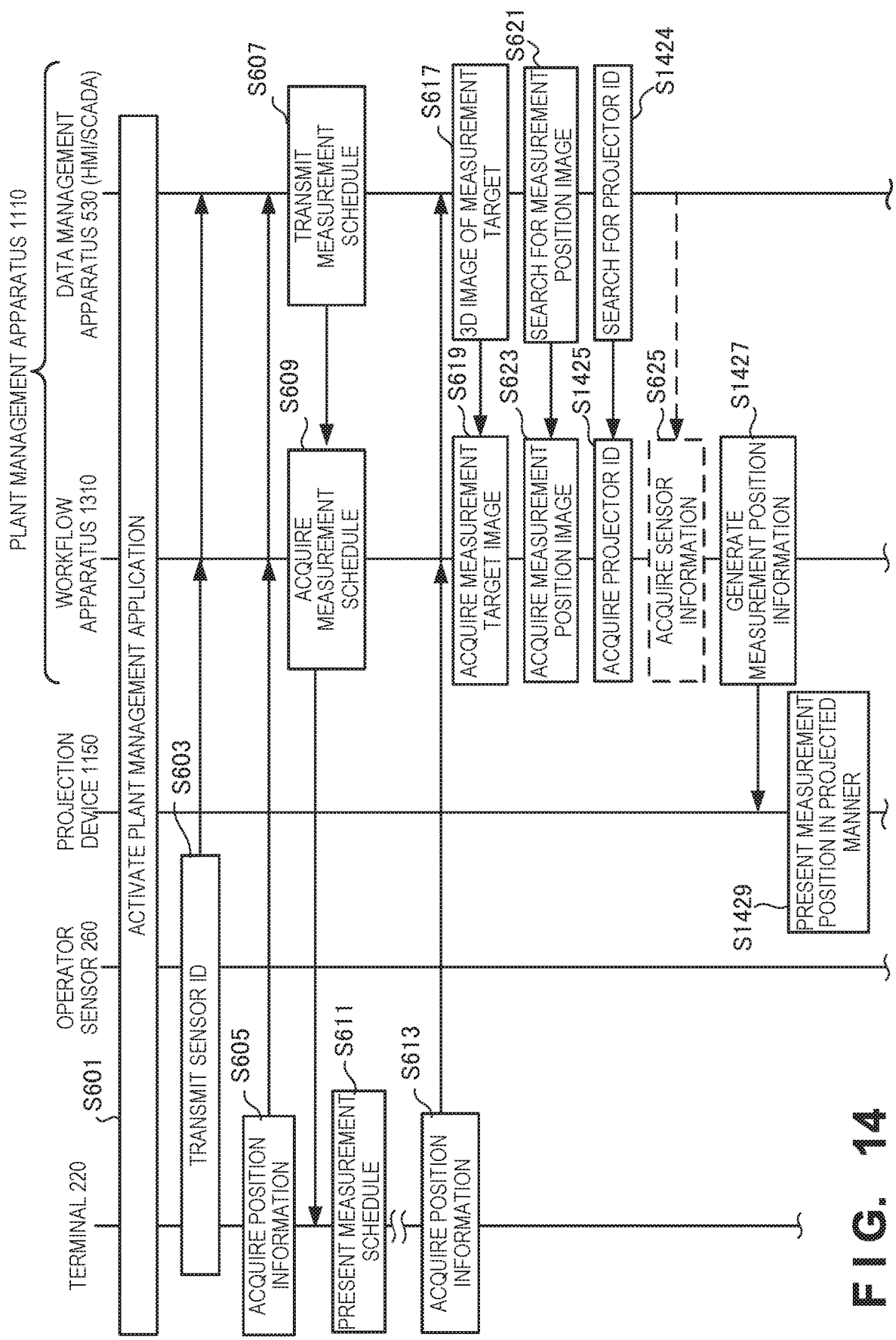
FIG. 14 is a sequence chart showing the operation procedure of the plant management system according to the third example embodiment of the present invention.

FIG. 14 is a sequence chart showing the operation procedure of the plant management system 1100 according to this example embodiment. Note that the same step numbers as in FIG. 6 denote the same steps in FIG. 14, and a repetitive description thereof will be omitted.

In step S1424, the data management apparatus 530 searches for the ID of a projector corresponding to current position information acquired from the terminal 220 on work-site and provides it to the workflow apparatus 1310. The workflow apparatus 1310 acquires the projector ID in step S1425, and generates measurement position information and transmits it to the projection device 1150 having the projector ID in step S1427. In step S1429, the projection device 1150 projects the image of the received measurement position onto the measurement target plant and presents it to the operator 250.

«Workflow»

Figure 15:
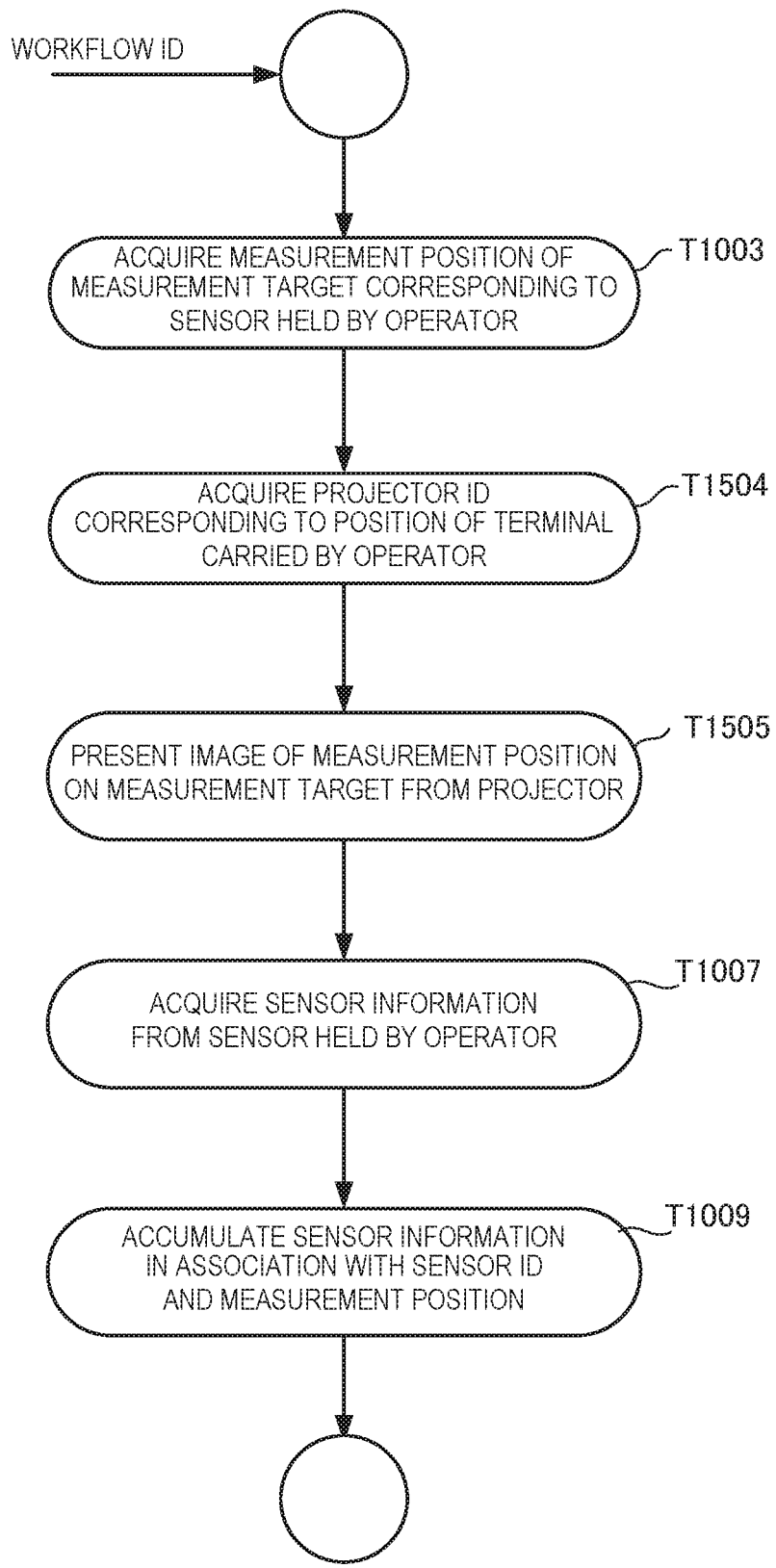
FIG. 15 is a view showing the workflow of a work according to the third example embodiment of the present invention.

FIG. 15 is a view showing the workflow of a work according to this example embodiment. Note that the same task numbers as in FIG. 10 denote the same tasks in FIG. 15, and a repetitive description thereof will be omitted.

In task T1505, the workflow apparatus 510 projects the image of the measurement position from the projection device 1150 corresponding to position information from the terminal 220 on work-site and presents it to the operator 250 on work-site.

According to this example embodiment, the projection apparatus having a projection function is arranged on work-site. It is therefore possible to efficiently support the on work-site work of the operator who checks or maintains a structure such as a plant without carrying a predetermined device. That is, the terminal need not be carried.

Fourth Example Embodiment

A plant management system according to the fourth example embodiment of the present invention will be described next. The plant management system according to this example embodiment is different from the above-described second and third example embodiments in that when each of a plurality of operators holds a terminal and an operator sensor, measurements by the operator sensors of the operators at adjusted (synchronized) timings are supported. The rest of the components and operations is the same as in the second and third example embodiments. Hence, the same reference numerals denote the same components and operations, and a detailed description thereof will be omitted.

«Plant Management System»

The arrangement and operation of a plant management system 1600 according to this example embodiment will be described with reference to FIGS. 16A and 16B.

(Operation Outline)

Figure 16A:
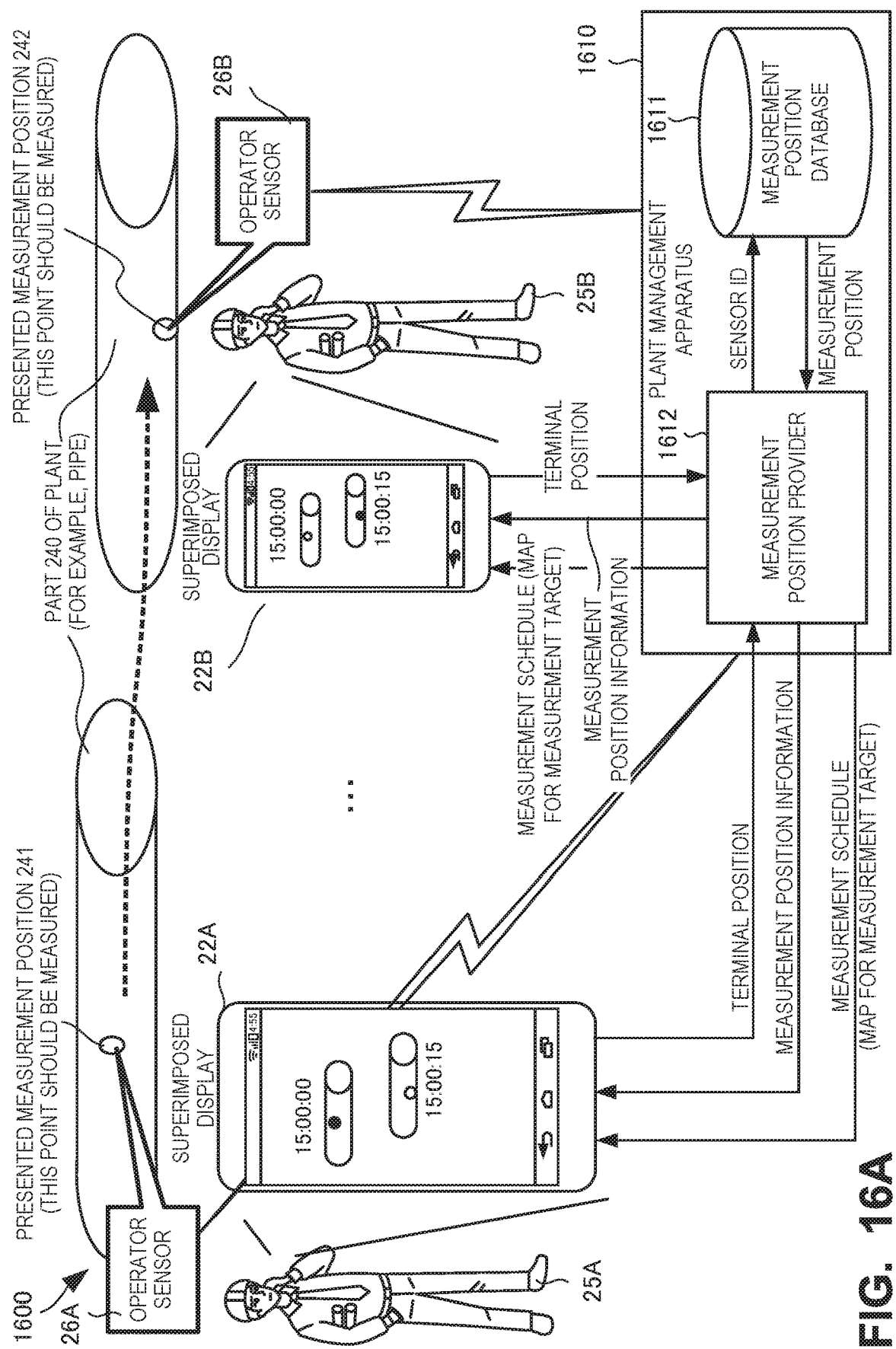
FIG. 16A is a view showing the operation outline of a plant management system according to the fourth example embodiment of the present invention.

FIG. 16A is a view showing the operation outline of the plant management system 1600 according to this example embodiment. A case in which "plural" means minimum "two" will be described with reference to FIG. 16A. However, the arrangement and processing also apply to a case in which "plural" means "three" or more. Note that the same reference numerals as in FIG. 2A denote the same constituent elements in FIG. 16A, and a repetitive description thereof will be omitted.

Referring to FIG. 16A, two terminals are terminals 22A and 22B, two operators are operators 25A and 25B, and two operator sensors are operator sensors 26A and 26B. They are the same as the terminal 220, the operator 250, and the operator sensor 260, respectively.

A plant management apparatus 1610 according to this example embodiment includes a measurement position database 1611 that stores information for associating measurements by the plurality of operator sensors 26A and 26B, and a measurement position provider 1612 that presents a measurement position by associating measurements by the plurality of operator sensors 26A and 26B.

The operator 25A who holds the terminal 22A and the operator sensor 26A is going to do measurement using the operator sensor 26A at a presented measurement position 241 on a part 240 of a plant in accordance with a measurement schedule. On the other hand, the operator 25B who holds the terminal 22B and the operator sensor 26B is going to do measurement using the operator sensor 26B at a presented measurement position 242 on the part 240 of the plant in accordance with a measurement schedule.

On the screen of the terminal 22A held by the operator 25A, the presented measurement position 241 that is superimposed on the image of the part 240 of the operator and is to be measured by the operator sensor 26A is presented by ●, and the measurement time point is instructed as 15:00:00. On the other hand, on the screen of the terminal 22B held by the operator 25B, the presented measurement position 242 that is superimposed on the image of the part 240 of the operator and is to be measured by the operator sensor 26B is presented by ●, and the measurement time point is instructed as 15:00:15. For example, the presentation contents show a case in which the measurement time point at the presented measurement position 242 is preferably 15 sec after the measurement time point at the presented measurement position 241 when the plant is a pipe through which a fluid flows, and the fluid flows in a direction indicated by a broken arrow. According to this example embodiment, timing adjustment of more measurements and timing adjustment between different sensors can also be performed by setting the presentation contents.

Note that in FIG. 16A, the measurement time point is set at one point. However, a measurement time zone may be presented within an allowable range. Additionally, in FIG.

16A, images of the same measurement target are displayed on the screens of the terminals 22A and 22B. However, if the operators 25A and 25B are far apart, images of different measurement targets are displayed.

(Operation Procedure)

Figure 16B:
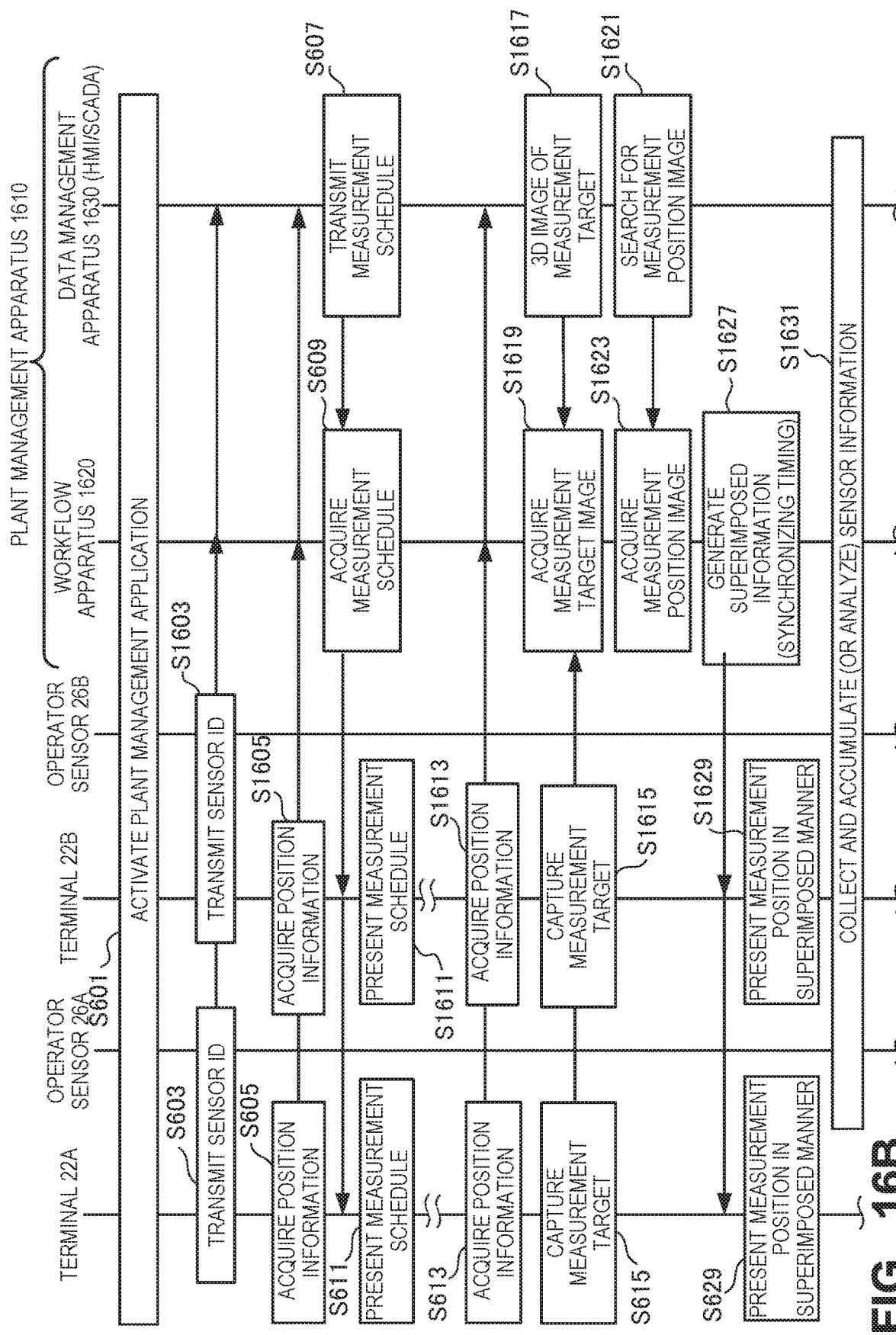
FIG. 16B is a sequence chart showing the operation procedure of the plant management system according to the fourth example embodiment of the present invention.

FIG. 16B is a sequence chart showing the operation procedure of the plant management system 1600 according to this example embodiment. Note that the same step numbers as in FIG. 6 or 14 denote the same steps in FIG. 16B, and a repetitive description thereof will be omitted.

Referring to FIG. 16B, the processes of the terminal 22A and the operator sensor 26A are shown in steps S603 to S629 that are the same as in FIG. 6, and the processes of the terminal 22B and the operator sensor 26B, which are processes corresponding to FIG. 6, are shown in steps S1603 to S1629. However, the processes of step numbers with the same last two numbers are the same. Hence, the description of the processes of steps S1603 to S1629 will also be omitted. Note that FIG. 16B shows the processes together, like, for example, steps S603 and S1603. In general, data transmissions are performed at different timings.

In step S1617, a data management apparatus 1630 searches for 3D images of measurement targets at the respective positions by referring to the position information of the terminals and transmits them to a workflow apparatus 1620. In step S1619, the workflow apparatus 1620 acquires captured images of the measurement targets from the terminals 22A and 22B or the 3D images of the measurement targets from the data management apparatus 1630. In step S1621, the data management apparatus 1630 searches for measurement position images of the measurement targets by referring to the position information of the terminals and transmits them to the workflow apparatus 1620. In step S1623, the workflow apparatus 1620 acquires the images of the measurement positions from the data management apparatus 1630.

In step S1627, the workflow apparatus 1620 superimposes the images of the measurement positions corresponding to the operator sensors on the captured images or 3D images of the measurement targets. In addition, if the measurement time point by the operator sensors 26A and 26B at the measurement positions have relations to each other, preferable measurement time points are presented in a superimposed manner. Note that FIG. 16B shows an example in which the workflow apparatus 1620 selects the measurement position corresponding to each operator sensor. However, the measurement position corresponding to each operator sensor may be selected by the data management apparatus 1630.

In step S1631, pieces of sensor information measured by the operator sensors 26A and 26B at the presented timings are collected, accumulated, and analyzed by the workflow apparatus 1620 and the data management apparatus 1630.

(Data Accumulation Table)

Figure 17:
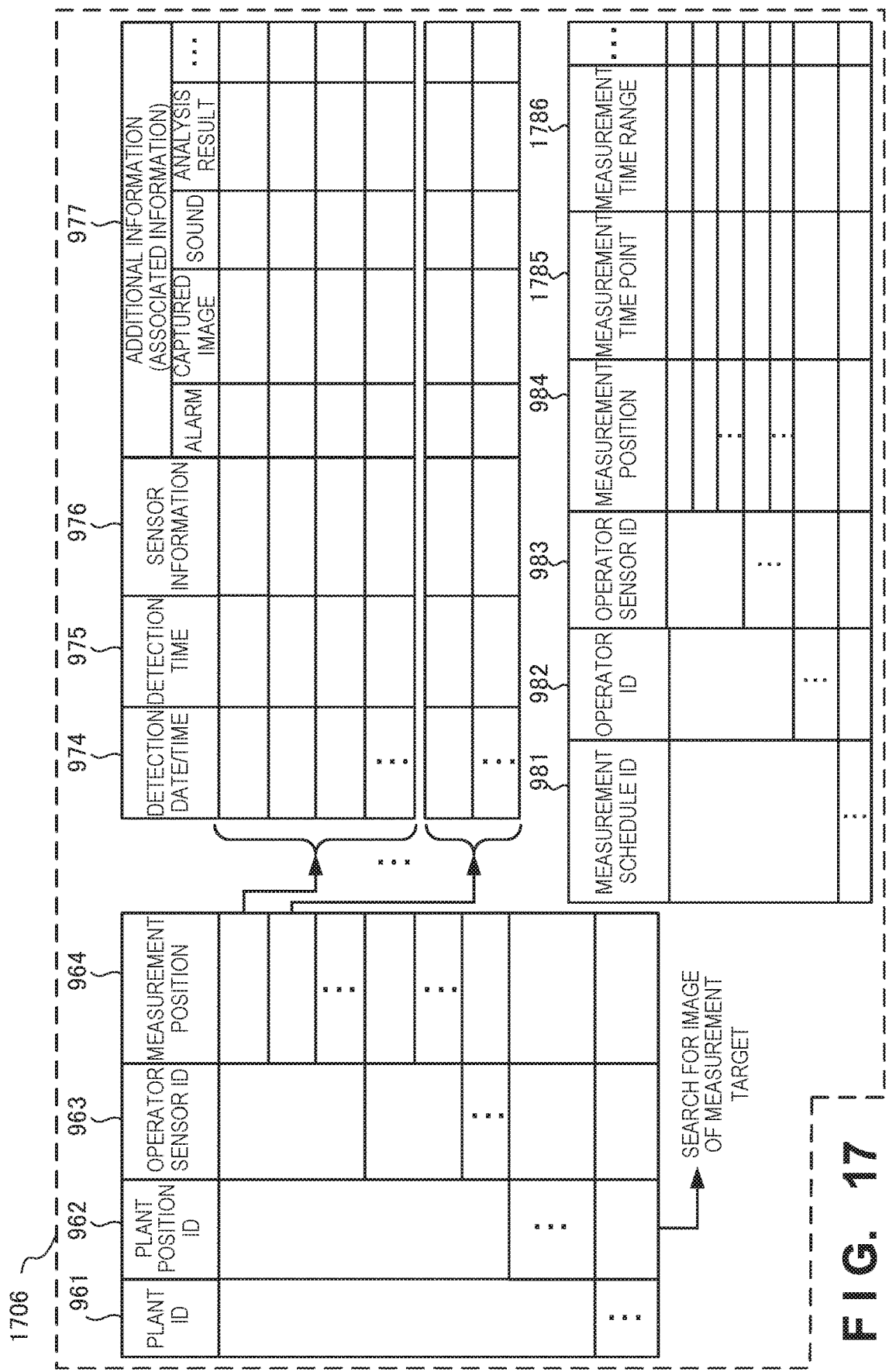
FIG. 17 is a view showing the arrangement of a data accumulation table according to the fourth example embodiment of the present invention.

FIG. 17 is a view showing the arrangement of a data accumulation table 1706 according to this example embodiment. Note that the same reference numerals as in FIG. 9B denote the same constituent elements in FIG. 17, and a repetitive description thereof will be omitted.

A measurement time point 1785 and a measurement time range 1786 are stored in association with each measurement position 984 selected by combining a measurement schedule ID 981, an operator ID 982, and an operator sensor ID 983. The measurement time point 1785 and the measurement time range 1786 are presented on each terminal that needs timing adjustment of measurement by the operator sensor. Note that in this example embodiment, the measurement time point is presented on each terminal. However, if only the relationship of measurement time points is important, the timing to present the next measurement time point after completion of the preceding measurement may be adjusted.

«Workflow»

Figure 18:
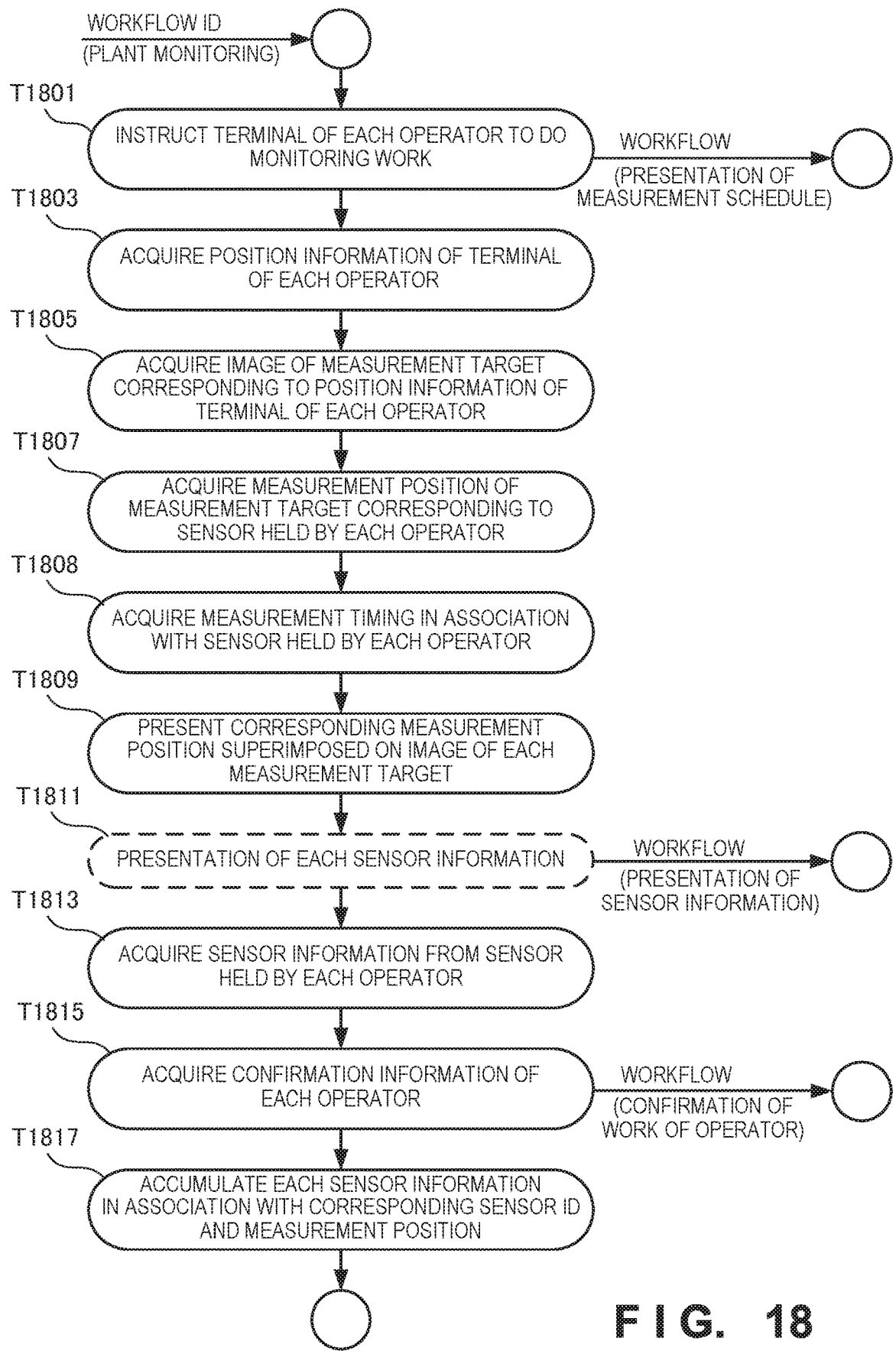
FIG. 18 is a view showing the workflow of the plant management system according to the fourth example embodiment of the present invention.

FIG. 18 is a view showing a workflow of the plant management system 1600 according to this example embodiment. Note that task numbers having the same last two numbers as those of the tasks shown in FIG. 5C represent the same processing contents in FIG. 18 only except that "each" is added to "operator" and "sensor information". Hence, a repetitive description will be omitted.

In task T1808, the plant management system 1600 acquires a measurement timing in association with the operator sensor held by each operator.

Note that in this example embodiment, the measurement timing is adjusted by presenting the time but may be expressed as, for example, a change in an identifiable measurement position, for example, a color, a density, a shape, or the like. Alternatively, adjustment by a sound or control of the measurement enable time of the operator sensor may be performed.

According to this example embodiment, when measurements are performed by a plurality of operator sensors, and the measurements at the respective measurement positions have relations to each other in terms of timing, information for the timing adjustment is acquired from each terminal. It is therefore possible to perform sensor information collection capable of more precisely implementing monitoring or analysis of the plant.

Fifth Example Embodiment

A plant management system according to the fifth example embodiment of the present invention will be described next. The plant management system according to this example embodiment is different from the above-described second to fourth example embodiments in that an image in which an operator sensor is set at the measurement position of a measurement target and is performing measurement is superimposed and projected, instead of superimposing or projecting an image representing a measurement position. The example embodiments are different in that correct setting including the direction to the measurement position is enabled by superimposing an actual operator sensor on the image of the operator sensor. The rest of the components and operations is the same as in the second to fourth example embodiments. Hence, the same reference numerals denote the same components and operations, and a detailed description thereof will be omitted.

«Plant Management System»

Figure 19:
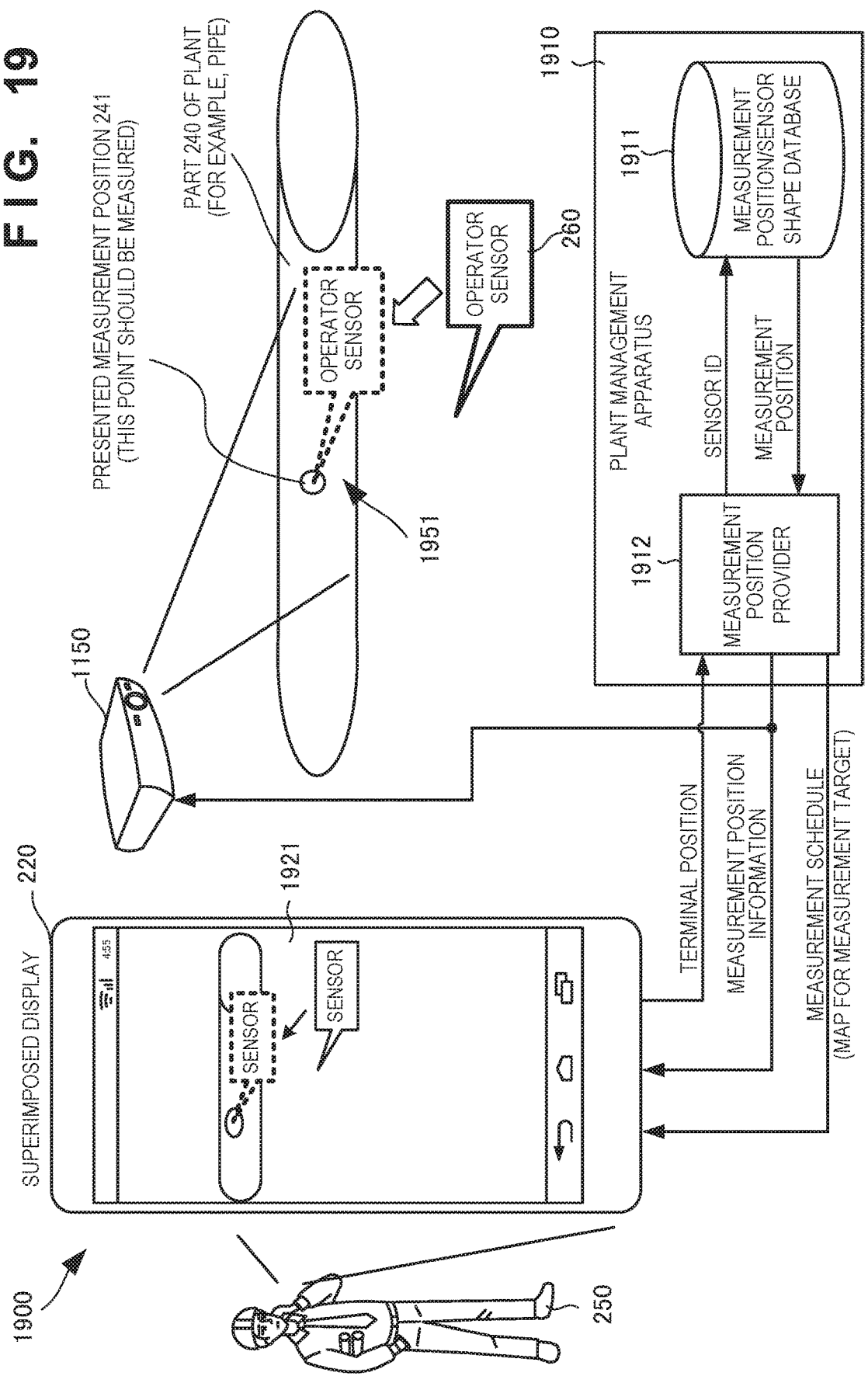
FIG. 19 is a view showing the operation outline of a plant management system according to the fifth example embodiment of the present invention.

FIG. 19 is a view showing the operation outline of a plant management system 1900 according to this example embodiment. Note that the same reference numerals as in FIG. 2A or 11A denote the same constituent elements in FIG. 19, and a description thereof will be omitted.

A plant management apparatus 1910 of the plant management system 1900 includes a measurement position/sensor shape database 1911 and a measurement position provider 1912. The measurement position provider 1912 acquires the sensor shape of an operator sensor 260 from the measurement position/sensor shape database 1911 together with a measurement position. Then, the image of the sensor shape of the operator sensor 260 is superimposed on the measurement target in a direction in which the operator sensor 260 is actually set at the measurement position at the time of measurement. On a terminal 220, an operator 250 sets the operator sensor 260 at a position where a captured image of the actual sensor indicated by a solid line exactly overlaps the sensor shape image indicated by a broken line, as indicated by a display screen 1921. Additionally, on a projection device 1150, the operator sensor 260 is set at a position where the actual sensor indicated by a solid line exactly overlaps the sensor shape image indicated by a broken line projected onto the measurement target, as indicated by a display screen 1951.

According to this example embodiment, since measurement can be performed by easily setting the operator sensor at the measurement presentation position while adjusting the orientation and direction, measurement data with less measurement errors can be collected.

Sixth Example Embodiment

A plant management system according to the sixth example embodiment of the present invention will be described next. The plant management system according to this example embodiment is different from the above-described second to fifth example embodiments in that an operator is supported by a different measurement position presentation method or by adding an operation method from the operator. The rest of the components and operations is the same as in the second to fifth example embodiments. Hence, the same reference numerals denote the same components and operations, and a detailed description thereof will be omitted.

《First Presentation Example and Workflow》

Figure 20:
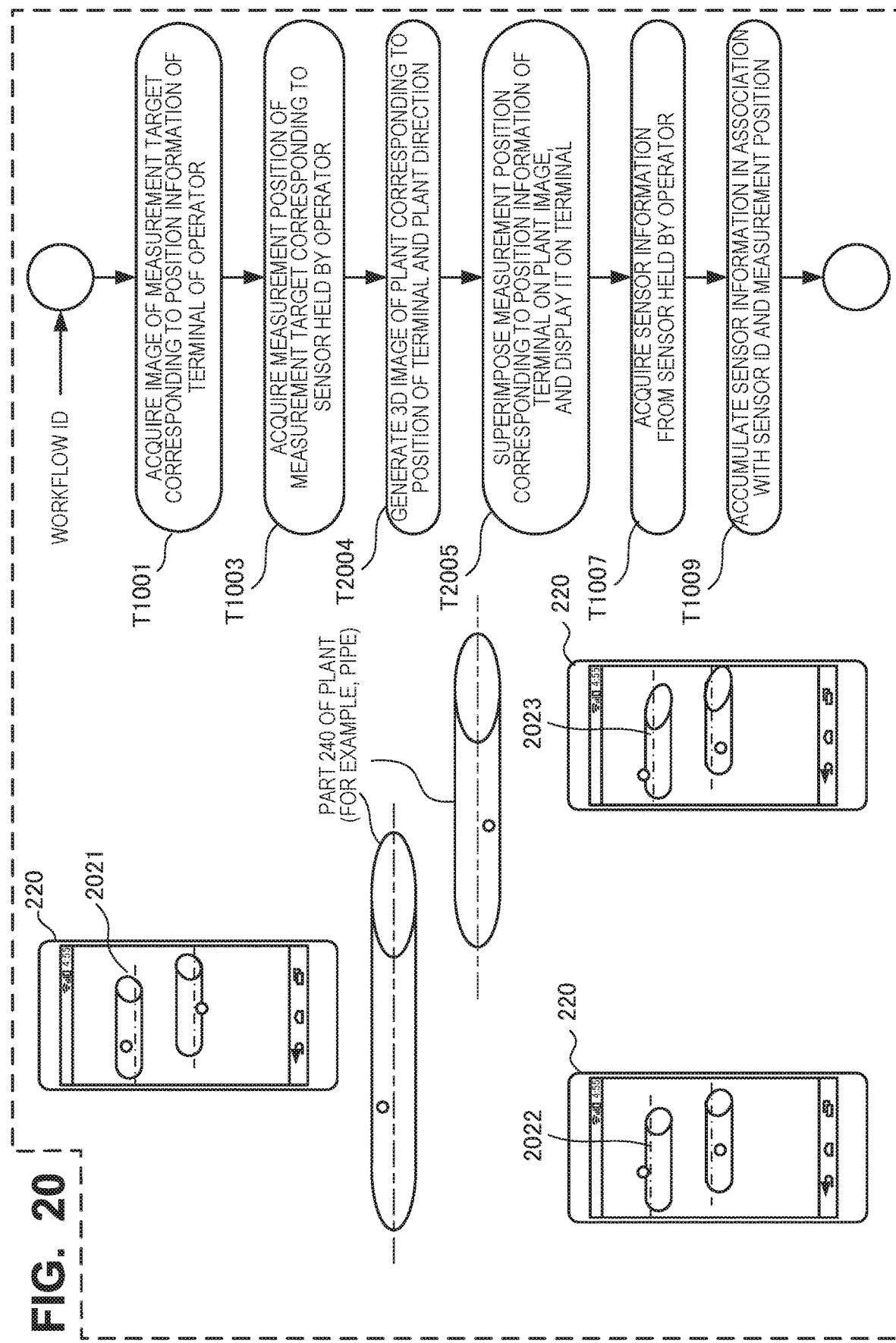
FIG. 20 is a view showing the first presentation example on work-site in a plant management system according to the sixth example embodiment of the present invention and a corresponding workflow.

FIG. 20 is a view showing the first presentation example on work-site in the plant management system according to this example embodiment and a corresponding workflow.

In the first presentation example shown in FIG. 20, how to hold a terminal 220 at the time of superimposition of sensor information or the line of sight of an operator 250 seeing the plant is also associated. A transparent image completely straight to the screen may be displayed. However, the operator may hold the terminal to confirm the superimposed image while viewing the actual plant. In this case, an image not in a straight see-through direction but with a slight upward or downward angle may be presented. In a state in which the terminal 220 is viewed in a normal orientation, a facility on front is presented as if it is viewed from the front side. Note that this is impossible in the camera of a normal tablet but can be implemented using a device in which the direction of the camera is corrected upward or downward.

The left view of FIG. 20 shows, with respect to a part 240 of the plant on work-site, a plant display 2021 in a case in which the operator 250 is observing the plant downward from the upper side, a plant display 2022 in a case in which the operator 250 is observing the plant from the lower side to the upper right side, and a plant display 2023 in a case in which the operator 250 is observing the plant from the lower side to the upper left side.

The right view of FIG. 20 shows a workflow for implementing presentation of the plant image and the sensor information shown in the left view of FIG. 20 to the operator 250 on work-site. Note that the same task numbers as in FIG. 10 denote the same tasks in the right view of FIG. 20, and a repetitive description thereof will be omitted.

In task T2004, a workflow apparatus 510 generates a 3D image of the plant corresponding to the position of the terminal 220 and the plant direction. Note that a plant image captured by the camera of the terminal 220 may be deformed. In task T2005, the workflow apparatus 510 superimposes a measurement position by an operator sensor 260 corresponding to the position information of the terminal 220 on the plant image in the direction of generation, displays the image on the terminal 220, and presents it to the operator 250 on work-site.

According to the first presentation example, the operator can easily associate presentation of a model image with the measurement position depending on the position of the terminal 220.

《Second Presentation Example and Workflow》

Figure 21:
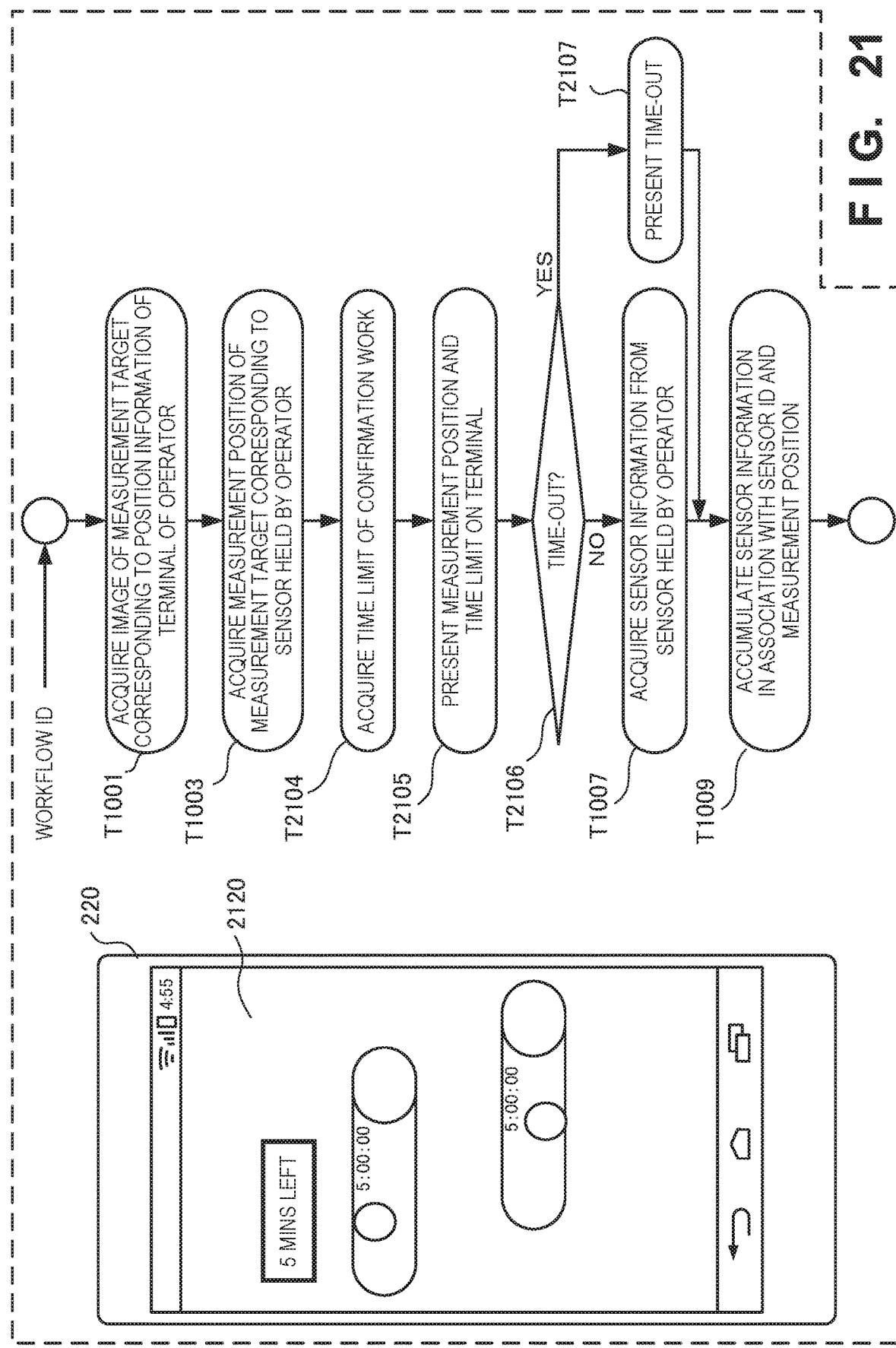
FIG. 21 is a view showing the second presentation example on work-site in the plant management system according to the sixth example embodiment of the present invention and a corresponding workflow.

FIG. 21 is a view showing the second presentation example on work-site in the plant management system according to this example embodiment and a corresponding workflow. In the second presentation example shown in FIG. 21, when a confirmation work is assigned as a task with a time limit, the time limit is displayed together with the measurement position. In addition, the time limit time may be displayed on a side of the measurement position in a presented measurement target.

The left view of FIG. 21 shows a display screen 2120 that displays a time limit together with the measurement position and displays the time limit time on a side of the measurement position in the presented measurement target on the terminal 220 in a state in which the measurement position by the operator sensor is superimposed on a plant image.

The right view of FIG. 21 shows a workflow for implementing presentation of the time limit to the operator 250 on work-site shown in the left view of FIG. 21. Note that the same task numbers as in FIG. 10 denote the same tasks in the right view of FIG. 21, and a repetitive description thereof will be omitted.

In task T2104, the workflow apparatus 510 acquires the time limit of the confirmation work. In task T2105, the workflow apparatus 510 superimposes the measurement position and the time limit on the measurement target and presents them on the terminal 220 on work-site, as shown in the left view. In task T2106, the workflow apparatus 510 determines whether the time limit is exceeded. If the time limit is not exceeded, the workflow apparatus 510 executes processing from task T1007. If the time limit is exceeded, in task T2107, the workflow apparatus 510 presents that the time limit of the confirmation work is exceeded on the terminal 220 on work-site.

According to the second presentation example, it is possible to urge the operator 250 on work-site to complete the measurement by the operator sensor within the time.

《Third Presentation Example and Workflow》

The confirmation work of measurement by the operator sensor will be described below with reference to FIGS. 22A and 22B.

Figure 22A:
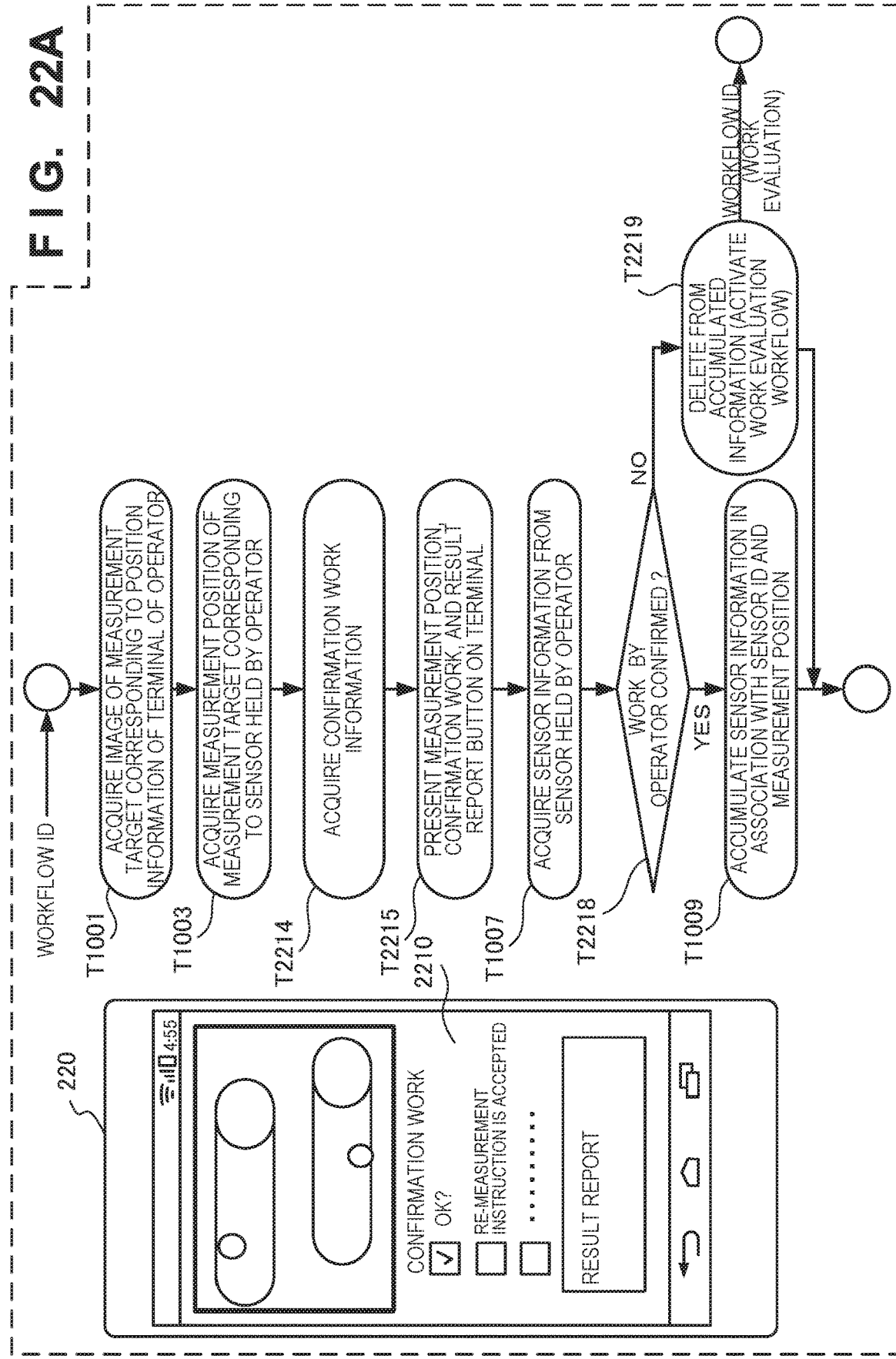
FIG. 22A is a view showing the third presentation example on work-site in the plant management system according to the sixth example embodiment of the present invention and a corresponding workflow.

FIG. 22A is a view showing the third presentation example on work-site in the plant management system according to this example embodiment and a corresponding workflow. In the presentation example shown in FIG. 22A, for example, an image captured by the terminal 220 is sent to the management center as the evidence of actual measurement by the operator using the operator sensor. The image to be sent to the management center can be either a still image or a moving image.

The left view of FIG. 22A shows a screen 2210 in which a plant image on work-site captured by the camera of the terminal 220 carried by the operator 250 on work-site is transmitted to the management center together with a measurement work or result report of the operator 250 on work-site in a state in which the measurement position by the operator sensor is superimposed on a plant image on the terminal 220.

The right view of FIG. 22A shows a workflow for transmitting the plant image on work-site captured by the camera of the terminal 220 carried by the operator 250 on work-site to the management center together with the measurement work or result report of the operator 250 on work-site shown in the left view of FIG. 22A. Note that the same task numbers as in FIG. 10 denote the same tasks in the right view of FIG. 22A, and a repetitive description thereof will be omitted.

In task T2214, the workflow apparatus 510 acquires a confirmation work to be presented to the operator 250 on work-site. In task T2215, the workflow apparatus 510 presents the measurement position, the confirmation work, and a result report button on the terminal 220.

When a response from the operator 250 on work-site is acquired, in task T2218, the workflow apparatus 510 confirms the work by the operator. To confirm the work of the operator, for example, a confirmation image obtained by capturing the site by the camera of the terminal 220 is used. If the work of the operator is questionable, in task T2219, the workflow apparatus 510 deletes the confirmation work result or report from the accumulated information and activates an operator work evaluation workflow.

Note that considering re-measurement, an "OK?" button or a "re-measurement instruction is accepted" display may be added to the confirmation work.

According to this presentation example, since the work by the operator on work-site can be confirmed, incorrect information can be excluded from monitoring or analysis processing of plant management, and more reliable plant management can be implemented.

FIG. 22B is a view showing another third presentation example on work-site in the plant management system according to this example embodiment and a corresponding workflow.

In the presentation example shown in FIG. 22B, buttons used by the operator 250 on work-site to report a work result are presented together with a measurement position or sensor information. The presentation method is not limited to buttons and may be a menu or the like. After a button is pressed, an opportunity of detail input (text input, registration of an image capturing result, or registration of recorded data) such as a text, a photo, or a sound may be given to cause the operator to make a report there. If the measurement position, the sensor information, and the captured image are superimposed, this may be used as a report material. In addition, a function (for example, a button) of explicitly showing "the cause is unknown" may be provided. Transmission of the information to the manager by the operator is useful per se.

The left view of FIG. 22B shows a screen 2220 that presents an addition instruction 2221 of information such as text input, registration of an image capturing result, or registration of recorded data and a confirmation instruction 2222 to know the situation on work-site by the operator 250 on work-site in a state in which the sensor information of a sensor on work-site is superimposed on a plant image on the terminal 220.

The right view of FIG. 22B shows a workflow for acquiring more detailed associated information or the confirmation information of the operator 250 on work-site in addition to the confirmation work or result report of the operator 250 on work-site shown in the left view of FIG. 22B. Note that the same task numbers as in FIG. 10 denote the same tasks in the right view of FIG. 22B, and a repetitive description thereof will be omitted.

In task T2221, the workflow apparatus 510 generates a display screen of additional information and operator confirmation information. In task T2228, the workflow apparatus 510 determines an instruction for information to be further acquired. In task T2281, according to the determination result, the workflow apparatus 510 acquires an image of the plant captured by the camera of the terminal 220. Additionally, in task T2282, the workflow apparatus 510 acquires a sound near the plant. In addition, in task T2283, the workflow apparatus 510 acquires text data input by the operator 250 on work-site. Furthermore, in task T2284, the workflow apparatus 510 acquires confirmation information inquired of the operator 250 on work-site.

Note that to confirm the measurement at the presented measurement position by the operator sensor of the operator, the following methods can also be used. For example, when measurement is performed by some other device, the device may be connected to a network (by Wi-Fi or Bluetooth®), and a measurement result may be transmitted to the terminal. In this case, a measurement result transmission button may exist on the screen. Alternatively, a measurement start button may be provided, and a value collected by the device may be sent after pressing the button because it becomes an evidence of measurement at the measurement position. Alternatively, GPS coordinates or attached information (a user name and a password) may be sent together with the measured value.

In addition, the operator may compare measurement information from the operator sensor and measurement information to be measured from the operator sensor presented on the terminal in a superimposed manner and confirm, on work-site, whether the measurement position by the operator sensor is correct. Alternatively, the management center may compare measurement information from the operator sensor and measurement information to be measured from the operator sensor and confirm, based on the comparison result, whether the measurement by the operator sensor is performed without any error.

According to this presentation example, since information collection necessary for plant management from the operator is actively performed, the plant state can more correctly be recognized.

《Fourth Presentation Example and Workflow》

Figure 23:
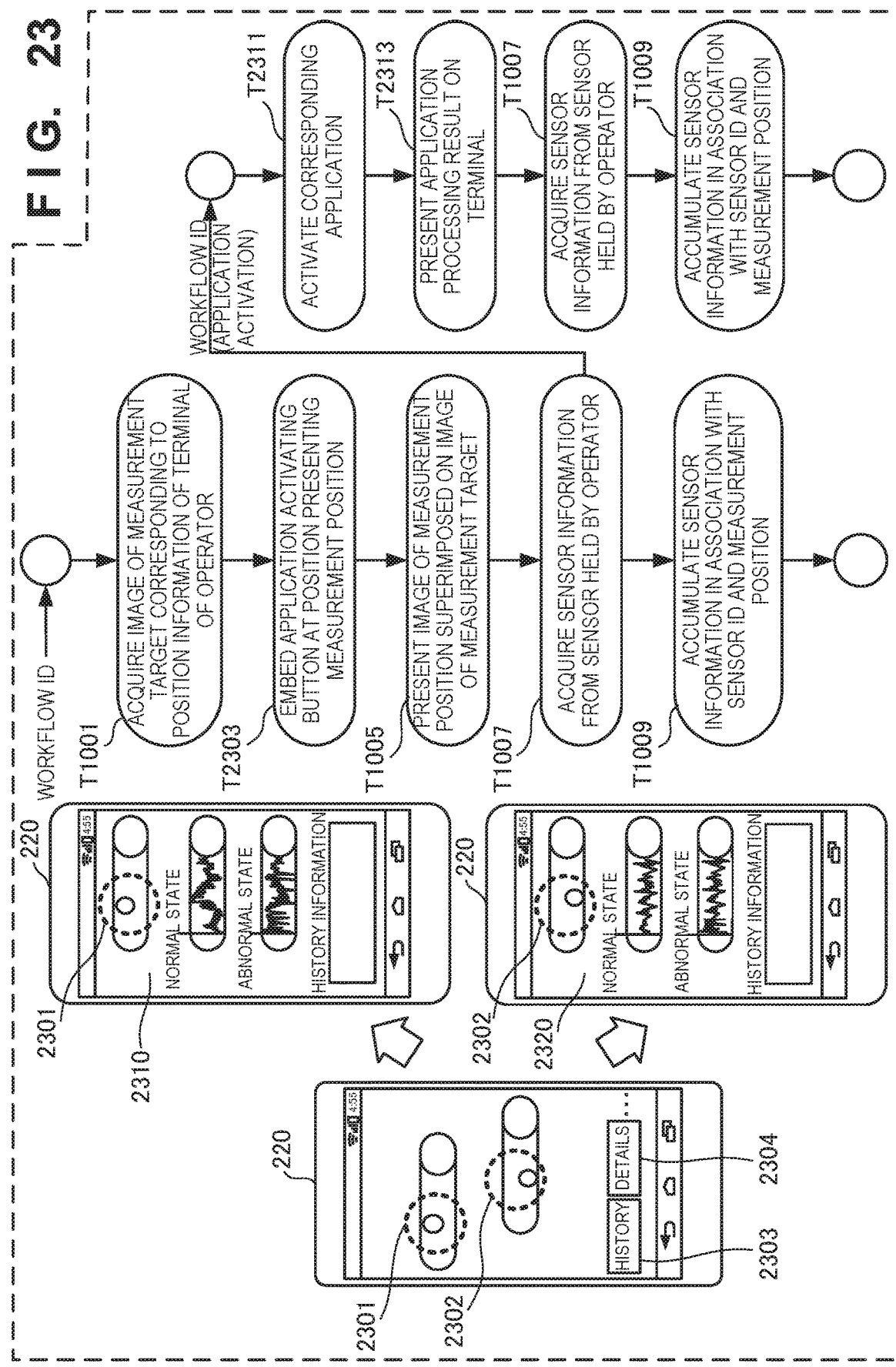
FIG. 23 is a view showing the fourth presentation example on work-site in the plant management system according to the sixth example embodiment of the present invention and a corresponding workflow.

FIG. 23 is a view showing the fourth presentation example on work-site in the plant management system according to this example embodiment and a corresponding workflow. In the fourth presentation example shown in FIG. 23, the system is configured to enable jump to an external application when confirming details of a measurement position or associated information.

The left view of FIG. 23 shows an example in which on the terminal 220, when a vicinity 2301 or 2302 of a measurement position is touched, or when another display button (a history button 2303 or a detail button 2304) is touched in a state in which the measurement position by the operator sensor is superimposed on a plant image, jump to an external application is performed. The left view of FIG. 23 shows a display screen 2310 in a case in which the vicinity 2301 of the measurement position is touched, and a display screen 2320 in a case in which the vicinity 2302 of the measurement position is touched.

The right view of FIG. 23 shows a workflow for implementing an operation of jumping to an external application from the display of the plant image and the sensor information shown in the left view of FIG. 23. Note that the same task numbers as in FIG. 10 denote the same tasks in the right view of FIG. 23, and a repetitive description thereof will be omitted.

In task T2303, the workflow apparatus 510 embeds an activating button of an external application (or another workflow) at the presented measurement position or at a predetermined button display position. Upon detecting a touch on the activating button of the external application (or the other workflow) as the response of the operator 250 on work-site in task T1007, the workflow apparatus 510 activates a new workflow to activate the external application.

In the newly activated workflow, the workflow apparatus 510 activates the corresponding external application in task T2311. In task T2313, the workflow apparatus 510 presents the processing result of the external application on the terminal 220 on work-site.

According to the fourth presentation example, it is possible to seamlessly jump to the external application without interrupting the current measurement position presentation application.

«Fifth Presentation Example and Workflow»

Figure 24:
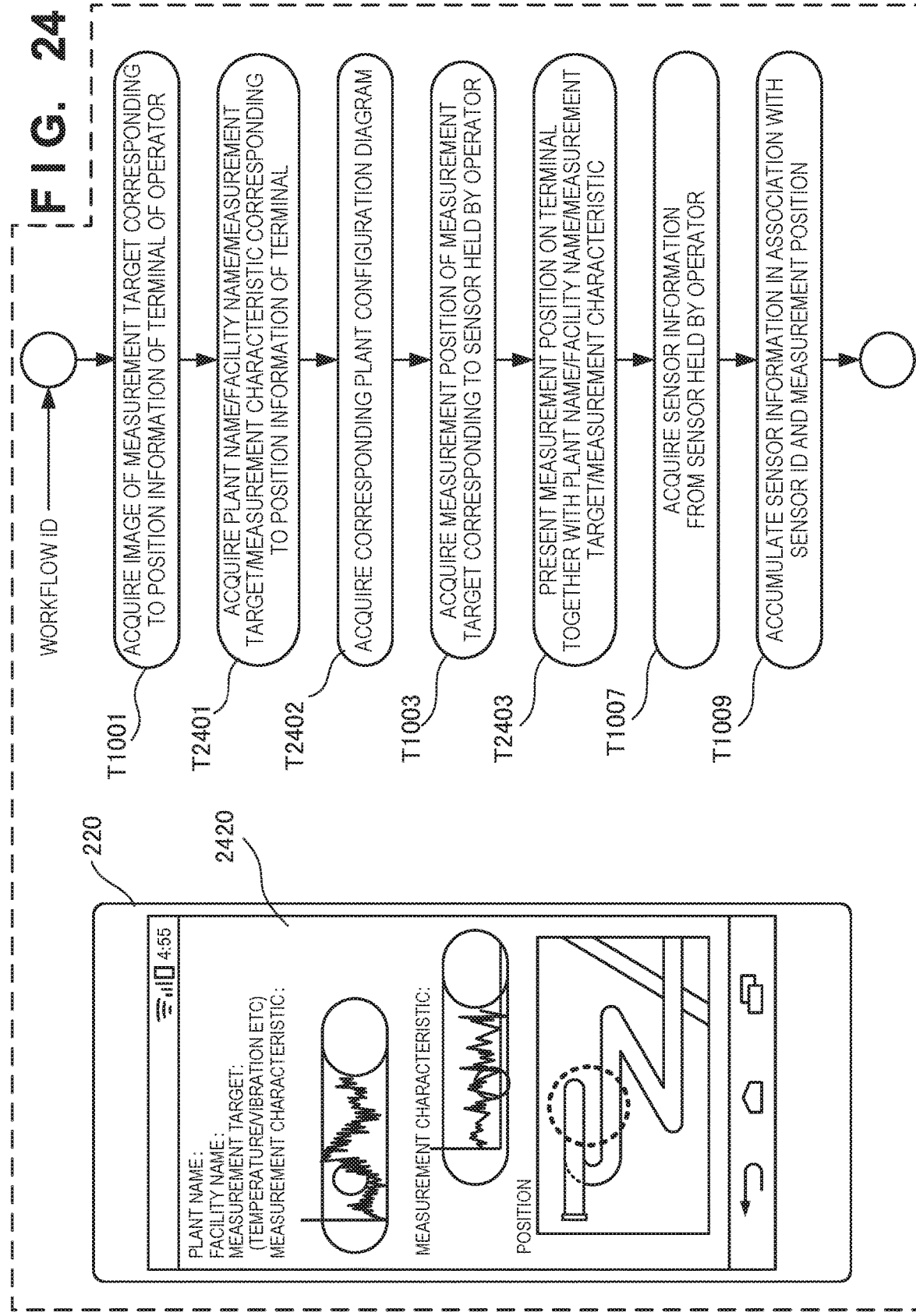
FIG. 24 is a view showing the fifth presentation example on work-site in the plant management system according to the sixth example embodiment of the present invention and a corresponding workflow.

FIG. 24 is a view showing the fifth presentation example on work-site in the plant management system according to this example embodiment and a corresponding workflow. In the fifth presentation example shown in FIG. 24, the plant name, the facility name, the measurement target, the measurement characteristic, and the like to be measured by the operator sensor in the target of the measurement position presentation are displayed together with the measurement target, the measurement position, and the sensor information (for example, a graph).

The left view of FIG. 24 shows a display screen 2420 that performs not only superimposition display of the measurement position by the operator sensor on a plant image but also presentation of a plant name, a facility name, a measurement target, a measurement characteristic, or the like and, if necessary, a plant configuration diagram on work-site and an observation or inspection target portion (broken line frame). Note that the type or model of the operator sensor to be used may further be presented.

The right view of FIG. 24 shows a workflow for implementing presentation of the plant image and the measurement position shown in the left view of FIG. 24 or presentation of a plant name, a facility name, a measurement target, a measurement characteristic, or the like to the operator 250 on work-site. Note that the same task numbers as in FIG. 10 denote the same tasks in the right view of FIG. 24, and a repetitive description thereof will be omitted.

In task T2401, the workflow apparatus 510 acquires a plant name, a facility name, a measurement target, a measurement characteristic, and the like corresponding to the position information of the terminal 220 on work-site. In task T2402, the workflow apparatus 510 acquires a plant configuration diagram corresponding to the site. In task T2403, the workflow apparatus 510 presents the measurement position by the operator sensor to the operator 250 on work-site together with the plant name, the facility name, the measurement target, the measurement characteristic, and the like and the plant configuration diagram on work-site.

According to the fifth presentation example, it is possible to perform labeling of an operator sensor, a measurement position, a superimposed image, and sound information by a plant name, a facility name, a measurement target, a measurement characteristic, and the like, and the operator 250 can easily extract the information.

«Sixth Presentation Example and Workflow»

Figure 25:
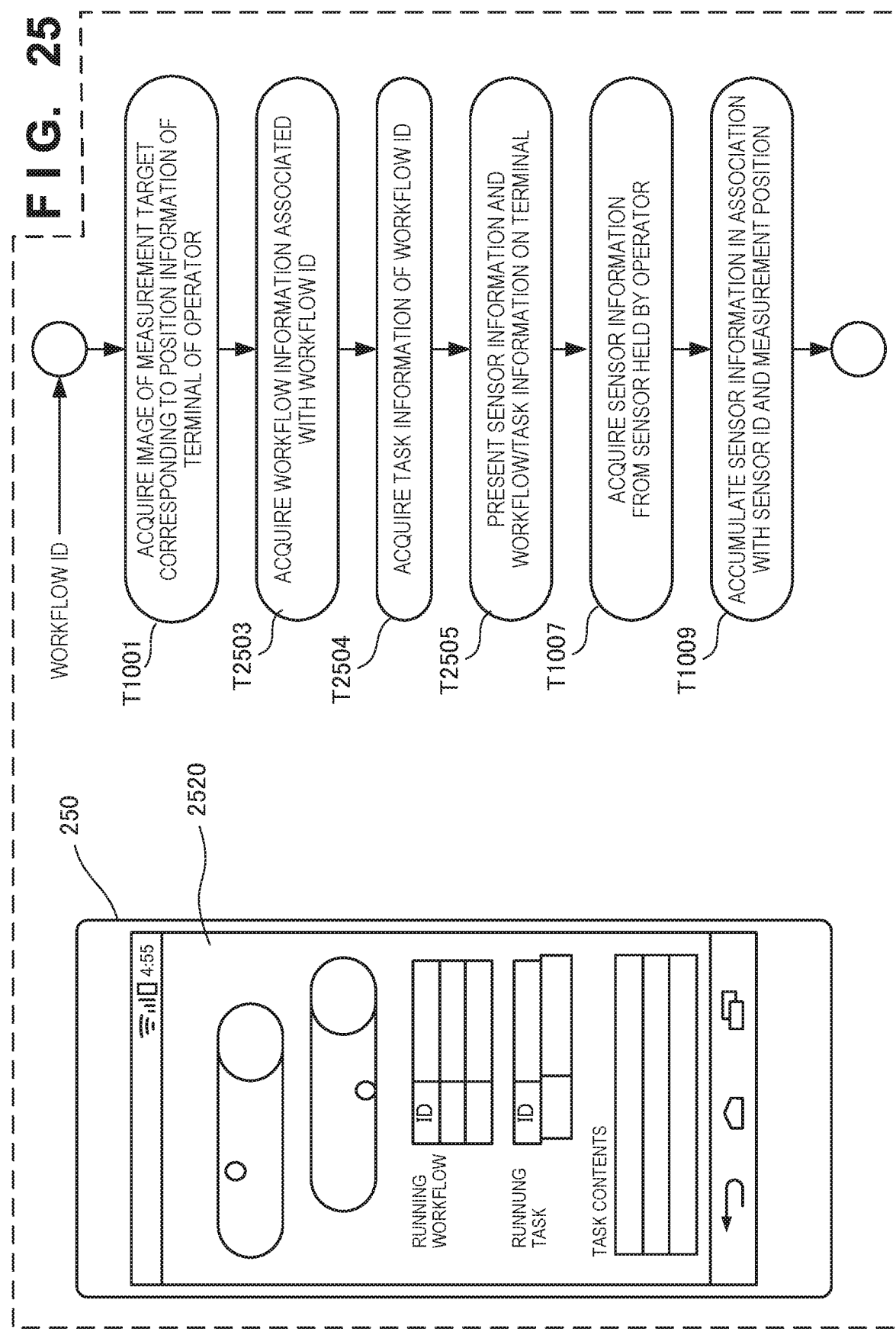
FIG. 25 is a view showing the sixth presentation example on work-site in the plant management system according to the sixth example embodiment of the present invention and a corresponding workflow.

FIG. 25 is a view showing the sixth presentation example on work-site in the plant management system according to this example embodiment and a corresponding workflow.

In the sixth presentation example shown in FIG. 25, a description about a task that is currently being executed or a description of a workflow including the task is presented together with the measurement position. For example, "specify the cause of abnormal noise from the point", "confirm ◯◯", "the method of a procedure ×××", "matters taken over from a predecessor", or the like may be presented. Note that if the instruction is displayed as a workflow chart, the workflow can more visually be understood.

The left view of FIG. 25 shows a display screen 2520 that displays information of workflows that are running, the information of tasks that are running, and the contents of tasks including roles of the tasks in a state in which the measurement position by the operator sensor is superimposed on a plant image on the terminal 220.

The right view of FIG. 25 shows a workflow for presenting the information of workflows, the information of tasks, and the contents of tasks including the roles of the tasks to the operator 250 on work-site shown in the left view of FIG. 25. Note that the same task numbers as in FIG. 10 denote the same tasks in the right view of FIG. 25, and a repetitive description thereof will be omitted.

In task T2503, the workflow apparatus 510 acquires workflow information associated with a workflow ID. In task T2504, the workflow apparatus 510 acquires the task information of the workflow ID. Then, in task T2505, the workflow apparatus 510 presents the measurement position, the workflow, and the task information for the terminal 220 on work-site to the operator 250 on work-site.

According to the sixth presentation example, a history, a place, or the like, which is the positioning of the current workflow, is presented in detail to the operator on work-site, thereby causing the operator on work-site to recognize the meaning of a work.

«Seventh Presentation Example and Workflow»

Figure 26:
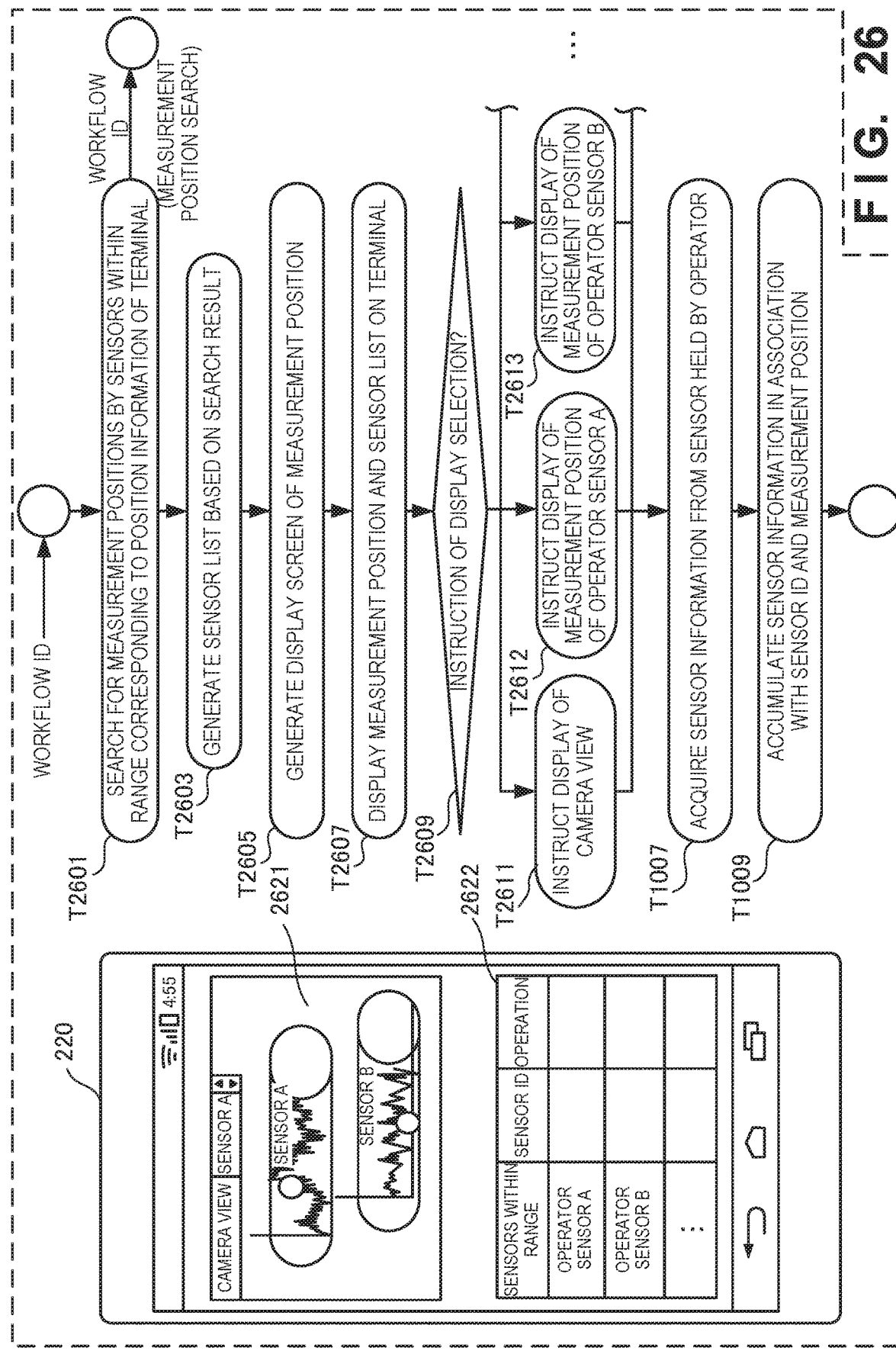
FIG. 26 is a view showing the seventh presentation example on work-site in the plant management system according to the sixth example embodiment of the present invention and a corresponding workflow.

FIG. 26 is a view showing the seventh presentation example on work-site in the plant management system according to this example embodiment and a corresponding workflow.

In the seventh presentation example shown in FIG. 26, the list of sensors existing in the plant as the target of a site is displayed in a superimposed manner. As for the list of sensors, a predetermined range is determined from the data of the GPS of the terminal 220 carried by the operator 250, and plant configuration data is searched for and generated and dynamically updated.

The left view of FIG. 26 shows a screen including a display screen 2621 of a plant image and a measurement position and a sensor list 2622 that is the list of operator sensors on the terminal 220.

The right view of FIG. 26 shows a workflow for presenting the screen including the display screen 2621 of the plant image and the sensor information and the sensor list 2622 and selecting display in the left view of FIG. 26. Note that the same task numbers as in FIG. 10 denote the same tasks in the right view of FIG. 26, and a repetitive description thereof will be omitted.

In task T2601, the workflow apparatus 510 activates a workflow of measurement position search for searching for measurement positions by operator sensors within a range corresponding to the position information of the terminal. In task T2603, the workflow apparatus 510 generates the sensor list 2622 based on the sensor search result. In task T2605, the workflow apparatus 510 generates the display screen 2621 of measurement positions. In task T2607, the workflow apparatus 510 presents the display screen 2621 and the sensor list 2622 on the terminal 220 on work-site.

In task T2609, the workflow apparatus 510 determines the instruction of display selection. In task T2611, the workflow apparatus 510 instructs display of the camera view of the terminal 220 on the display screen 2621 in accordance with the instruction of display selection. Additionally, in task T2612, the workflow apparatus 510 instructs display of the measurement position of an operator sensor A on the display screen 2621. Furthermore, in task T2613, the workflow apparatus 510 instructs display of the measurement position of an operator sensor B on the display screen 2621.

According to the seventh presentation example, measurement positions of operator sensors within a predetermined range can be selected from the data of the GPS of the terminal carried by the operator 250 and presented.

«Eighth Presentation Example and Workflow»

Figure 27:
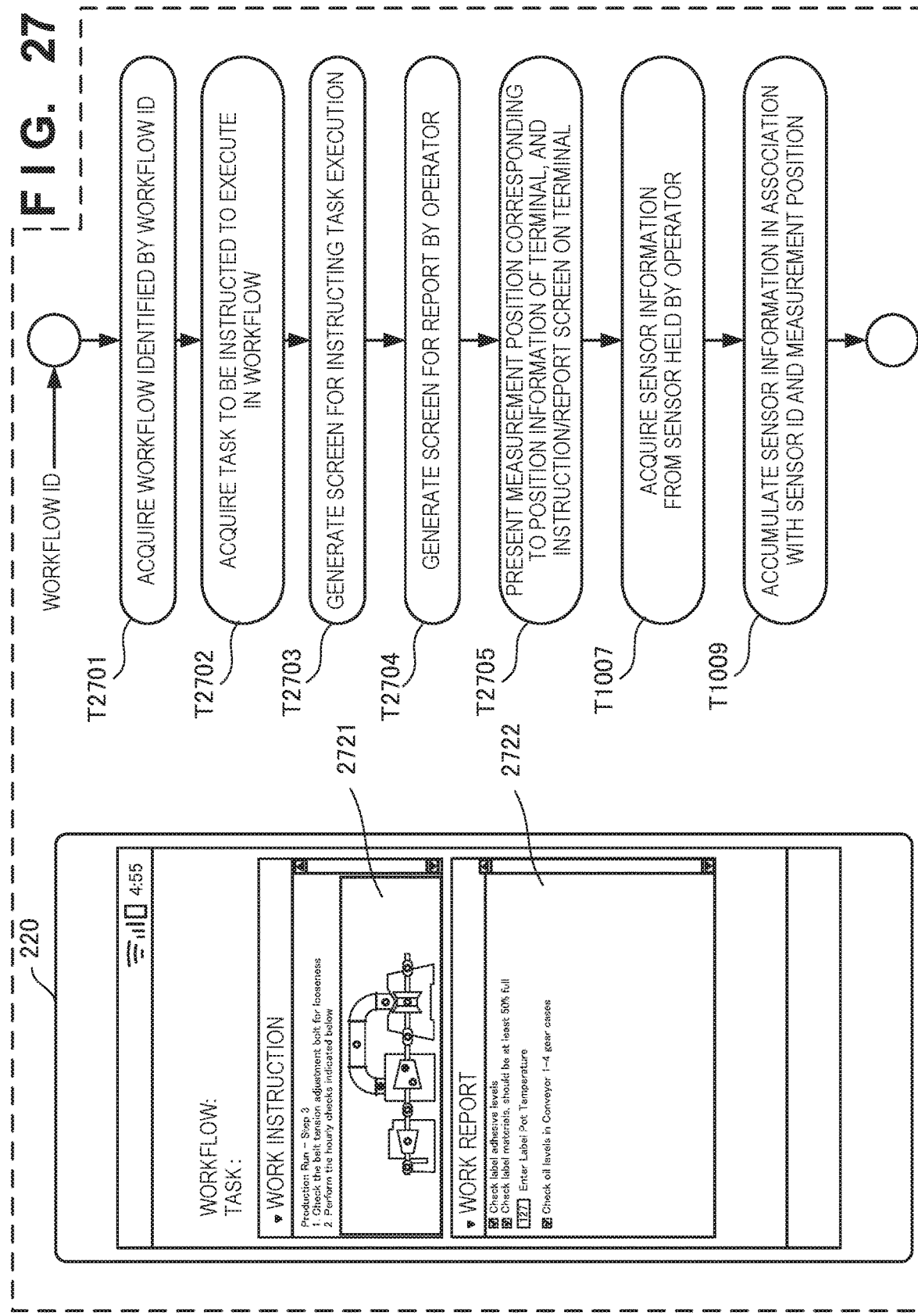
FIG. 27 is a view showing the eighth presentation example on work-site in the plant management system according to the sixth example embodiment of the present invention and a corresponding workflow.

FIG. 27 is a view showing the eighth presentation example on work-site in the plant management system according to this example embodiment and a corresponding workflow.

In the eighth presentation example shown in FIG. 27, a task management screen in a workflow management screen in the management center of a plant is presented on the terminal 220 carried by the operator 250 on work-site to successively manage the work of the operator 250 on work-site, and information of the operator 250 on work-site is quickly collected and reflected on plant management.

The left view of FIG. 27 shows a screen including a work instruction screen 2721 and a work report 2722, in which a task management screen in a workflow management screen in the management center of a plant is presented on the terminal 220 carried by the operator 250 on work-site on the terminal 220.

The right view of FIG. 27 shows a workflow for causing the operator 250 on work-site and the management center to implement quick communication by the screen including the work instruction screen 2721 and the work report 2722 shown in the left view of FIG. 27. Note that the same task numbers as in FIG. 10 denote the same tasks in the right view of FIG. 27, and a repetitive description thereof will be omitted.

In task T2701, the workflow apparatus 510 acquires the workflow of a workflow ID. In task T2702, the workflow apparatus 510 acquires a task(s) to be instructed to execute in the workflow. In task T2703, the workflow apparatus 510 generates a screen (work instruction screen 2721) for instructing task execution. In task T2704, the workflow apparatus 510 generates a report screen (work report 2722) for reporting by the operator 250. In task T2705, the workflow apparatus 510 presents the measurement position corresponding to the position information of the terminal and the instruction/report screen on the terminal.

According to the eighth presentation example, efficient plant management can be performed by fusing the work of the operator on work-site and plant management.

According to this example embodiment, since a contrivance is made for the measurement position presentation method, it is possible to more efficiently support the on work-site measurement work of the operator who checks or maintains a structure such as a plant.

Seventh Example Embodiment

A plant management system according to the seventh example embodiment of the present invention will be described next. The plant management system according to this example embodiment is different from the above-described second to sixth example embodiments in that a terminal has a superimposition display function and a projection function for a measurement position and a function of connecting an operator sensor and transferring measurement data. The rest of the components and operations is the same as in the second to sixth example embodiments. Hence, the same reference numerals denote the same components and operations, and a detailed description thereof will be omitted.

«Plant Management System»

The arrangement and operation of a plant management system 2800 according to this example embodiment will be described with reference to FIGS. 28 and 29.

(Operation Outline)

Figure 28:
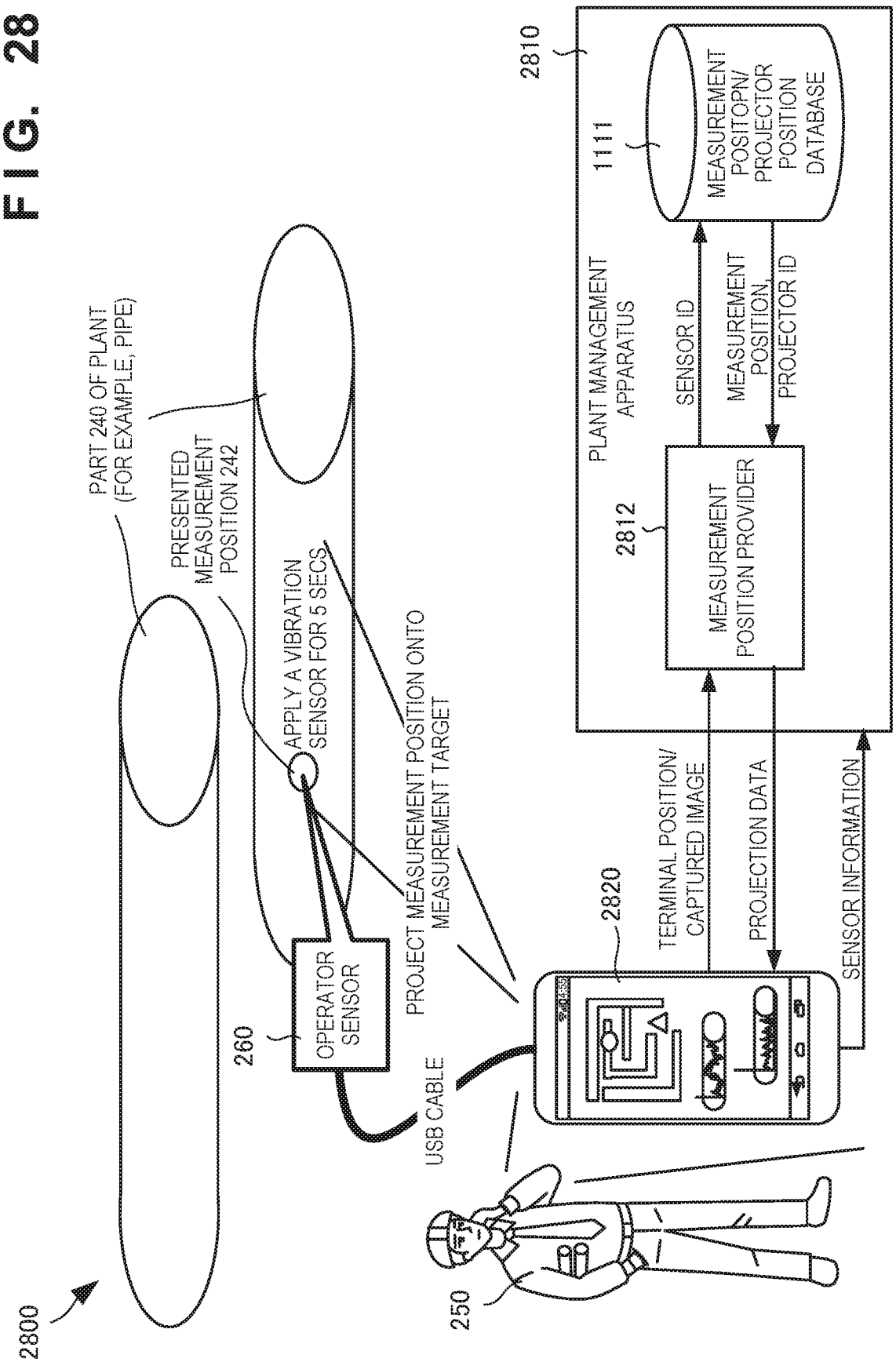
FIG. 28 is a view showing the operation outline of a plant management system according to the seventh example embodiment of the present invention.

FIG. 28 is a view showing the operation outline of the plant management system 2800 according to this example embodiment. Note that the same reference numerals as in FIG. 2A or FIGS. 11A, 11B, 16A, and 19 denote the same constituent elements in FIG. 28, and a repetitive description thereof will be omitted.

Referring to FIG. 28, a plant management apparatus 2810 includes a measurement position provider 2812. When current position information is acquired from a terminal 2820 carried by an operator 250 on work-site, the measurement position provider 2812 projects the corresponding measurement position of the measurement target to a part 240 of a plant on which the sensor is set using the projection function of the terminal 2820. Then, sensor information detected by an operator sensor 260 from the presented measurement position is sent to the terminal 2820 by, for example, a USB and transmitted to the plant management apparatus 2810.

(Hardware Arrangement)

Figure 29:
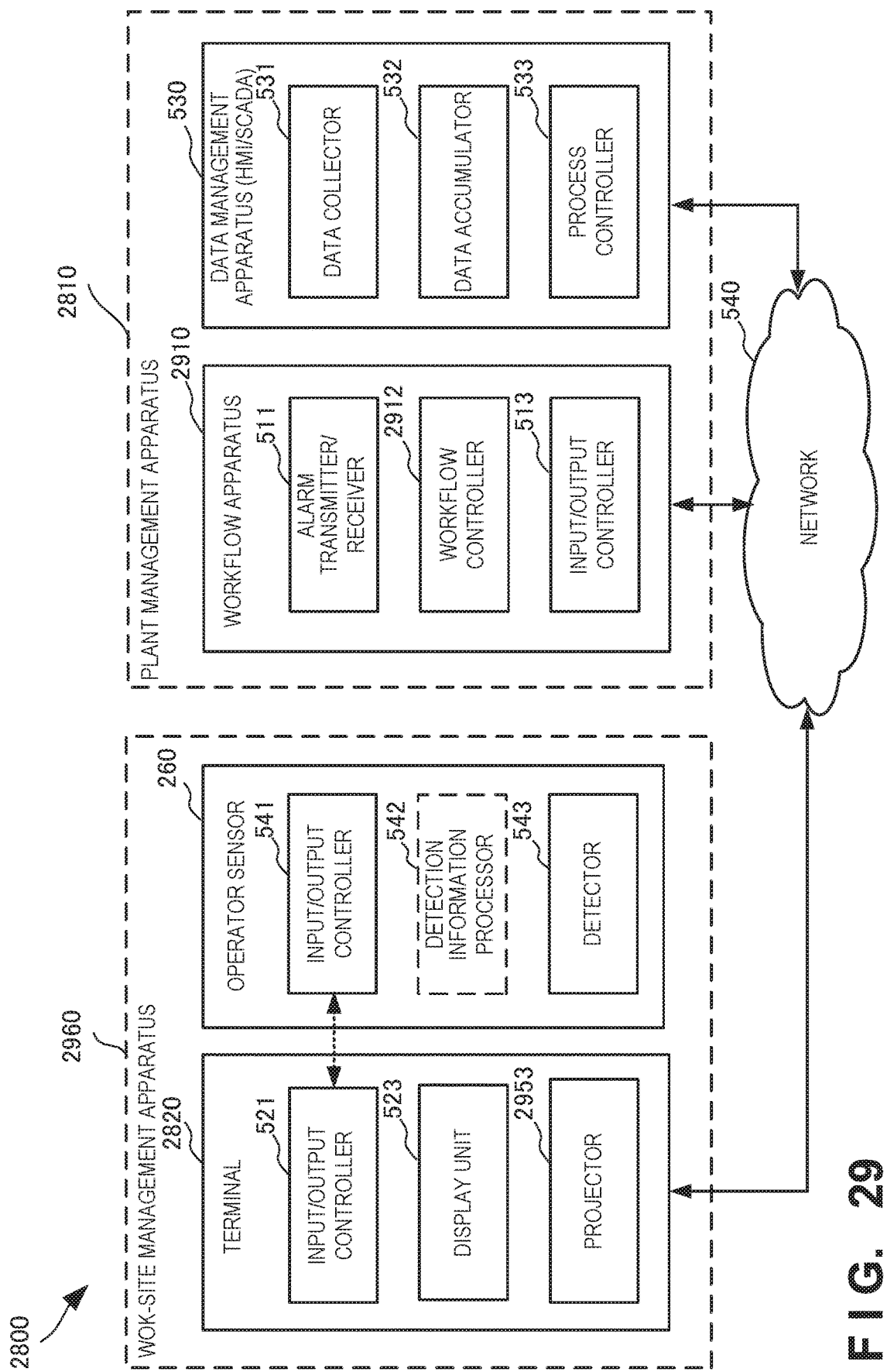
FIG. 29 is a block diagram showing the hardware arrangement of the plant management system according to the seventh example embodiment of the present invention.

FIG. 29 is a block diagram showing the hardware arrangement of the plant management system 2800 according to this example embodiment. Note that the same reference numerals as in FIG. 5 or 13 denote the same constituent elements in FIG. 29, and a repetitive description thereof will be omitted.

The plant management system 2800 includes the plant management apparatus 2810 and a work-site management apparatus 2960, which are connected via a network 540. A workflow apparatus 2910 that constitutes the plant management apparatus 2810 activates a workflow for causing a projector 2953 of the terminal 2820 as the presentation apparatus according to this example embodiment to project a measurement position.

On the other hand, the work-site management apparatus 2960 includes the terminal 2820 and the operator sensor 260. The projector 2953 of the terminal 2820 projects the measurement position of the measurement target corresponding to the current position information of the terminal 2820 or an image in which the measurement position is superimposed on a plant image to the plant corresponding to the current position information or a screen. While referring to the image in which the measurement position projected from the projector 2953 is superimposed on the plant image, sensor information detected by the operator sensor 260 for the measurement position is sent from the operator sensor 260 to the terminal 2820 by a USB or the like and transmitted to the plant management apparatus 2810 via an input/output controller 521.

According to this example embodiment, it is possible to project the measurement position without arranging a projector serving as a projection apparatus having a projection function on work-site and also transmit the sensor information from the operator sensor that does not have a long-distance communication function to the management center. It is therefore possible to efficiently support the on work-site work of the operator who checks or maintains a structure such as a plant while suppressing the facility investment.

Eighth Example Embodiment

A plant management system according to the eighth example embodiment of the present invention will be described next. In the above-described second to seventh example embodiments, mainly, sensor information from the measurement position instructed by the plant management apparatus is measured by the operator on work-site, thereby aiming at improving the reliability of plant management based on the sensor information. However, the sensor information cannot efficiently be obtained only by the instruction of the measurement position to the operator because of generation of a work load on the measurer or occurrence of a situation in which the measurer can hardly approach to do a work. In the plant management system according to this example embodiment, a remote-controlled device such as a robot or drone is caused to perform measurement at the measurement position of the measurement target.

The remote-controlled device can grasp the measurement position projected in accordance with an instruction of the plant management apparatus by a video acquirer. The remote-controlled device includes a sensor as a measurement function. The sensor included in the remote-controlled device can be either a contact type or a non-contact type. The remote-controlled device correctly applies the sensor to the projected measurement position and acquires sensor information detected from the measurement position. The acquired sensor information is provided to the plant management apparatus based on the contents disclosed in any one of the first to seventh example embodiments. The remote-controlled device may or may not have an operator. The remote-controlled device may be configured to be able to finely adjust the orientation or distance of the sensor. In this case, it is possible to adjust the remote-controlled device itself to the projected measurement position and perform correct measurement. In addition, if, for example, the measurer is a microphone, correct microphone measurement with focus on the measurement position can be performed using the feature that measurement with directivity can be performed by adjusting the microphone.

Figure 30:
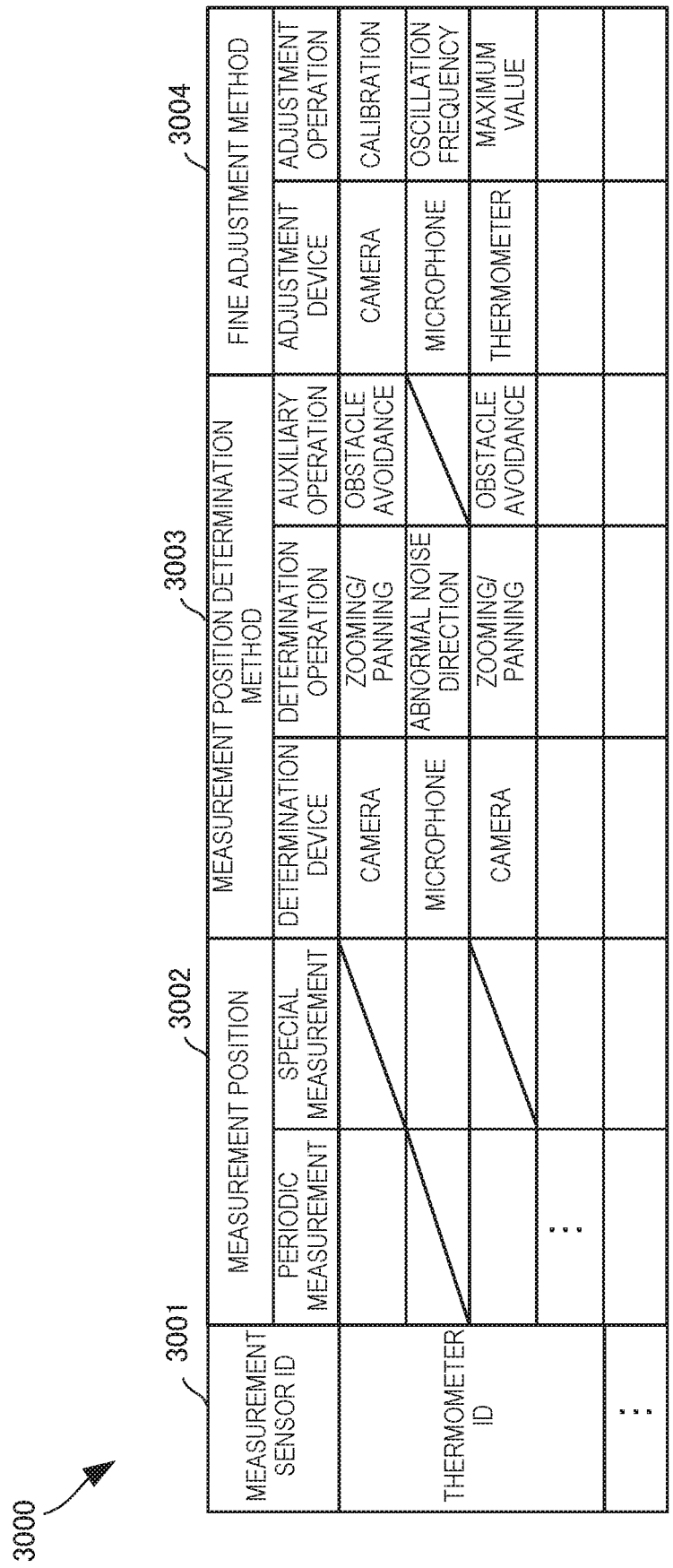
FIG. 30 is a view showing the arrangement of a measurement position determination table according to the eighth example embodiment of the present invention.

FIG. 30 is a view showing the arrangement of a measurement position determination table 3000 according to this example embodiment. The measurement position determination table 3000 is used by the remote-controlled device to grasp the projected measurement position and perform measurement at the measurement position using a corresponding sensor.

The measurement position determination table 3000 stores a measurement sensor ID 3001 and a measurement position 3002 corresponding to each measurement sensor ID 3001. The measurement position determination table 3000 also stores a measurement position determination method 3003 and a fine adjustment method 3004 at each measurement position 3002 in association with the measurement sensor ID 3001 and the measurement position 3002. The measurement position 3002 includes a measurement position of periodic measurement performed by periodically making patrol and a measurement position at which special measurement is performed based on an abnormality or an abnormality sign on work-site or an abnormality analysis result or an abnormality sign analysis result in a plant management apparatus.

As the measurement position determination method 3003, a method for grasping the measurement position 3002 and setting a sensor at the measurement position 3002 is stored. The measurement position determination method 3003 includes a determination device used to determine the measurement position, a determination operation using the determination device, and an auxiliary operation performed because the measurement position cannot be reached only by the determination operation. Additionally, as the fine adjustment method 3004, a method of performing fine adjustment of the measurement position in a case in which alignment to the measurement position 3002 is necessary is stored. The fine adjustment method 3004 includes an adjustment device used to perform fine adjustment, and an adjustment operation using the adjustment device. Note that some of the measurement sensor, the position determination device, and the adjustment device may be the same.

For example, in FIG. 30, when measuring a measurement position by a thermometer, in the first periodic measurement, the device arrives at the projected measurement position while avoiding, using a camera, obstacles blocking the visual field. Then, the measurement position is adjusted while capturing the thermometer and the projected measurement position by the camera. In the next special measurement, the device arrives at the measurement position while detecting the direction of abnormal noise generation position using a microphone. The final temperature measurement position is finely adjusted to the abnormal noise generation position by an oscillation frequency using the microphone. In the next periodic measurement, the device arrives at the projected measurement position while avoiding, using the camera, obstacles blocking the visual field. Then, the measurement position is finely adjusted to the highest temperature measurement position in the measurement positions measured by the thermometer for measurement. Note that the present invention is not limited to the above-described example, and a remote-controlled device such as a robot or a drone can be made to perform measurement at the measurement position of the measurement target.

According to this example embodiment, sensor information can be obtained correctly and efficiently without causing the operator to do the measurement work by himself/herself.

Ninth Example Embodiment

A plant management system according to the ninth example embodiment of the present invention will be described next. In the above-described second to eighth example embodiments, mainly, sensor information from the measurement position instructed by the plant management apparatus is measured as correctly as possible by the operator on work-site or a remote-controlled device, thereby aiming at improving the reliability of plant management based on the sensor information. However, in a case in which the measurement position instructed by the plant management apparatus is not the optimum measurement position, or the currently instructed measurement position is no longer the effective measurement position because of a phenomenon or sudden accident that has newly occurred on work-site or a secular change, sufficient sensor information cannot be obtained only by measurement exactly complying with the instruction of the measurement position from the plant management apparatus. In addition, when performing measurement by the remote-controlled device, a measurement position where the measurement by the remote-controlled device is difficult may be instructed in consideration of the limitation on the operation of the remote-controlled device. In this case as well, sufficient sensor information cannot be obtained. That is, this is a case in which, for example, the remote-controlled device can hardly be moved to the position where the measurement position can be measured.

In the plant management system according to this example embodiment, as for the measurement position of a measurement target, information from a site, particularly, the information of a new measurement position measured at the discretion on work-site in correspondence with a phenomenon on work-site is reflected on subsequent update of the measurement position. Note that for the reflection, if the information of the new measurement position measured at the discretion on work-site in correspondence with the phenomenon on work-site is determined as important, the information may directly be added to the measurement position. However, the present invention is not limited to addition of a new measurement position or deletion of a measurement position, and the current measurement position may be moved to a desired position to improve the reliability of plant management by analyzing, by a plant management apparatus, the information of the new measurement position measured at the discretion on work-site in correspondence with the phenomenon on work-site and measured sensor information. With this processing, the information on work-site which cannot be predicted only by the collection and analysis of sensor information by the plant management apparatus is incorporated in the plant management, thereby actively performing more reliable plant management. The rest of the components and operations is the same as in the second to ninth example embodiments. Hence, the same reference numerals denote the same components and operations, and a detailed description thereof will be omitted.

(Data Accumulation Table)

Figure 31:
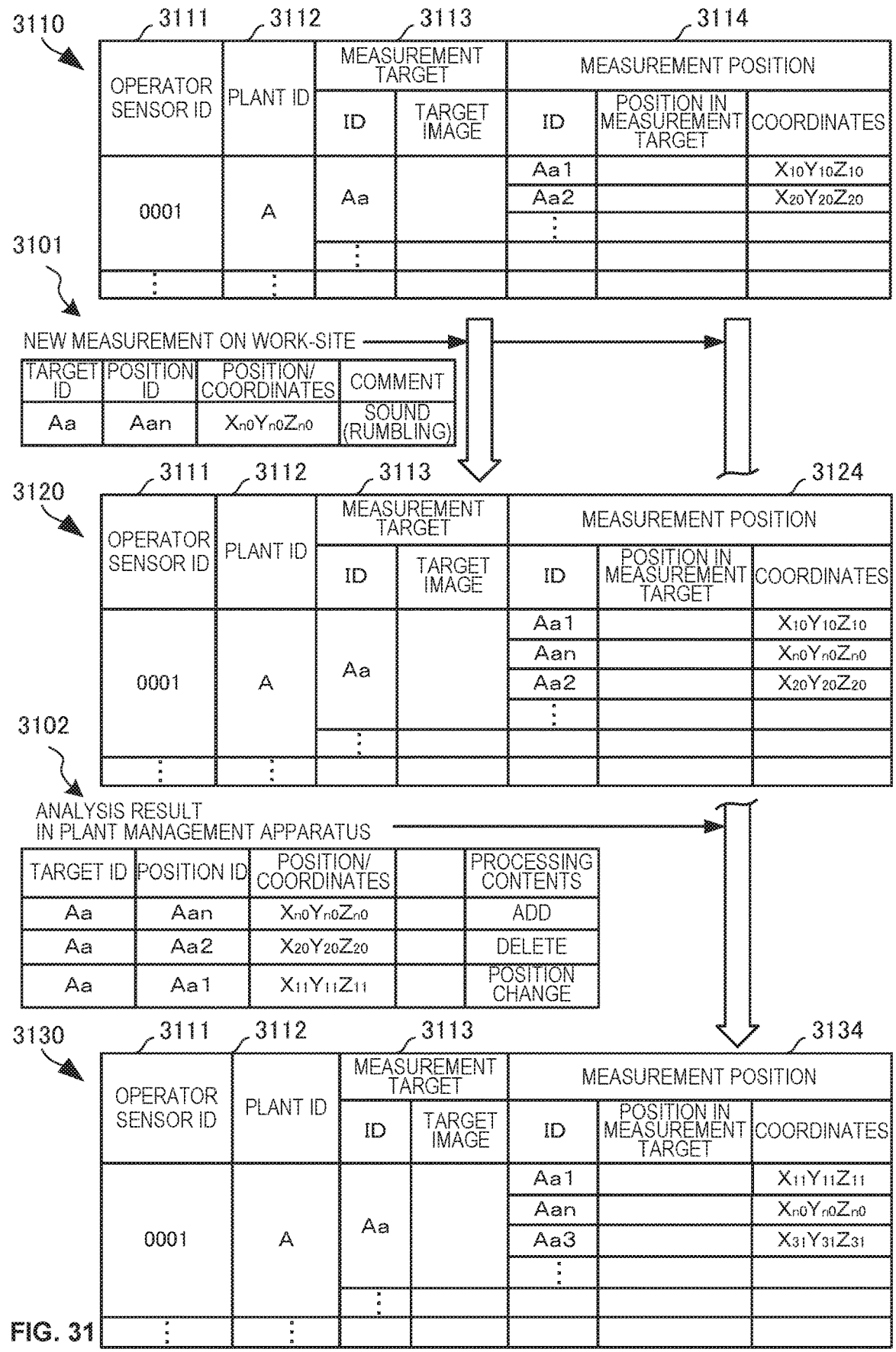
FIG. 31 is a view showing the arrangement of a data accumulation table according to the ninth example embodiment of the present invention.

FIG. 31 is a view showing the arrangement of a data accumulation table according to this example embodiment. FIG. 31 shows the settings of the measurement positions 964 and 984 shown in FIGS. 9B and 17 in more detail to clarify the feature of this example embodiment.

Referring to FIG. 31, a measurement position table 3110 before change is changed to a measurement position table 3120 after change based on information 3101 of new measurement on work-site. In addition, the measurement position table 3110 before change is changed to a measurement position table 3130 after change based on not the information 3101 of new measurement on work-site itself but information 3102 of an analysis result obtained by analyzing the information in consideration of other information as well by the plant management apparatus.

The measurement position table 3110 before change stores a measurement target 3113 and a measurement position 3114 in correspondence with an operation sensor ID 3111 and an operation target plant ID 3112. More specifically, the operation sensor ID 3111 is "0001", the plant ID 3112 is "A", the measurement target ID is "Aa", and the measurement position IDs are sequentially "Aa1", "Aa2", . . . . In addition, the coordinates of the measurement positions are "X10, Y10, Z10", "X20, Y20, Z20", . . . in correspondence with the measurement position IDs.

Here, for example, information obtained by observing abnormal noise (rumbling sound) on work-site and performing measurement at the position as the new measurement position is the information 3101 of new measurement. The measurement position ID is "Aan", and the coordinates of the measurement position are "Xn0, Yn0, Zn0". Since the new measurement position is associated with the observation of the abnormal noise (rumbling sound), the plant management apparatus or the center manager adds it as the new measurement position in consideration of the characteristics of the plant and the like. This is shown as the measurement position table 3120 after change. In the measurement position table 3120 after change, the measurement position ID is "Aan", and the coordinates "Xn0, Yn0, Zn0" of the measurement position are inserted between the measurement position IDs "Aa1" and "Aa2" in consideration of the measurement order.

On the other hand, the measurement position is preferably updated by referring to the information 3102 of the analysis result obtained by analyzing another associated measurement information or measurement history by the plant management apparatus, instead of directly performing determination from the information 3101 of new measurement from the site. This is shown as the measurement position table 3130 after change. In the measurement position table 3130 after change, the measurement position ID is "Aan", and the coordinates "Xn0, Yn0, Zn0" of the measurement position are inserted after the measurement position ID "Aa1" in consideration of the measurement order. In addition, the measurement position ID "Aa2" is deleted, and the coordinates corresponding to the measurement position ID "Aa1" are changed from "X10, Y10, Z10" to "X11, Y11, Z11".

A detailed example based on this example embodiment in a case in which measurement using a remote-controlled device is performed will be described. For example, it is assumed that the remote-controlled device can hardly be moved to the position where the measurement position can be measured. In this case, a new measurement position where the remote-controlled device can perform measurement is added to existing measurement positions. The remote-controlled device performs measurement based on the added measurement position. The remote-controlled device can measure the measurement target even at the newly added measurement position. For example, the remote-controlled device captures the measurement target from a remote position using zooming or panning. For example, the remote-controlled device increases the directivity of a microphone and records a sound or vibration associated with the measurement target from a remote position. A captured video or photo sometimes includes objects that block the measurement target, and the remote-controlled device may perform post-processing of removing them. A recorded sound or vibration associated with the measurement target sometimes includes noise generated from a place other than the measurement target, and the remote-controlled device may perform noise removal by post-processing using, for example, a bandpass filter.

Note that the above-described detailed example is merely an example of this example embodiment, and flexible update of the measurement position based on information on work-site to an appropriate position suitable for the present situation is easily implemented. In addition, the device that performs measurement on work-site and acquires information on work-site may be an autonomously movable remote-controlled device. In this case, the remote-controlled device detects a phenomenon on work-site, particularly, a change in a sound, color, smell, smoke, or the like based on sound recording or video capturing, measures a new measurement position, and reports it. In this way, even the remote-controlled device can obtain information close to the information of observation or experience of the operator.

According to this example embodiment, since the information of measurement at a new measurement position based on a phenomenon on work-site in observation or inspection on work-site can be used to improve subsequent measurement positions, more reliable plant management can be performed.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a plant management program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described embodiments can also be described as in the following supplementary notes but are not limited to the followings.

(Supplementary Note 1)

There is provided a plant management system comprising:

a measurement position instructor that, when performing measurement by a sensor on a work site, instructs a position to be measured by the sensor on a measurement target; and a presenter that, when the measurement is executed, performs presentation of an image representing the position to be measured by the sensor on the work site by superimposing the image on an image of the measurement target or projecting the image onto the measurement target.

(Supplementary Note 2)

In the plant management system according to supplementary note 1, the presenter includes a superimposition display that superimposes and displays the image representing the position to be measured by the sensor on the image of the measurement target using an augmented reality technology.

(Supplementary Note 3)

In the plant management system according to supplementary note 1 or 2, the presenter includes a projection device that projects the image representing the position to be measured by the sensor in association with the measurement target.

(Supplementary Note 4)

In the plant management system according to any one of supplementary notes 1 to 3, the image presented by the presenter is an image representing a state in which the sensor is arranged at the position to be measured.

(Supplementary Note 5)

In the plant management system according to any one of supplementary notes 1 to 4, the presenter further performs the presentation of an image representing sensor information at the position measured by the sensor by superimposing the image on the image of the measurement target or projecting the image onto the measurement target.

(Supplementary Note 6)

In the plant management system according to any one of supplementary notes 1 to 5, the presenter further performs the presentation of information concerning the position to be measured by the sensor by superimposing the information on the image of the measurement target or projecting the information onto the measurement target.

(Supplementary Note 7)

In the plant management system according to any one of supplementary notes 1 to 6, the presenter further performs the presentation of an image representing a timing to perform the measurement by the sensor by superimposing the image on the image of the measurement target or projecting the image onto the measurement target.

(Supplementary Note 8)

In the plant management system according to supplementary note 7, the presenter presents the image representing the timing to perform the measurement by the sensor on a plurality of work sites.

(Supplementary Note 9)

In the plant management system according to supplementary note 8, the presenter presents a plurality of images respectively representing timings to perform measurements by a plurality of sensors on the plurality of work sites while adjusting the timings.

(Supplementary Note 10)

In the plant management system according to any one of supplementary notes 1 to 9, the measurement position instructor further instructs a measurement target with a position to be measured next by the sensor, and the presenter presents an image representing the measurement target to go next.

(Supplementary Note 11)

The plant management system according to any one of supplementary notes 1 to 10, further comprises a confirmer that confirms whether the measurement by the sensor from the measurement target on the work site has been performed without an error.

(Supplementary Note 12)

In the plant management system according to supplementary note 11, the confirmer comprises a confirmation image acquirer that acquires, as a confirmation image, an image obtained by capturing a state in which the measurement target is being measured by the sensor, and confirms, based on the confirmation image, whether the measurement by the sensor has been performed without an error.

(Supplementary Note 13) In the plant management system according to supplementary note 11 or 12, the confirmer further comprises a comparator that compares measurement information from the sensor with measurement information to be measured from the sensor, and confirms, based on comparison of the measurement information, whether the measurement by the sensor has been performed without an error.

(Supplementary Note 14)

In the plant management system according to any one of supplementary notes 11 to 13, the confirmer further comprises a measurement timing acquirer that acquires one of a measurement time point and a measurement time interval on the work site, and confirms, based on the measurement timing, whether the measurement by the sensor has been performed without an error.

(Supplementary Note 15)

In the plant management system according to any one of supplementary notes 1 to 14, further comprising an associated information acquirer that acquires associated information associated with the measurement by the sensor in the state in which the measurement target is measured by the sensor.

(Supplementary Note 16)

The plant management system according to supplementary note 15, further comprises a changing unit that changes the position to be measured based on the associated information and a position newly measured on the work site.

(Supplementary Note 17)

There is provided a plant management method comprising:

when performing measurement by a sensor on a work site, instructing a position to be measured by the sensor on a measurement target; and when the measurement is executed, performing presentation of an image representing the position to be measured by the sensor on the work site by superimposing the image on an image of the measurement target or projecting the image onto the measurement target.

(Supplementary Note 18)

There is provided a plant management apparatus comprising:

a position acquirer that acquires a position of a work site;

a measurement position instructor that, when performing measurement by a sensor, instructs a position to be measured by the sensor on a measurement target in accordance with the position of the work site; and an instructor that, when the measurement is executed, instructs to perform presentation of an image representing the position to be measured by the sensor on the work site by superimposing the image on an image of the measurement target or projecting the image onto the measurement target.

(Supplementary Note 19)

In the plant management system according to supplementary note 18, the instructor instructs a superimposition display, that superimposes and displays the image representing the position to be measured by the sensor on the image of the measurement target using an augmented reality technology, to perform the presentation.

(Supplementary Note 20)

In the plant management system according to supplementary note 18 or 19, the instructor instructs a projection device, that projects the image representing the position to be measured by the sensor in association with the measurement target, to perform the presentation.

(Supplementary Note 21)

In the plant management system according to any one of supplementary notes 18 to 20, the image whose presentation is instructed by the instructor is an image representing a state in which the sensor is arranged at the position to be measured.

(Supplementary Note 22)

The plant management system according to any one of supplementary notes 18 to 21, further comprises a confirmer that confirms whether the measurement by the sensor from the measurement target on the work site has been performed without an error.

(Supplementary Note 23)

There is provided a plant management program for causing a computer to execute a method, comprising:

displaying a list of tasks to be performed on a work site;

acquiring a position of the work site; and when performing measurement by a sensor, instructing to perform presentation of an image representing a position to be measured by the sensor on the work site by superimposing the image on an image of the measurement target or projecting the image onto the measurement target, in accordance with the position of the work site.

(Supplementary Note 24)

There is provided a plant management program for causing a computer to execute a method, comprising:

acquiring a first position of a work site;

when performing measurement by a sensor, acquiring a second position to be measured by the sensor on a measurement target in accordance with the first position of the work site; and generating information to be presented on the work site when the measurement is executed by superimposing an image representing the second position on an image of the measurement target or projecting the image onto the measurement target.

(Supplementary Note 25)

There is provided a plant management program for causing a computer to execute a method, comprising:

acquiring, from an accumulator that accumulates a sensor and sensor information concerning the sensor in association with each other, the sensor information in accordance with a position to be measured by the sensor; and instructing to perform presentation of the sensor information together with an image representing the position to be measured by the sensor on a work site when measurement is executed by superimposing the sensor information together with the image on an image of a measurement target or projecting the sensor information together with the image onto the measurement target.

The invention claimed is:

1. A plant management system comprising:
   a measurement position instructor comprising a first memory configured to store first instructions, and a first processor configured to execute the first instructions; and
   a presenter comprising a second memory configured to store second instructions, and a second processor configured to execute the second instructions,
   wherein the first processor is configured to, in response to performing a measurement for inspection of a plant by a sensor on a work site, execute the first instructions to search a measurement point on a measurement target of the plant to be applied to and measured by the sensor based on a place of the measurement target, and output the searched measurement point, and
   the second processor is configured to, in response to performing the measurement, execute the second instructions to present an image of the measurement target on which at least one symbol indicating the searched measurement point to be applied to and measured is superimposed or projected,
   wherein the plant management system further comprises:
   an associated information acquirer comprising a fourth memory storing fourth instructions and a fourth processor configured to execute the fourth instructions; and
   a changing unit comprising a fifth memory storing fifth instructions and a fifth processor configured to execute the fifth instructions, wherein the fourth processor is configured to execute the fourth instructions to acquire associated information associated with the measurement for inspection of the plant by the sensor in a state in which the measurement target is measured by the sensor, and the fifth processor is configured to execute the fifth instructions to change the measurement point to a new measurement point to be measured based on the associated information and the new measurement point newly measured by an operator on the work site.

2. The plant management system according to claim 1, wherein the second processor is configured to execute the second instructions to present the image of the measurement target by displaying the image of the measurement target on which the at least one symbol is superimposed by using an augmented reality technology.

3. The plant management system according to claim 1, wherein the image of the measurement target is an image in which the at least one symbol is projected on the image of the measurement target.

4. The plant management system according to claim 1, wherein the second processor is further configured to execute the second instructions to present an image representing a timing to perform the measurement by the sensor by superimposing the image representing the timing on the image of the measurement target or projecting the image representing the timing onto the image of the measurement target.

5. The plant management system according to claim 4, wherein the second processor is configured to execute the second instructions to present, on a plurality of work sites, the image representing the timing to perform the measurement by the sensor.

6. The plant management system according to claim 5, wherein the second processor is configured to execute the second instructions to present the image representing the timing by presenting a plurality of images respectively representing timings to perform measurements by a plurality of sensors on the plurality of work sites while adjusting the timings.

7. The plant management system according to claim 1, wherein the first processor is configured to execute the first instructions to search a next measurement point to be measured next by the sensor on a next measurement target of the plant to go next based on a place of the next measurement target, and output the searched next measurement point, and the second processor is configured to execute the second instructions to present an image of the next measurement target on which at least one symbol indicating the searched next measurement point to be applied to and measured is superimposed or projected.

8. The plant management system according to claim 1, further comprising a confirmer comprising a third memory configured to store third instructions and a third processor configured to execute the third instructions, wherein the third processor is configured to execute the third instructions to confirm whether the measurement by the sensor has been performed without an error.

9. The plant management system according to claim 8, wherein the third processor is configured to execute the third instructions to acquire, as a confirmation image, an image obtained by capturing a state in which the measurement target is being measured by the sensor, and confirm, based on the confirmation image, whether the measurement by the sensor has been performed without an error.

10. The plant management system according to claim 8, wherein the third processor is configured to execute the third instructions to compare measurement information from the sensor with measurement information to be measured from the sensor, and confirm, based on comparison of the measurement information, whether the measurement by the sensor has been performed without an error.

11. The plant management system according to claim 8, wherein the third processor is configured to execute the third instructions to acquire, as a measurement timing, one of a measurement time point and a measurement time interval on the work site, and confirm, based on the measurement timing, whether the measurement by the sensor has been performed without an error.

12. The plant management system according to claim 1, wherein the searched measurement point to be measured indicates one point or periphery of the one point in the measurement target.

13. The plant management system according to claim 1, wherein the image of the measurement target is one of a photo of a plant captured by a terminal, a three dimensional (3D) image of the plant, and a 3D plant image through which an internal structure is visible.

14. The plant management system according to claim 1, wherein the second processor is configured to execute the second instructions to:

present, to an operator, a map that permits the operator to go to the measurement target; and present the image of the measurement target on which the at least one symbol is superimposed or projected, in response to the operator arriving at the measurement target, wherein the map includes the at least one symbol and at least one symbol indicating a direction in which the operator travels from a current position to a next measurement target.

15. The plant management system according to claim 1, wherein the sensor performing the measurement for inspection of the plant is a vibration sensor.

16. A plant management method comprising:

searching a measurement point on a measurement target of a plant to be applied to and measured by a sensor based on a place of the measurement target, in response to performing a measurement for inspection of the plant by the sensor on a work site, and outputting the searched measurement point;

presenting an image of the measurement target on which at least one symbol indicating the searched measurement point to be applied to and measured is superimposed or projected;

acquiring associated information associated with the measurement for inspection of the plant by the sensor in a state in which the measurement target is measured by the sensor; and changing the measurement point to a new measurement point to be measured based on the associated information and the new measurement point newly measured by an operator on the work site.

17. A plant management apparatus comprising:

at least one memory configured to store instructions; and at least one processor configured to execute the instructions to perform:

searching a measurement point on a measurement target of a plant to be applied to and measured by a sensor based on a place of the measurement target, in response to performing a measurement for inspection of the plant by the sensor on a work site;

instructing a terminal to present an image of the measurement target on which at least one symbol indicating the searched measurement point to be applied to and measured is superimposed or projected;

acquiring associated information associated with the measurement for inspection of the plant by the sensor in a state in which the measurement target is measured by the sensor; and changing the measurement point to a new measurement point to be measured based on the associated information and the new measurement point newly measured by an operator on the work site.

18. The plant management apparatus according to claim 17, wherein the at least one processor is configured to execute the instructions, to perform instructing the terminal to present the image of the measurement target by instructing the terminal to display the image of the measurement target on which the at least one symbol is superimposed by using an augmented reality technology.

19. The plant management apparatus according to claim 17, wherein the at least one processor is configured to execute the instructions to perform projecting the at least one symbol on the image of the measurement target.

* * * * *